(12) United States Patent
Hosoi

(10) Patent No.: US 7,680,299 B2
(45) Date of Patent: Mar. 16, 2010

(54) UNAUTHORIZED PERSON DETECTION DEVICE AND UNAUTHORIZED PERSON DETECTION METHOD

(75) Inventor: Toshinori Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 1235 days.

(21) Appl. No.: 10/545,373

(22) PCT Filed: Feb. 12, 2004

(86) PCT No.: PCT/JP2004/001497

§ 371 (c)(1),
(2), (4) Date: Aug. 12, 2005

(87) PCT Pub. No.: WO2004/072899

PCT Pub. Date: Aug. 26, 2004

(65) Prior Publication Data

US 2006/0093183 A1 May 4, 2006

(30) Foreign Application Priority Data

Feb. 13, 2003 (JP) .............................. 2003-035511

(51) Int. Cl.
*G06K 9/00* (2006.01)
(52) U.S. Cl. ...................... 382/103; 382/115; 382/118; 382/154; 382/286
(58) Field of Classification Search ................. 382/103, 382/118, 115, 154, 286
See application file for complete search history.

(56) References Cited

U.S. PATENT DOCUMENTS

| 5,822,077 | A | * | 10/1998 | Sasaki et al. ................. 358/296 |
| 5,838,428 | A | * | 11/1998 | Pipitone et al. ............ 356/3.09 |
| 6,108,437 | A | | 8/2000 | Lin |
| 6,377,700 | B1 | * | 4/2002 | Mack et al. .................. 382/154 |
| 2002/0116106 | A1 | * | 8/2002 | Breed et al. ................... 701/45 |

(Continued)

FOREIGN PATENT DOCUMENTS

DE 19712844 A1 10/1998

(Continued)

OTHER PUBLICATIONS

Gebhart et al., "Exclusion of Photos and New Segmentation Algorithms for the Automatic Face Recognition." Lecture Notes in Computer Science, vol. 1206, p. 161-168, 1997.*

(Continued)

*Primary Examiner*—Bhavesh M Mehta
*Assistant Examiner*—Michael Vanchy, Jr.
(74) *Attorney, Agent, or Firm*—Sughrue Mion, PLLC

(57) ABSTRACT

In masquerading determination processing, a masquerading determination unit reads image data representing an image of an identification target on which a striped pattern is projected from an image storage unit to extract the striped pattern appearing in a face region of the image represented by the read image data. Subsequently, the masquerading determination unit determines whether a stripe in the face region in the image is a straight line or not. When the stripe is a straight line, because the identification target is a plane object such as a photograph or an image display device so that it can be determined that the target is at least not a person himself, the masquerading determination unit determines that the target masquerades. On the other hand, unless the stripe is a straight line, because the identification target has a solid configuration having three-dimensional irregularities to have a possibility of being a person himself, the unit determines that the target might not masquerade.

27 Claims, 34 Drawing Sheets

U.S. PATENT DOCUMENTS

2004/0037450 A1 * 2/2004 Bradski ............... 382/103

FOREIGN PATENT DOCUMENTS

| JP | 04-242106 A | | 8/1992 |
| JP | 6-50752 A | | 2/1994 |
| JP | 06-050752 A | | 2/1994 |
| JP | 06050752 | * | 2/1994 |
| JP | 11-328359 A | | 11/1999 |
| JP | 2002-117377 A | | 4/2002 |
| JP | 2002-236666 A | | 8/2002 |
| WO | 9953427 A1 | | 10/1999 |

OTHER PUBLICATIONS

Gebhart Alexander, et al. "Exclusion of photos and new segmentation algorithms for the automatic face recognition." Lecture Notes in Computer Science, vol. 1206, p. 161-168, 1997.

Alexander Gebhart, et al., "Exclusion of Photos and New Segmentation Algorithms for the Automatic Face Recognition", Lectute Note in Computer Science, Spriger-Verlag, 1997, vol. 1206, p. 161-168.

He Xin "GA-Based Front View Human Face Localization", Inst. of Image Processing & Pattern Recog., Journal of Shanghai University, Shanghai, CN pp. 1189-1190, Sep. 30, 1999.

* cited by examiner

IN CASE OF PHOTOGRAPH OR IMAGE DISPLAY DEVICE

IN CASE OF PERSON HIMSELF

IN CASE OF PHOTOGRAPH OR IMAGE DISPLAY DEVICE

IN CASE OF MASQUERADING IMAGE

IN CASE OF PERSON HIMSELF

IDENTIFICATION TARGET

MAXIMUM VALUE D OF WIDTH OF REGION

EXTRACTED REGION

UNAUTHORIZED PERSON DETECTION DEVICE AND UNAUTHORIZED PERSON DETECTION METHOD

FIELD OF THE INVENTION

The present invention relates to a masquerading detection device which detects, for use in determining whether a target in personal authentication is a specified person or not, the target being a non-specified person who masquerades as the specified person and, more particularly, a masquerading detection device which detects masquerading in personal identification by using a head including a part or the whole of a face and a masquerading detection method.

DESCRIPTION OF THE RELATED ART

Among conventional masquerading detection devices having a function of detecting a target to be identified being an object for masquerading as a specific person, there exist devices which, when a person masquerades as a specific person by using a picture of a photographed face of the specific person or when a person masquerades as a specific person by using a relief formed out of a head of the specific person, detects the photograph of the face or the relief being an object for masquerading as the specific person.

More specifically, there exists such a personal authentication device as recited in Literature 1 that laterally illuminates a target person to be photographed which is an identification target and measures irregularities of a silhouette of a profile to determine whether the target masquerades or not based on whether the silhouette is a vertical line.

There exists another device such as a face identification device recited in Literature 2 that photographs, by a camera, a face of a photographing target on which light of striped pattern is projected and measures three-dimensional configuration of the face of the photographing target based on image data obtained by the photographing to determine whether the target masquerades or not according to the measurement results.

There exists a further device such as a personal authentication system recited in Literature 3 that determines whether a target masquerades or not based on position information of an identification device and position information of a target to be identified.

The above-described conventional masquerading detection devices, however, involve at least one of a plurality of shortcomings set forth below.

First, the above-described conventional techniques have the difficulty in conducting stable masquerading detection with high precision. With the above-described personal authentication device, for example, displaying a face of other person which is artificially given a silhouette on an image display device such as an LCD (liquid crystal device) and making the personal authentication device photograph the image displayed on the image display device prevents detection of masquerading. As a result, precision of masquerading detection is degraded to make stable masquerading detection difficult.

Another problem of the above-described techniques is a burden imposed on a person to be photographed. With the above-described personal authentication device which employs, for example, a method of measuring irregularities of a silhouette of a profile to determine masquerading based on whether the silhouette is a vertical line, a person to be photographed is laterally irradiated with as strong lighting as obtains an enough edge from an image, which dazzles the person to be photographed. In other words, a heavy burden will be imposed on the eyes of the person to be photographed. When conducting authentication under natural lighting, in particular, stronger light should be irradiated to make a burden on the person to be photographed be heavier.

Other problem of the above-described techniques is that complicated processing is required to conduct highly precise masquerading detection, which makes a burden on control for detecting masquerading be heavier. The above-described face identification device, for example, has a heavier processing burden because processing for measuring a three-dimensional configuration of a face of a target to be photographed is complicated.

A further problem of the above-described techniques is that an expensive device is required to conduct highly precise masquerading detection. The above-described personal authentication device, for example, costs much because of the necessity of a GPS receiver for position measurement. On the other hand, the above-described face identification device costs much as well because of its function of measuring a three-dimensional configuration of a face of a target to be photographed.

The present invention aims at solving the above-described problems to stably conduct highly precise masquerading detection. The present invention further aims at enabling masquerading detection without imposing a heavy burden to a person to be photographed. Furthermore, the present invention aims at mitigating a burden on control for masquerading detection to enable highly precise masquerading detection with low costs.

SUMMARY OF THE INVENTION

In order to solve the above-described problems, the masquerading detection device according to the present invention is a masquerading detection device that, for use in determining whether a target is a specified person or not, detects the target being a non-specified person who masquerades as the specified person, which includes a target information obtaining means (e.g. person measurement unit 2) having a light emitter (e.g. a lamp that a light with a filter 22 has) which irradiates light to a target, as well as projecting a predetermined pattern onto the target, a filter (e.g. a filter that the light with a filter 22 has) which transmits light emitted by the light emitter disposed in the vicinity of a light source of the light emitter and a target image obtaining means (e.g. an image input unit 23) which photographs a target on which a predetermined pattern is projected by light emission of the light emitter to obtain target image data, a storage means (e.g. a storage device 4) having an image storage means (e.g. an image storage unit 41) which stores target image data, and a data processing means (e.g. a data processing device 3) having a masquerading determination means (e.g. a masquerading determination unit 31) which determines whether a target is a non-specified person or not, in which the masquerading determination means compares a pattern appearing in a face region of a target image represented by target image data and a predetermined pattern to determine whether the target has a plane configuration or not (e.g. Step S33) and when it has a plane configuration, determines that the target is a non-specified person (e.g. Step S35).

Thus, since the device is structured to compare a pattern projected onto a target and a pattern appearing on the target to check whether the target has a plane configuration or a solid configuration and determine masquerading according to a check result, it can be determined that the target is masquerading when a plane object on which a false face is displayed such as a photograph or an image display device is used.

The data processing means may have a face detection means (e.g. a face detection unit 32) which detects a face region of a target image represented by target image data such that the masquerading determination means determines whether a target has a plane configuration or not by using a pattern appearing in a face region detected by the face detection means.

Thus providing the face detection means enables a face region of a target to be detected with ease to precisely execute masquerading detection.

The filter may have a striped pattern drawn thereon with a plurality of straight lines arranged in parallel to each other which cut off light transmission such that the masquerading determination means compares a pattern appearing in a face region of a target image represented by target image data and the striped pattern having the straight lines arranged in parallel to each other (e.g. Step S33) to determine whether the target has a plane configuration (e.g. Step S34).

Thus using the filter having a striped pattern drawn thereon which is made of a plurality of straight lines arranged in parallel to each other enables more precise determination whether the target has irregularities or not according to a projected pattern.

The target information obtaining means may have a filter rotation control means (e.g. a lighting control unit 22a) which rotates a filter for changing a pattern to be projected onto a target such that the filter rotation control means rotates the filter while selecting a rotation angle at random (e.g. Step S71) and the masquerading determination means determines whether a rotation angle of a pattern appearing in a face region detected by the face detection means is proper or not (e.g. Step S86) and unless it is proper, determines that the target is a non-specified person (e.g. Step S85).

Thus having a structure to rotate the filter by a rotation angle selected at random makes generation of a masquerading image difficult to increase masquerading detection precision.

The target information obtaining means may include a plurality of filters (e.g. a filter which a light with a plurality of filters 22b has) on which different patterns are drawn and a filter switching control means (e.g. a lighting control unit 21b) which executes switching processing of a filter for use in projecting a pattern onto a target such that the filter switching control means selects any of the plurality of filters at random to execute switching processing (e.g. Step S121) and the masquerading determination means determines whether a pattern appearing in a face region of the target is a pattern drawn on the filter which is selectively switched by the filter switching control means (e.g. Step S123) to determine that the target is a non-specified person unless the pattern is a pattern drawn on the filter.

Thus, having a structure of selecting a pattern to be projected at random by selecting a filter at random makes generation of a masquerading image difficult to increase masquerading detection precision.

The target information obtaining means may include a plurality of filters (e.g. a filter which a light with color filters 22c has) on which patterns are drawn in different colors and a filter switching control means (e.g. a lighting control unit 22c) which executes switching processing of a filter for use in projecting a pattern onto a target such that the filter switching control means selects any of the plurality of filters at random to execute switching processing (e.g. Step S141) and the masquerading determination means determines whether a pattern appearing in a face region of the target has color of a pattern drawn on the filter selectively switched by the filter switching control means (e.g. Step S154) to determine that the target is a non-specified person unless the pattern has the same color as that of the pattern drawn on the filter (e.g. Step S155).

Thus, having a structure to select color of a pattern to be projected at random by selecting a filter at random makes generation of a masquerading image difficult to increase masquerading detection precision.

The target information obtaining means may include a distance sensor (e.g. a distance sensor 24) located adjacent to the target image obtaining means and the storage means may include a feature storage means (e.g. a feature storage unit 42) in which distance information indicative of an appropriate distance between the target image obtaining means and a specific person is stored in advance such that the distance sensor measures a distance between the target image obtaining means and a target (e.g. Step 181) and the masquerading determination means compares the distance measured by the distance sensor and a distance indicated by distance information to determine whether the distance between the target image obtaining means and the target is within an appropriate range (e.g. Step S192) and when it is out of the appropriate range, determines that the target is a non-specified person (e.g. Step S193).

Thus, having a structure to determine that a target is masquerading unless a distance between the target image obtaining means and the target is within an appropriate range enables efficient masquerading determination without executing image processing.

An appropriate range may have a lower limit distance (e.g. a distance indicated by a threshold value to be compared with at Step S192) set in advance such that the masquerading determination means determines that a target is a non-specified person unless a distance between the target image obtaining means and the target is not less than the lower limit distance.

Thus, setting an appropriate range to have a lower limit distance enables masquerading to be determined when a target locates too close to the target image obtaining means.

An appropriate range may have a higher limit distance set in advance such that the masquerading determination means determines that a target is a non-specified person unless a distance between the target image obtaining means and the target is not more than the higher limit distance.

Thus, setting an appropriate range to have a higher limit distance enables masquerading to be determined when a target locates too far from the target image obtaining means.

The target information obtaining means may include an object sensor (e.g. an object sensor 25) located adjacent to the target image obtaining means, which object sensor senses a target located at a distance shorter than an appropriate distance between the target image obtaining means and a specific person and the storage means may include a feature storage means (e.g. the feature storage unit 42) in which a sensing result of the object sensor is stored such that the masquerading determination means (e.g. a masquerading detection unit 31e) determines whether a target is sensed by the object sensor and when sensed, determines that the target is a non-specified person.

Thus, having a structure to sense a target located at a distance shorter than an appropriate distance by using the object sensor enables masquerading determination when a target locates too close to the target image obtaining means.

The target information obtaining means may include a weighing unit (e.g. a scales 26) disposed at a predetermined position set in advance where a target is to be located when determining whether the target is a specific person or not and the storage means may include a feature storage means (e.g. the feature storage unit 42) in which weight information of each person registered in advance for determining whether it is a specific person or not is stored such that the weighing unit weighs a target located at a predetermined position (e.g. Step S221) and the masquerading determination means compares weight of the target obtained by the weighing unit and weight information stored in the feature storage means (e.g. Step S222) to determine whether the weight of the target is within an allowable weight range or not (e.g. Step S223) and when the weight is out of the allowable weight range, determines that the target is a non-specified person (e.g. Step S224).

Thus structuring the device to determine, when weight of a target is out of an allowable weight range, that it is masquerading enables efficient masquerading determination without executing image processing.

The masquerading determination means may be structured to determine whether weight of a target is within an allowable weight range or not after deciding the allowable weight range which includes a range from maximum weight to minimum weight in weight information stored in the feature storage means.

As described in the foregoing, structuring the device to decide an allowable weight range in advance enables change of weight information to be quickly coped with to enable masquerading determination with high precision.

The target information obtaining means may include a back light emitter (e.g. a back light 27) which irradiates a target with light from the back such that the target image obtaining means photographs a target irradiated with light from the back by lighting of the back light emitter to obtain backlighted image data indicative of the backlighted target (e.g. Step S262) and the masquerading determination means extracts a region whose luminance value in a backlighted image represented by the backlighted image data obtained by the target image obtaining means is not more than a predetermined value to separate a target region in the backlighted image from a background region (e.g. S272), determines whether a configuration of a boundary between the target region and the background region is a configuration of a human head (e.g. Step S275) and unless the configuration is a configuration of a human head, determines that the target is a non-specified person (e.g. Step S276).

Thus, having a structure to make masquerading determination by using backlighted image data enables, when a target is a specific person, masquerading detection without irradiating strong light which enters sight of the specific person, so that masquerading determination can be made without imposing a burden on the person.

The masquerading determination means may be structured to determine whether a target has a configuration of a human head according to whether a boundary between a target region and a background region takes a configuration approximate to an oval (e.g. Step S275).

Thus, having a structure to determine a configuration approximate to an oval configuration as a configuration of a head enables masquerading using, for example, a photograph or an image display device whose configuration is not approximate to an oval configuration, i.e. rectangular, to be detected with high precision.

The masquerading determination means may be structured to obtain a width of a target region (e.g. Step S273) to determine whether the target has a configuration of a human head according to whether a boundary between the target region and a background region takes a configuration approximate to an oval with the width of the target region as a minor axis.

Thus, having a structure to determine a configuration approximate to an oval whose minor axis is a width of a target region as a configuration of a head enables determination of a human head configuration to be made with high precision, thereby detecting masquerading with high precision.

The target information obtaining means may include two target image obtaining means (e.g. image input units 25A, 25B) such that the masquerading determination means generates a distance image of a target by using a visual difference between the two target image obtaining means (e.g. Step S323) to determine whether a configuration of a known face region in the distance image is plane or not (e.g. Step S324) and when it is plane, determines that the target is a non-specified person (e.g. Step S326).

Thus, having a structure to determine masquerading by using a distance image enables masquerading to be detected without fail by using an object whose configuration is plane.

The target information obtaining means may include two target image obtaining means (e.g. the image input units 25A, 25B) and the data processing means includes a face detection means (e.g. a face detection unit 32) which detects a face region of a distance image generated by the masquerading determination means such that the masquerading determination means generates a distance image of a target by using a visual difference between the two target image obtaining means (e.g. Step S323) to determine whether a configuration of a face region in the distance image detected by the face detection means is plane or not (e.g. Step S324) and when it is a plane configuration, determines that the target is a non-specified person (e.g. Step S326).

Thus, having a structure to determine masquerading by using a distance image enables masquerading using an object whose configuration is plane to be detected without fail.

The two target image obtaining means may be horizontally disposed, with one of which two target image obtaining means being arranged in front of a target.

Thus, arranging one of the target image obtaining means in front of a target allows the one target image obtaining means to be used also as an image obtaining means for use in identification processing, thereby enabling a face identification device to be structured at low costs.

The target information obtaining means may include three or more target image obtaining means such that the masquerading determination means selects two target image obtaining means from among the three or more target image obtaining means, generates a distance image of a target by using a visual difference between the selected two target image obtaining means and determines whether a configuration of a known face region in the distance image is plane or not to determine that the target is a non-specified person when the configuration is plane.

Thus having a structure to select two target image obtaining means from numbers of target image obtaining means enables a distance image to be generated more reliably to detect masquerading using an object having a plane configuration to be detected without fail.

The target information obtaining means may include three or more target image obtaining means and the data processing means may include a face detection means which detects a face region of a distance image generated by the masquerading determination means such that the masquerading determination means selects two target image obtaining means from among the three or more target image obtaining means, generates a distance image of a target by using a visual difference between the selected two target image obtaining means and determines whether a configuration of a face region in the distance image detected by the face detection means is plane or not to determine that the target is a non-specified person when the configuration is plane.

Thus having a structure to select two target image obtaining means from numbers of target image obtaining means enables a distance image to be generated more reliably to detect masquerading using an object having a plane configuration without fail.

As the target image obtaining means, an image input means (e.g. a near infrared image input unit 23i) which photographs a wavelength of a near infrared region may be used such that a light source of a light emitter (e.g. a light emitter which a near infrared light with a filter 22i has) emits light of a wavelength of a near infrared region.

Thus having a structure to emit light of a wavelength of a near infrared region prevents a human eye from seeing a pattern to make a masquerading detection method be hard to be noticed.

The masquerading detection device according to the present invention is a masquerading detection device that, for use in determining whether a target is a specific person or not, detects the target being a non-specified person who masquerades as the specified person, which includes a target information obtaining means (e.g. a person measurement unit 2d) having a target image obtaining means (e.g. the image input unit 23) which photographs a target to obtain target image data indicative of the target and a distance sensor (e.g. the distance sensor 24) disposed adjacent to the target image obtaining means, a storage means (e.g. a storage device 4d) having an image storage means (e.g. the image storage unit 41) which stores target image data and a feature storage means (e.g. the feature storage unit 42) in which distance information indicative of an appropriate distance between the target image obtaining means and the specific person is stored in advance, and a data processing means (e.g. a data processing device 3d) having a masquerading determination means (e.g. a masquerading determination unit 31d) which determines whether a target is a non-specified person or not, in which the distance sensor measures a distance between the target image obtaining means and a target (e.g. Step S181) and the masquerading determination means compares the distance measured by the distance sensor and a distance indicated by distance information to determine whether the distance between the target image obtaining means and the target is within an appropriate range or not (e.g. Step S192) and when the distance is out of the appropriate range, determines that the target is a non-specified person (e.g. Step S193).

Thus having a structure to determine that a target masquerades unless a distance between the target image obtaining means and the target is within an appropriate range enables efficient masquerading determination without executing image processing.

The masquerading detection device according to the present invention is a masquerading detection device that, for use in determining whether a target is a specific person or not, detects the target being a non-specified person who masquerades as the specified person, which includes a target information obtaining means (e.g. a person measurement unit 2e) having a target image obtaining means (e.g. the image input unit 23) which photographs a target to obtain target image data indicative of the target and an object sensor (e.g. the object sensor 25) disposed adjacent to the target image obtaining means, a storage means (e.g. a storage device 4e) having an image storage means (e.g. the image storage unit 41) which stores target image data and a feature storage means (e.g. the feature storage unit 42) in which a sensing result of the object sensor is stored, and a data processing means (e.g. a data processing device 3e) having a masquerading determination means (e.g. a masquerading determination unit 31e) which determines whether a target is a non-specified person or not, in which the object sensor senses a target located at a distance shorter than an appropriate distance between the target image obtaining means and a specific person and the masquerading determination means determines whether the target is sensed by the object sensor or not and when sensed, determines that the target is a non-specified person.

Thus having a structure to sense a target located at a distance shorter than an appropriate distance by using the object sensor enables masquerading determination when the target locates too close to the target image obtaining means.

The masquerading detection device according to the present invention is a masquerading detection device that, for use in determining whether a target is a specific person or not, detects the target being a non-specified person who masquerades as the specified person, which includes a target information obtaining means (e.g. a person measurement unit 2g) having a back light emitter (e.g. the back light 27) which illuminates a target with light from the back and a target image obtaining means (e.g. the image input unit 23) which photographs a target illuminated with light from the back by light emission of the back light emitter to obtain backlighted image data indicative of a backlighted target, a storage means (e.g. the storage device 4) having an image storage means (e.g. the image storage unit 41) which stores backlighted image data, and a data processing means (e.g. a data processing device 3g) having a masquerading determination means (e.g. a masquerading determination unit 31g) which determines whether a target is a non-specified person or not, in which the masquerading determination means extracts a region whose luminance value in a backlighted image represented by backlighted image data obtained by the target image obtaining means is not more than a predetermined value to separate a target region in the backlighted image from a background region (e.g. Step S272), determines whether a boundary between the target region and the background region has a configuration of a human head (e.g. Step S275) and determines that the target is a non-specified person unless the configuration is of a human head (e.g. Step S276).

Thus having a structure to determine masquerading by using backlighted image data enables, when a target is a specific person, masquerading to be detected without irradiating the specific person with strong light entering his sight, so that masquerading can be detected without imposing a burden on the person.

The masquerading detection device according to the present invention is a masquerading detection device that, for use in determining whether a target is a specific person or not, detects the target being a non-specified person who masquerades as the specified person, which includes a target information obtaining means (e.g. a person measurement unit 2h) having two target image obtaining means (e.g. image input units. 23A and 23B) which photograph a target to obtain target image data representing the target, a storage means (e.g. the storage device 4) having an image storage means (e.g. the image storage unit 41) which stores target image data, and a data processing means (e.g. a data processing device 3h) having a masquerading determination means (e.g. a masquerading determination unit 31h) which determines whether a target is a non-specified person or not, in which the masquerading determination means generates a distance image of a target by using a visual difference between the two target image obtaining means (e.g. Step S323) to determine whether a known face region in the distance image has a plane configuration or not (e.g. Step S325) and determines that the target is a non-specified person when the region has a plane configuration (e.g. Step S326).

Thus having a structure to conduct masquerading determination by using a distance image enables masquerading using a plane object to be detected without fail.

The masquerading detection method according to the present invention is a masquerading detection method, for use in determining whether a target is a specific person or not, of detecting the target being a non-specified person who masquerades as the specified person, which includes a step (e.g. Step S21) of irradiating a target with light transmitted by a filter on which a predetermined pattern is drawn (e.g. a filter which a light with a filter has) to project the pattern on the target, a step (e.g. Step S21) of photographing the target on which the predetermined pattern is projected to obtain target image data indicative of the target and a step (e.g. Steps S31 to S35) of comparing a pattern appearing in a face region of a target image represented by the target image data and the predetermined pattern to determine whether the target has a plane configuration or not and when it has a plane configuration, determining that the target is a non-specified person.

Since a pattern projected onto a target is thus compared with a pattern appearing on the target to check whether the target has a plane configuration or a solid configuration and conduct masquerading determination according to the check result, a plane object on which a false face is displayed such as a photograph or an image display device can be determined as masquerading.

The masquerading detection method according to the present invention is a masquerading detection method, for use in determining whether a target is a specific person or not, of detecting the target being a non-specified person who masquerades as the specified person, which includes a step (e.g. Step S181) of executing measurement processing of measuring a distance between a target image obtaining means for use in photographing a target and the target and a step (e.g. Step S182) of executing masquerading determination processing of determining whether the target is a non-specified person or not, in which the masquerading determination processing includes comparing a distance measured by the measurement processing and a predetermined appropriate distance between the target image obtaining means and a specific person to determine whether the distance between the target image obtaining means and the target is within an appropriate range (e.g. Step S192) and processing of determining that the target is a non-specified person when the distance is out of the appropriate range (e.g. Step S193).

Thus having a structure to determine masquerading unless a distance between the target image obtaining means and a target is within an appropriate range enables efficient masquerading determination without executing image processing.

The masquerading detection method according to the present invention is a masquerading detection method, for use in determining whether a target is a specific person or not, of detecting the target being a non-specified person who masquerades as the specified person, which includes a step of executing sensing processing (executed, for example, by the object sensor 25) of sensing a target locating at a distance shorter than an appropriate distance between the target image obtaining means which is used in photographing a target and a specific person and a step of executing masquerading determination processing (executed by the masquerading determination unit 31e, for example) of determining whether a target is a non-specified person or not, in which the masquerading determination processing includes processing of determining whether a target is sensed by the sensing processing or not and when sensed, determining that the target is a non-specified person.

Thus having a structure to sense a target located at a distance shorter than an appropriate distance enables a target locating too close to the target image obtaining means to be determined as masquerading.

The masquerading detection method according to the present invention is a masquerading detection method, for use in determining whether a target is a specific person or not, of detecting the target being a non-specified person who masquerades as the specified person, which includes a step (e.g. Step S262) of executing target image obtaining processing of photographing a target irradiated with light from the back by light emission of the back light emitter which irradiates a target with light from the back to obtain backlighted image data indicative of the target at a backlight state and a step (e.g. Step S263) of executing masquerading determination processing of determining whether a target is a non-specified person or not, in which the masquerading determination processing includes extracting a region whose luminance value in a backlighted image represented by backlighted image data obtained by the target image obtaining processing is not more than a predetermined value to separate a target region in the backlighted image from a background region (e.g. Step S272), determining whether a boundary between the target region and the background region has a configuration of a human head (e.g. Step S275) and processing of determining that the target is a non-specified person unless the configuration is that of a human head (e.g. Step S276).

Since thus having a structure to determine masquerading by using backlighted image data enables, when a target is a specific person, masquerading detection without irradiating strong light which enters sight of the specific person, masquerading determination can be realized without imposing a burden on the person.

The masquerading detection method according to the present invention is a masquerading detection method, for use in determining whether a target is a specific person or not, of detecting the target being a non-specified person who masquerades as the specified person, which includes a step (e.g. Step S311) of executing target image obtaining processing of photographing a target from two different directions to obtain two target image data indicative of the target and a step (e.g. Step S312) of executing masquerading determination processing of determining whether a target is a non-specified person or not, in which the masquerading determination processing includes processing of generating a distance image of a target by using a visual difference between the two target image obtaining means which execute target image obtaining processing (e.g. Step S323), determining whether a face region in the distance image has a plane configuration or not (e.g. Step S324) and determining that the target is a non-specified person when the region has a plane configuration (e.g. Step S326).

Thus having a structure to determine masquerading by using a distance image enables masquerading using a plane object to be detected without fail.

DESCRIPTION OF THE PREFERRED EMBODIMENT

In the following, embodiments of the present invention will be described with reference to the drawings.

Embodiment 1

Figure 1:
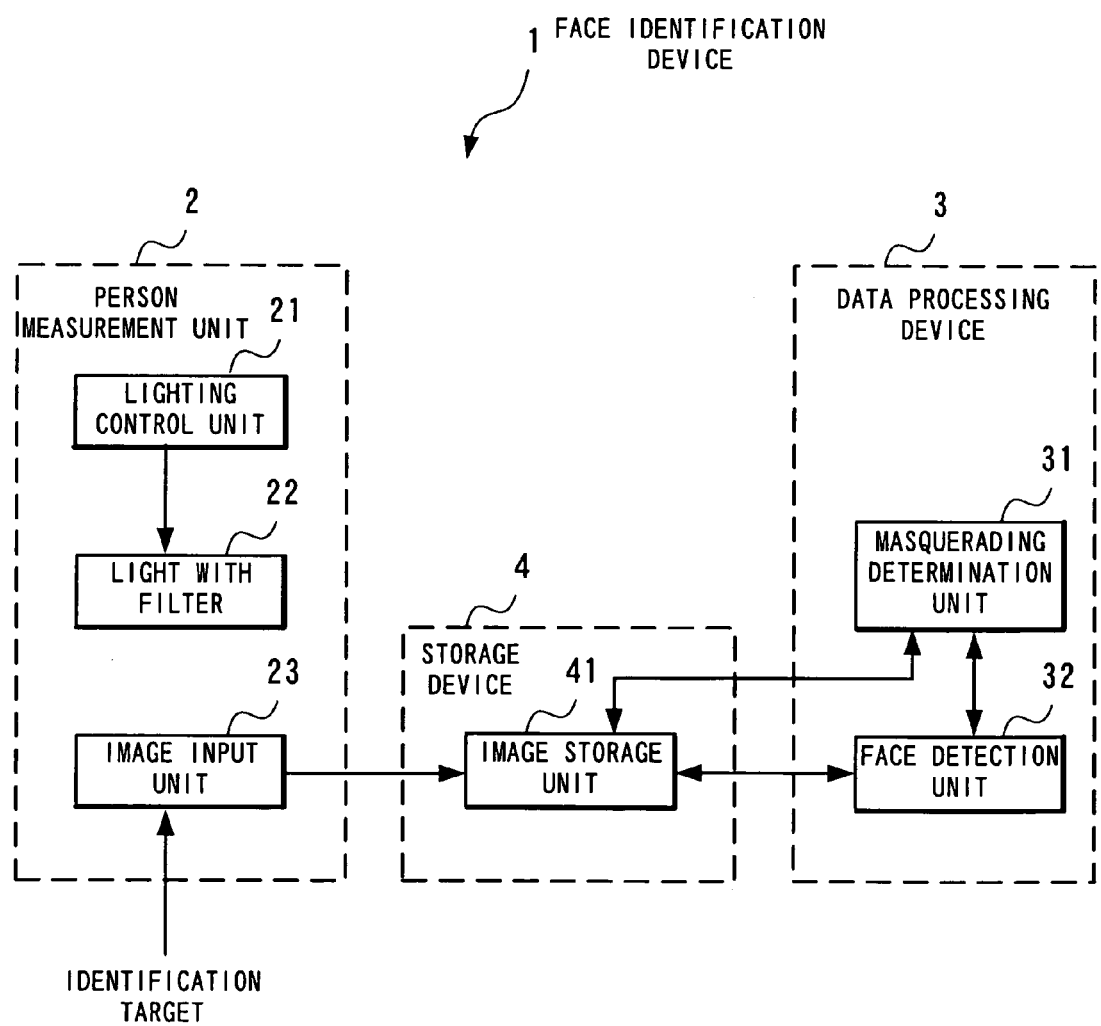
FIG. 1 is a block diagram showing an example of structure of a face identification device according to a first embodiment of the present invention.

FIG. 1 is a block diagram showing an example of structure of a face identification device 1 including a first embodiment of a masquerading detection device according to the present invention. The face identification device 1 includes a person measurement unit 2, a data processing device 3 and a storage device 4. The face identification device 1 is a device having a function of comparing an image indicative of a face region (denoting a region of a part of a person's face such as an eye, a nose and a mouth, the entire region of a person's face or a region including a person's face and its peripheries) of an identification target (photographing target) and an image indicative of a face region of a specific person and when the images indicative of the face regions are approximate enough to each other to determine that they are the same person, authenticating the identification target as the specific person.

The person measurement unit 2 has a function of measuring a photographing target (a photographing function) and a function of outputting a measurement value obtained by measurement (e.g. image data obtained by photographing) to the storage device 4. The person measurement unit 2 includes a lighting control unit 21, a light with a filter 22 and an image input unit 23.

The lighting control unit 21 has a function of turning on/off a lamp by controlling the light with a filter 22. The light with a filter 22 has a light source as lighting and a filter on which a striped pattern having straight lines arranged is drawn. Used as a light source of the light with a filter 22 is, for example, a halogen lamp with a filter attached. The filter attached to the light with a filter 22 is disposed at a position where a pattern is projected onto a photographing target when the light is turned on. The filter has a striped pattern having straight lines arranged in parallel to each other drawn by ink which prevents transmission of light of a halogen lamp.

The image input unit 23 executes processing of photographing a photographing target when the light with a filter 22 is turned on and outputting obtained image data to the storage device 4 to cause an image storage unit 41 to store the data. Used as the image input unit 23 is, for example, a CCD camera. Image photographing devices such as a digital camera and a digital video camera may be used as the image input unit 23.

The storage device 4 has a function of storing and holding a measurement value obtained by the person measurement unit 2. The storage device 4 includes the image storage unit 41 formed of a storage medium such as an RAM. The image storage unit 41 is formed, for example, of a magnetic disk storage device.

The data processing device 3 has a function of reading data stored and held by the storage device 4 to determine whether an identification target masquerades as a specific person or not (masquerading determination function). The data processing device 3 includes a masquerading determination unit 31 and a face detection unit 32. Used as the data processing device 3 is, for example, a personal computer. The personal computer has a CPU (central processing unit) which functions as the masquerading determination unit 31 and the face detection unit 32.

The face detection unit 32 has a function of reading image data stored in the image storage unit 41 to specify a face region in an image represented by the image data. The masquerading determination unit 31 has a function of reading image data stored in the image storage unit 41 to determine based on an image of a face region specified by the face detection unit 32 whether an identification target masquerades as a specific person or there might be no masquerading.

Any method may be used for specifying a face position in an image by the face detection unit 32. It is possible, for example, with an image (an image including only a background) photographed by the image input unit 23 to have no identification target located at a photographing position and stored in the image storage unit 41 in advance, photograph a photographing target and then read the image including only the background and the photographed image from the image storage unit 41 and extract a region of the photographing target by taking a difference between the background image and the photographed image to specify an upper part of the extracted region (an upper region in a predetermined range which is expected to have a face locating) as a face region. It is also possible, for example, to read an image from the image storage unit 41 and extract a skin color region in the image (skin color detection) to detect a face region.

Figure 2:
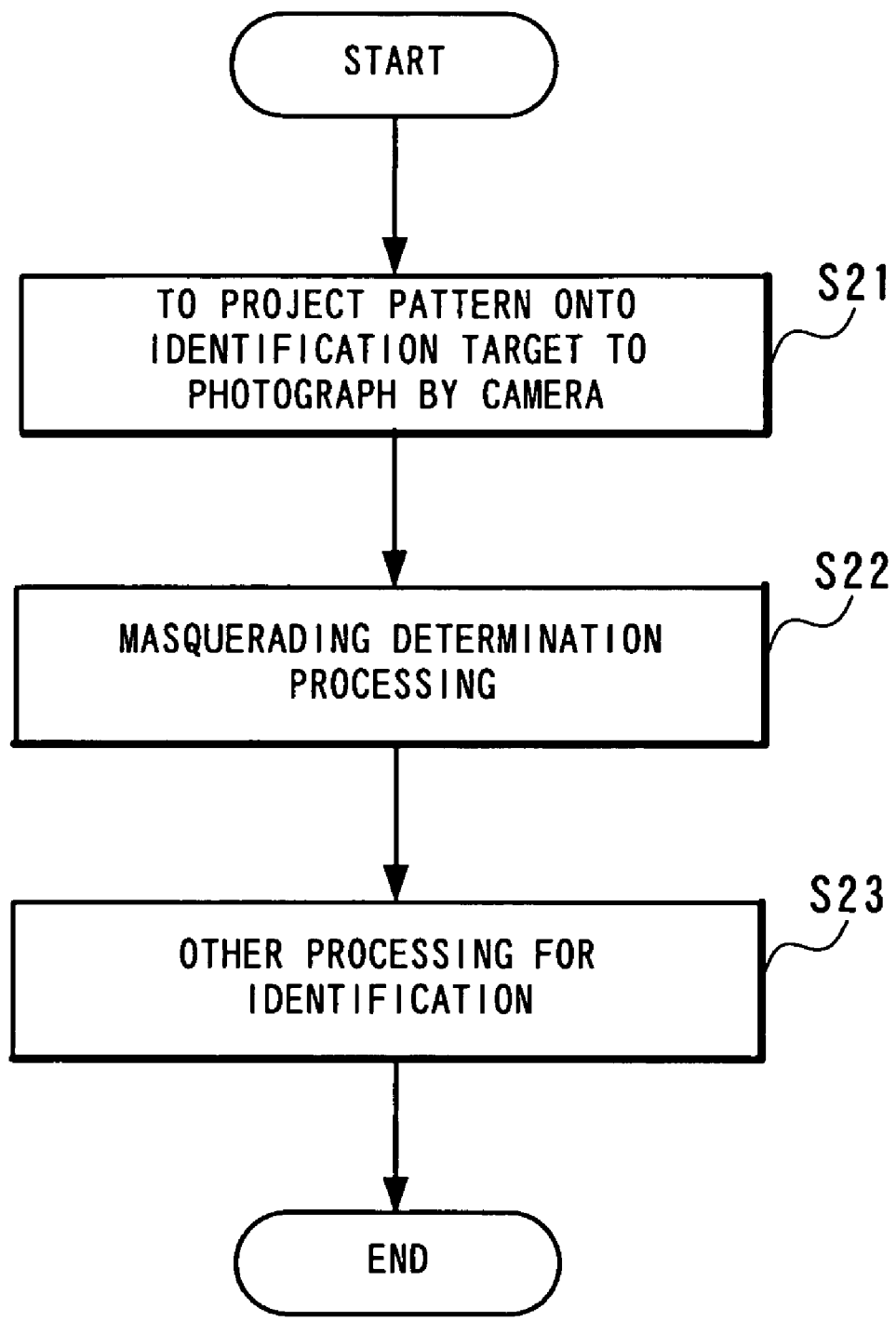
FIG. 2 is a flow chart showing an example of face identification processing according to the first embodiment of the present invention.

FIG. 2 is a flow chart showing an example of face identification processing executed by the face identification unit 1 in the first embodiment. In the face identification processing, the person measurement unit 2 turns on the light with a filter 22 to project a striped pattern onto a photographing target, photographs, by means of the image input unit 23, the photographing target on which the striped pattern is projected and outputs image data obtained by the photographing to the storage device 4 to store the data in the image storage unit 41 (Step S21).

More specifically, executed at Step S21 is processing of turning on a halogen lamp (the light with a filter 22) in which a filter is disposed to project the pattern onto the photographing target and photographing, by means of a CCD camera (the image input unit 23), the photographing target with the pattern projected to store image data obtained by the photographing in the image storage unit 41.

Subsequently, the face detection unit 32 reads the image data from the image storage unit 41 and detects a face region of an image represented by image data to output a detection result to the masquerading determination unit 31. The masquerading determination unit 31 reads the image data from the image storage unit 41 and specifies a face region in the image represented by the image data by using the detection result obtained by the face detection unit 32 to determine whether the identification target is used for masquerading or not (Step S22). In other words, executed at Step S22 is masquerading determination processing by using an image photographed by the image input unit 23.

Then, the face identification device 1 executes other processing for face identification (Step S23). At Step S23, when the masquerading determination processing determines that it is masquerading using the identification target, determine that the identification target is not a specific person to decide not to authenticate the identification target as the specific person. On the other hand, when the masquerading determination processing determines that it might not be masquerading using the identification target (when a possibility of being the specific person is undeniable), further execute various kinds of processing of determining whether the identification target is a specific person to decide or not to decide to authenticate the identification target as the specific person. Since the above-described various kinds of determination processing are not directly related to the present invention, no detailed description will be made thereof.

Figure 3:
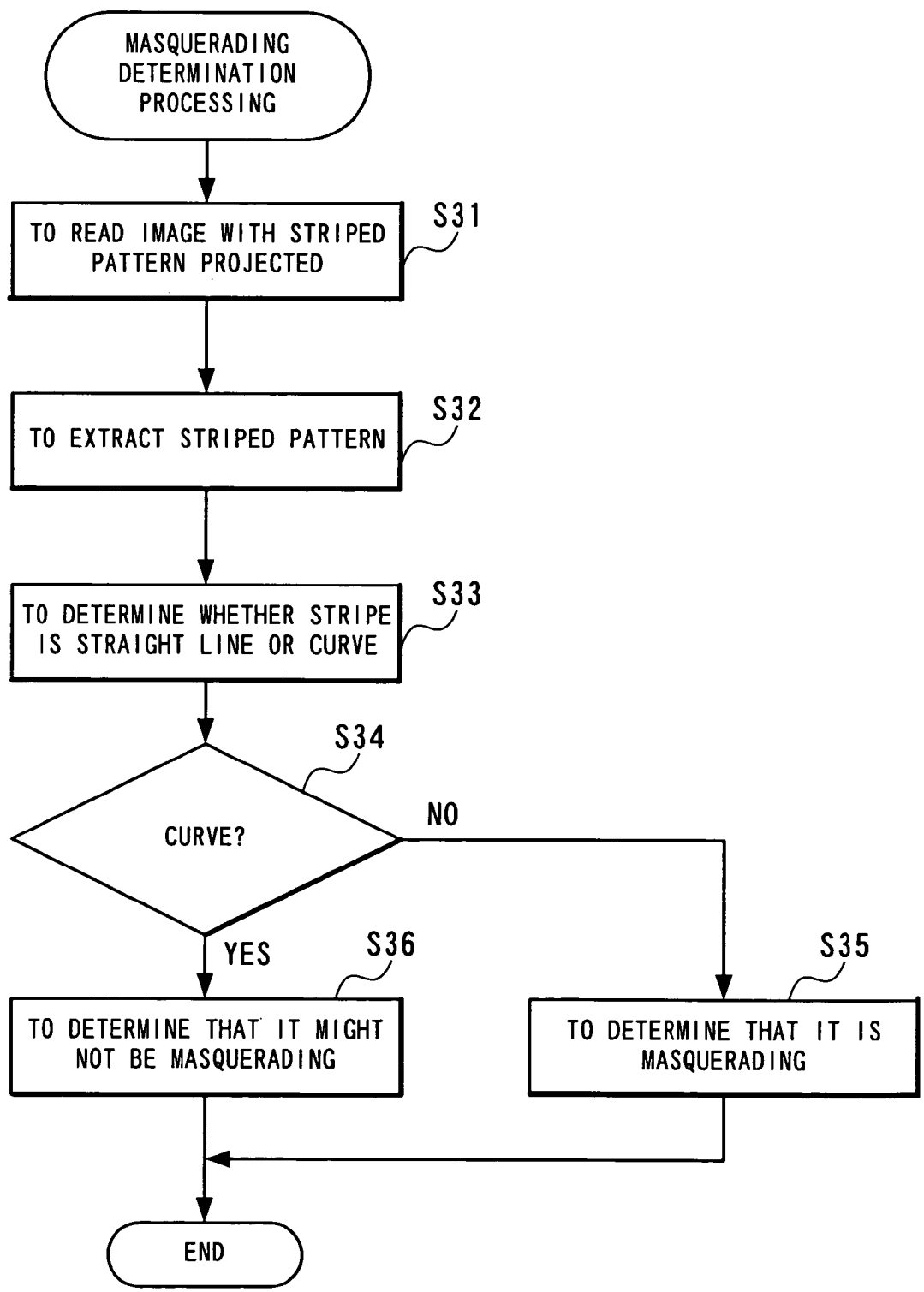
FIG. 3 is a flow chart showing an example of masquerading determination processing according to the first embodiment of the present invention.

FIG. 3 is a flow chart showing an example of the masquerading determination processing (Step S22) in the first embodiment. In the masquerading determination processing, the masquerading determination unit 31 reads the image data representing the image of the identification target on which the striped pattern is projected from the image storage unit 41 (Step S31) to extract the striped pattern appearing in the face region of the image represented by the read image data (Step S32).

Figure 4:
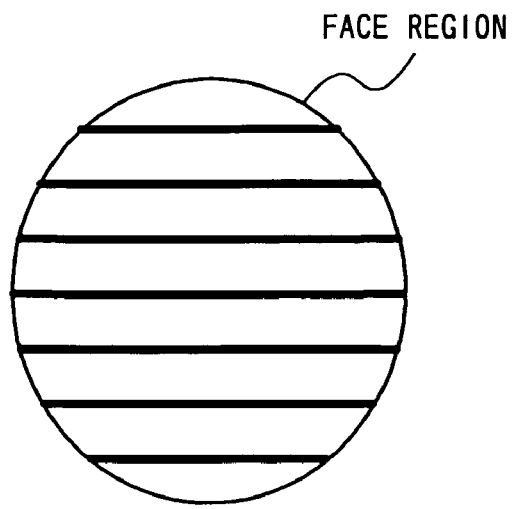
FIG. 4 is a diagram for use in explaining an example of a striped pattern extracted in the masquerading determination processing in the first embodiment of the present invention.
Figure 5:
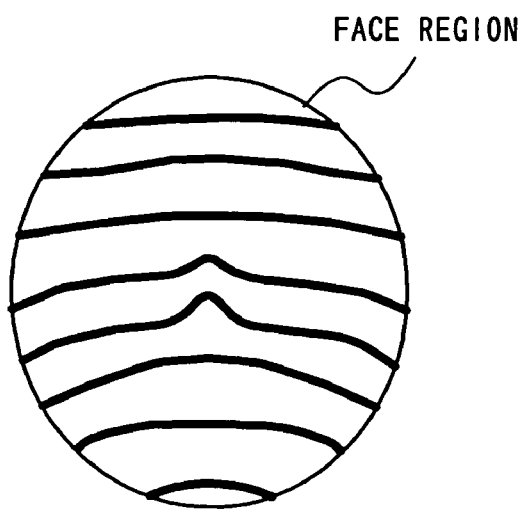
FIG. 5 is a diagram for use in explaining an example of a striped pattern extracted in the masquerading determination processing in the first embodiment of the present invention.

FIG. 4 is a diagram for use in explaining an example of a striped pattern extracted when the identification target is a plane object such as a photograph of a person or an image display device which displays a person. FIG. 5 is a diagram for use in explaining an example of a striped pattern extracted when the identification target is a solid object such as a person himself. More specifically, when a striped pattern with straight lines arranged in parallel to each other is projected onto a plane object, the same pattern as the projected striped pattern will appear in the face region of the identification target as illustrated in FIG. 4. When a striped pattern with straight lines arranged in parallel to each other is projected onto a solid object, a striped pattern in which curves obtained by deforming the straight lines by solid irregularities (e.g. irregularities on the face such as a nose) are arranged will appear in the face region of the identification target as illustrated in FIG. 5. At Step S32, either such a striped pattern as shown in FIG. 4 or that as shown in FIG. 5 is extracted depending on whether the identification target has a plane configuration or a solid configuration.

When the striped pattern appearing in the face region is extracted, the masquerading determination unit 31 determines whether the stripes of the face region in the image are straight lines or not (Step S33). When the stripes are the straight lines (N at Step S34), because determination can be made that the identification target is a plane object such as a photograph or an image display device to determine that it is at least not a person himself, determine that the target masquerades (Step S35). On the other hand, when the stripes are not straight lines (Y at Step S34), because the identification target has a solid configuration having three-dimensional irregularities to have a possibility of being a person himself, determine that the target might not masquerade (Step S36).

Figure 6:
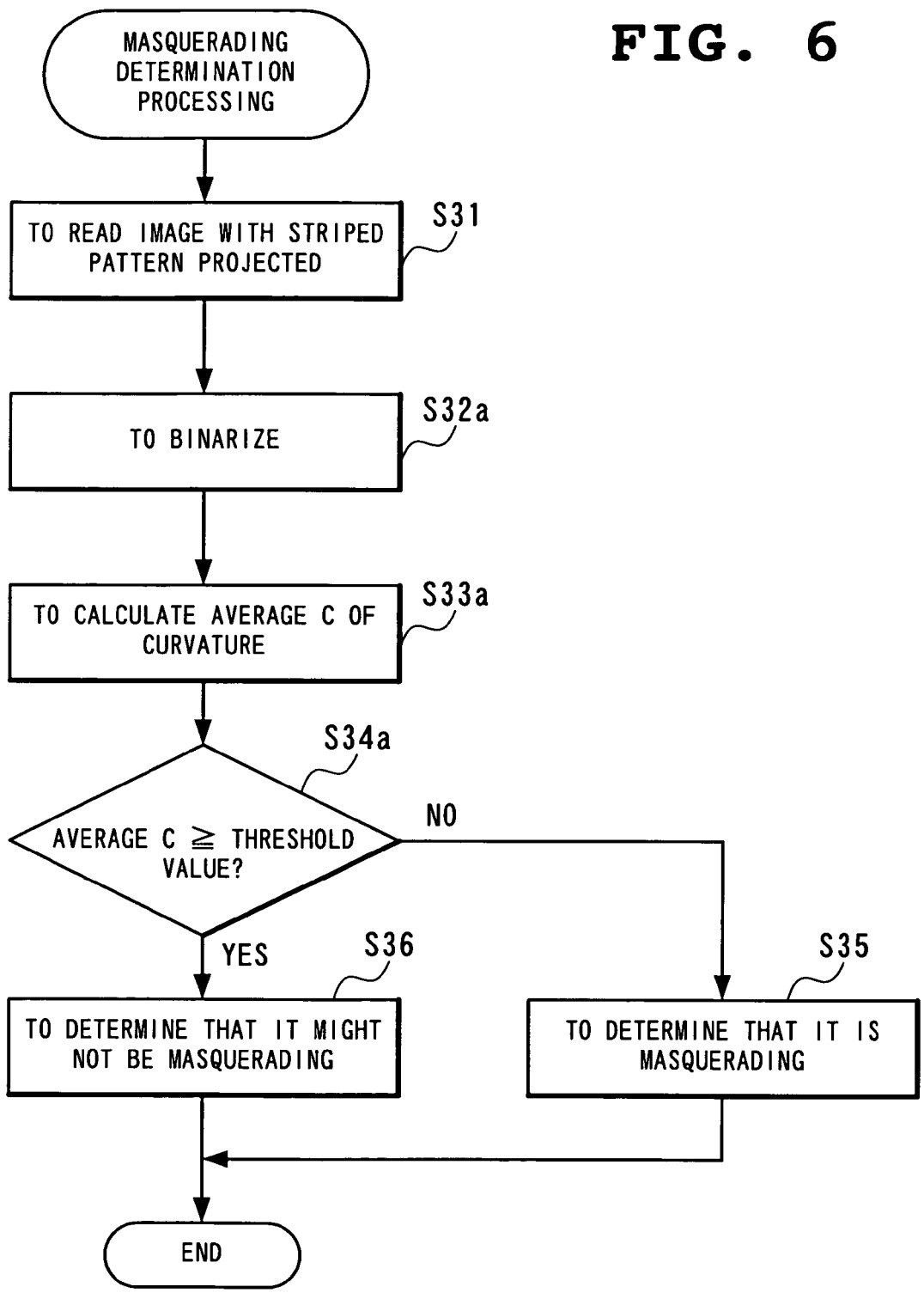
FIG. 6 is a flow chart showing a specific example of the masquerading determination processing in the first embodiment of the present invention.

FIG. 6 is a flow chart showing a specific example of processing of determining whether the stripes are straight lines or not (Step S32 to Step S34) as a part of the masquerading determination processing (Step S22, the processing in FIG. 3) in the first embodiment. As illustrated in FIG. 6, the masquerading determination unit 31 binarizes an image represented by the image data read from the image storage unit 41 at Step S31 according to a luminance value (Step S32a). In other words, extract a striped pattern appearing in the face region of the image by binarizing the image.

When extracting the striped pattern appearing in the face region, the masquerading determination unit 31 calculates an average C of a curvature of the stripes appearing in the face region in order to determine whether the stripes of the face region in the image are straight lines or not (Step S33a).

When the average C is less than a threshold value set in advance (N at Step S34a), because determination can be made that the identification target is a plane object such as a photograph or an image display device to determine that it is at least not a solid object such as a person himself, determine that the target masquerades (Step S35). In other words, in the example, when the average C of the curvature of the stripes is less than a threshold value, determine that the stripes are straight lines.

In this example, the threshold value compared at Step S34a is set to be a value which enables determination that it is masquerading when the average C of the curvature has a small value to an extent that the stripes can be considered straight lines.

On the other hand, when the average C is not less than the preset threshold value (Y at Step S34a), because the identification target has a solid configuration having three-dimensional irregularities to have a possibility of being a person itself, determine that it might not be masquerading (Step S36). In other words, in this example, when the average C of the curvature of the stripes is not less than the threshold value, determine that the stripes are not straight (i.e. curve) (see Y at Step S34).

Thus, since the above-described first embodiment is structured to check whether an identification target has a plane configuration or a solid configuration according to the degree of change of a pattern projected onto the identification target to determine masquerading based on the check result, it is possible to determine use of a plane object such as a photograph or an image display device as an identification target as masquerading.

In addition, because the face identification device 1 is structured to actively project a pattern onto an identification target by using the light with a filter 22, the above-described first embodiment is less liable to be affected by a change of photographing environments of the image input unit 23. In other words, because a pattern is actively irradiated by the light with a filter 22, the pattern can be reliably projected onto an identification target without being affected by light of other lighting (e.g. light such as a room light other than the light with a filter 22) disposed in the vicinity of the image input unit 23.

While in the above-described first embodiment, in order to obtain a face region in an image, a face is detected by the face detection unit 32, when a person to be photographed can be taught to locate his/her face at a specific position in the image, such a specific position may be processed as a face region. In this case, masquerading determination processing can be executed by the masquerading determination unit 31 without requiring the face detection unit 32.

Embodiment 2

Figure 7:
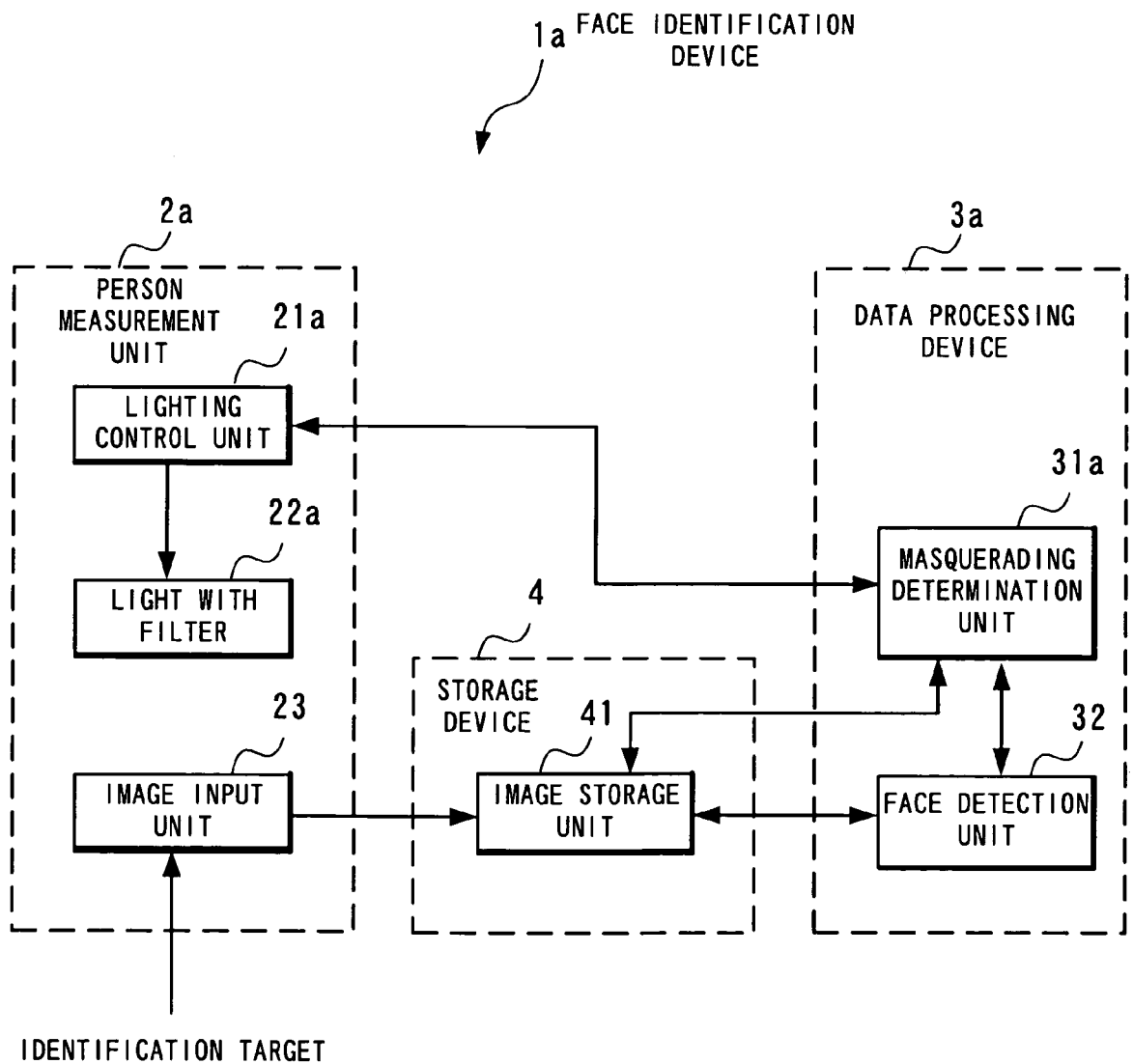
FIG. 7 is a block diagram showing an example of structure of a face identification device according to a second embodiment of the present invention.

FIG. 7 is a block diagram showing an example of structure of a face identification device 1a including a second embodiment of the masquerading detection device according to the present invention. In the following description, the same structure and parts executing the same processing as those of the above-described face identification device 1 in the first embodiment are given the same reference numerals to omit their detailed description.

As illustrated in FIG. 7, the face identification device 1a includes a person measurement unit 2a, a data processing device 3a and the storage device 4. The person measurement unit 2a includes a lighting control unit 21a, a light with a filter 22a and the image input unit 23. The data processing device 3a includes a masquerading determination unit 31a and the face detection unit 32.

The lighting control unit 21a has a function of controlling the light with a filter 22a to turn on/off a lamp, a function of controlling a rotation angle of the filter attached to the light with a filter 22a and a function of transmitting angle information indicative of a set rotation angle of the filter to the masquerading determination unit 31a. The angle information is, for example, information indicative of a rotation angle from a reference position set in advance (e.g. a position which makes straight lines forming a pattern be horizontally drawn).

The light with a filter 22a has a light source as lighting and a filter on which a striped pattern having straight lines arranged is drawn. The filter attached to the light with a filter 22 is rotatably disposed at a position in which a pattern is projected onto a photographing target by turning on the light. On this filter, a striped pattern having straight lines arranged in parallel to each other is drawn with ink which prevents transmission of light of a halogen lamp as a light source. Therefore, every time photographing by the image input unit 23 is executed, for example, the light with a filter 22a has the filter rotated by the control of the lighting control unit 21a to project a striped pattern of a different angle onto an identification target (an object to be photographed).

The masquerading determination unit 31a has a function of reading image data stored in the image storing unit 41, as well as obtaining angle information from the lighting control unit 21a. The masquerading determination unit 31a has a function of determining whether an identification target masquerades or there exists a possibility of no masquerading based on an image of a face region specified by the face detection unit 32 and a rotation angle represented by obtained angle information.

Figure 8:
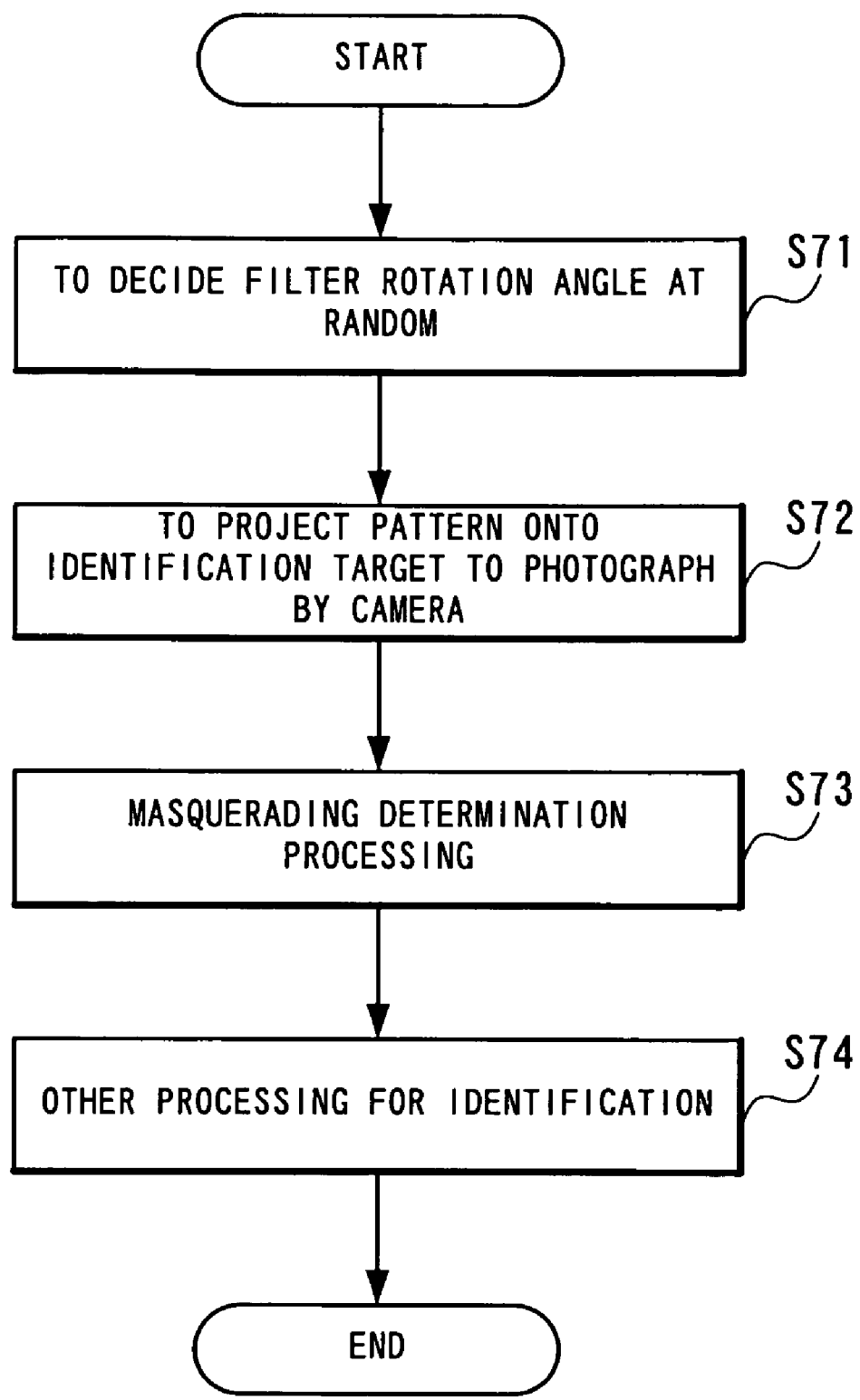
FIG. 8 is a flow chart showing an example of face identification processing according to the second embodiment of the present invention.

FIG. 8 is a flow chart showing an example of face identification processing executed by the face identification device 1a in the second embodiment. In the face identification processing, the lighting control unit 21a at random decides a rotation angle of the filter of the light with a filter 22a such that a person to be authenticated can not predict and rotates the filter such that the filter is rotated from a reference position by the decided angle to adjust a rotation angle of the filter (Step S71).

In the present embodiment, the lighting control unit 21a is assumed to have a function of adjusting the filter rotation angle every 30 degrees. At Step S71, the lighting control unit 21a decides a filter rotation angle within a range from 0 degree (state at a reference position) to 180 degrees at random. The rotation angle may be selected, for example, from the four angles, 30 degrees, 60 degrees, 90 degrees and 120 degrees. Since the more minute the filter rotation angle adjustment becomes, the higher the masquerading detection precision becomes, selection may be made from more kinds of angles or the number of angles may be three or less.

When the filter rotation angle is adjusted, the person measurement unit 2a turns on the light with a filter 22a to project a striped pattern onto an identification target, photographs the identification target on which the striped pattern is projected by means of the image input unit 23 and outputs image data obtained by the photographing to the storage device 4 to store the same in the image storage unit 41 (Step S72). At the time of photographing, since the filter rotation angle is set at random, the angle of a striped pattern to be projected is set at random as well.

More specifically, processing executed at Step S72 is turning on the halogen lamp with a filter (the light with a filter 22a) to project the pattern of the angle set at random onto the identification target and photographing the identification target with the pattern projected by means of a CCD camera (the image input unit 23) to store image data obtained by the photographing in the image storage unit 41.

Next, the face detection unit 32 reads the image data from the image storage unit 41 to detect a face region of an image represented by the image data and outputs a detection result to the masquerading determination unit 31a. The masquerading determination unit 31a reads the image data from the image storage unit 41 to determine by using the detection result of the face detection unit 32 whether the identification target masquerades or not (Step S73). In other words, the masquerading determination processing is executed at Step S73 by using the image photographed by the image input unit 23.

Then, the face identification device 1a executes other processing for face identification (Step S74; the same processing as that of the above-described Step S23 is executed).

Figure 9:
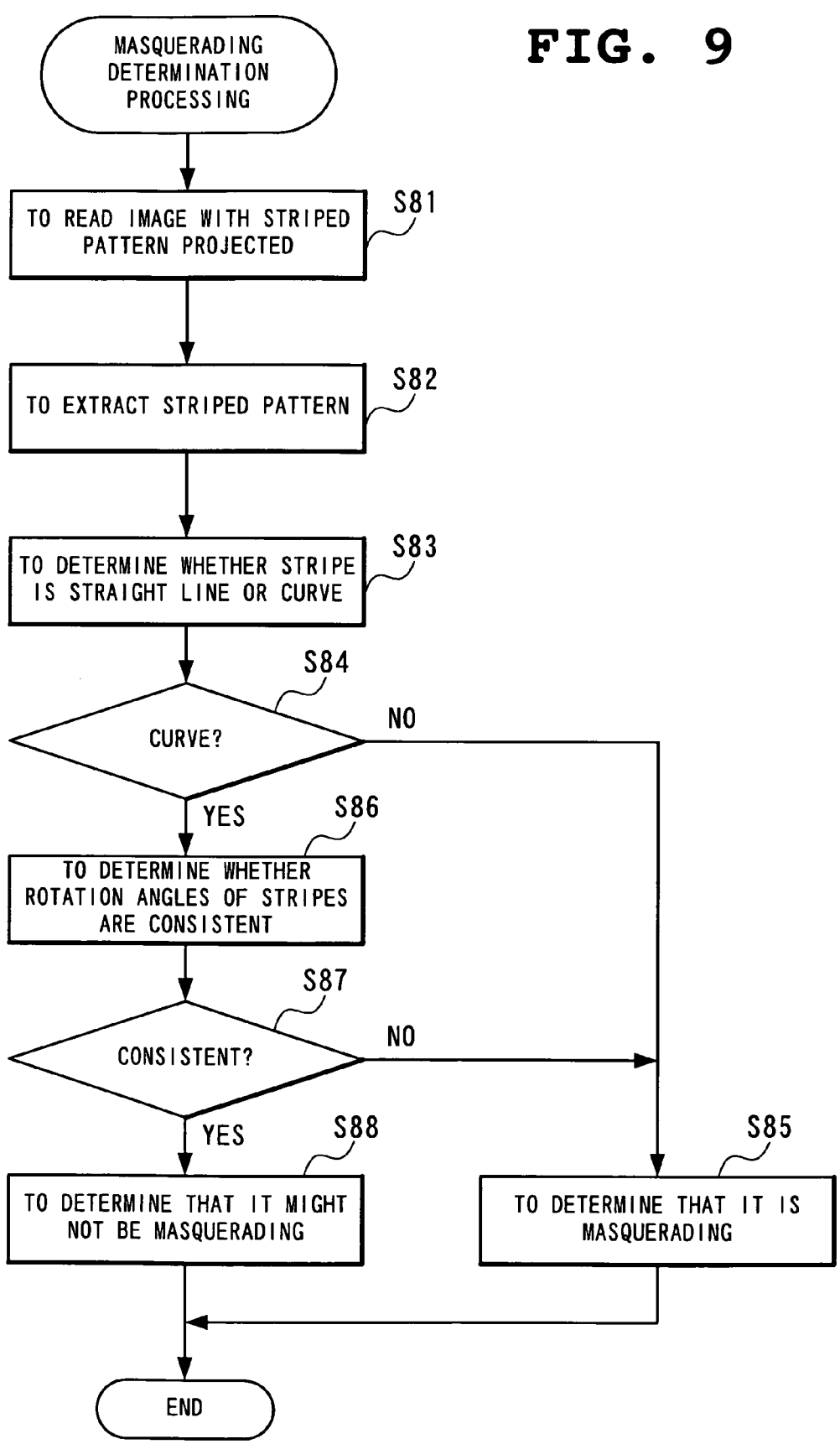
FIG. 9 is a flow chart showing an example of masquerading determination processing according to the second embodiment of the present invention.

FIG. 9 is a flow chart showing an example of the masquerading determination processing (Step S73) in the second embodiment. In the masquerading determination processing, the masquerading determination unit 31a reads image data representing an image of an identification target on which a striped pattern is projected from the image storage unit 41 (Step S81) to extract a striped pattern appearing in a face region of the image represented by the read image data (Step S82).

Figure 10:
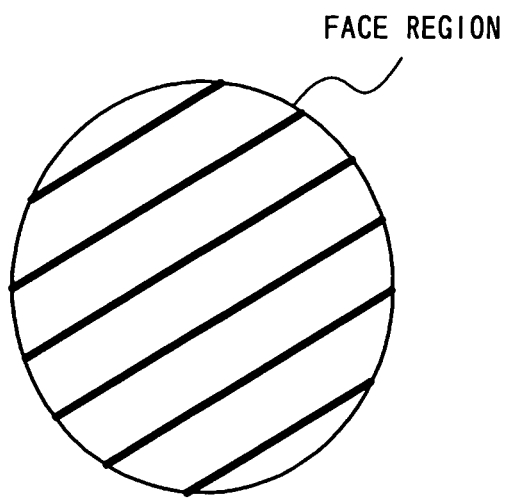
FIG. 10 is a diagram for use in explaining an example of a striped pattern extracted in the masquerading determination processing in the second embodiment of the present invention.
Figure 11:
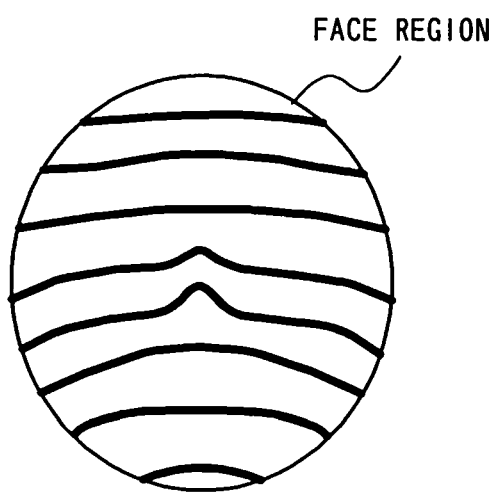
FIG. 11 is a diagram for use in explaining an example of a striped pattern extracted in the masquerading determination processing in the second embodiment of the present invention.
Figure 12:
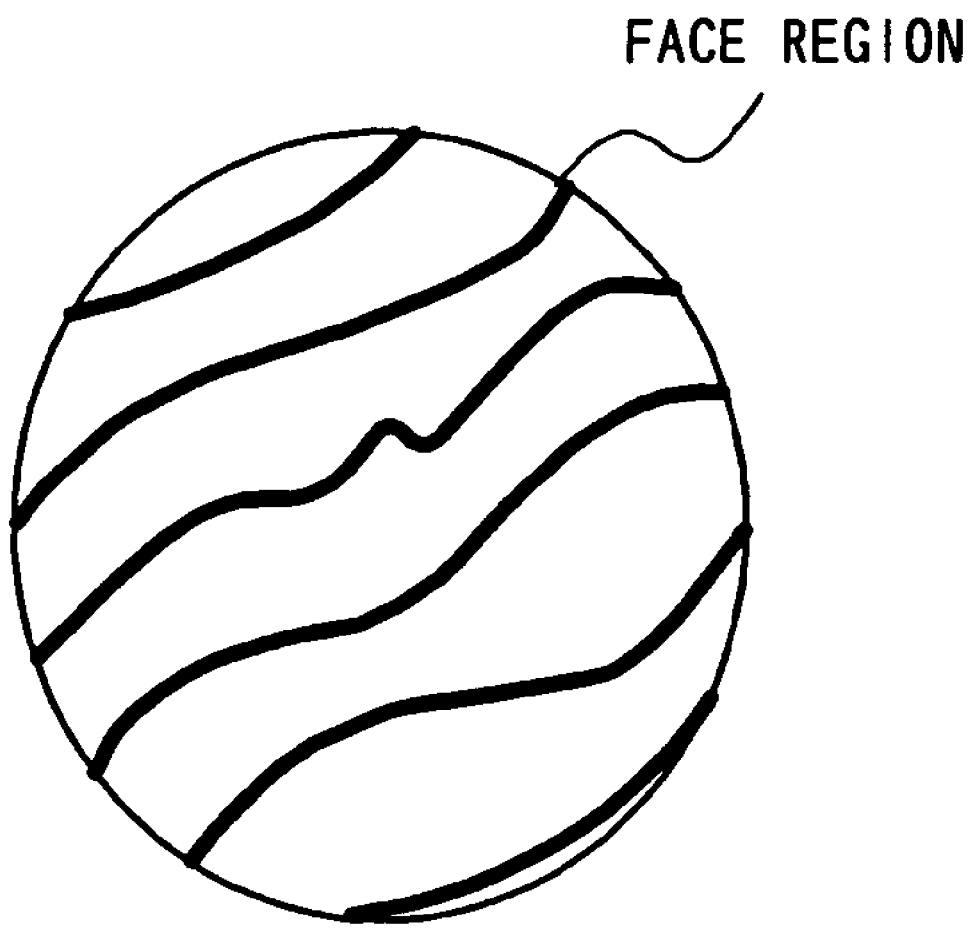
FIG. 12 is a diagram for use in explaining an example of a striped pattern extracted in the masquerading determination processing in the second embodiment of the present invention.

FIG. 10 is a diagram for use in explaining an example of a striped pattern extracted when an identification target is a plane object such as a picture of a photographed person or an image display device which displays a person. FIG. 11 is a diagram for use in explaining an example of a striped pattern extracted when an identification target is a picture taken with a pattern projected (an example of a masquerading image) or an image display device which displays an image (an example of a masquerading image) obtained by photographing with a pattern projected (Although illustrated is only a pattern projected at the time of photographing of the masquerading image, the pattern shown in FIG. 10 will also appear in practice. When a person who masquerades executes processing of cutting off light from the light with a filter 22a (e.g. processing of putting a shielding object such as cloth between the light with a filter 22a and the identification target), the pattern shown in FIG. 11. will appear). FIG. 12 is a diagram for use in explaining an example of a striped pattern extracted when an identification target is a solid object such as a person himself.

More specifically, when a striped pattern with straight lines arranged in parallel to each other is projected onto an object having a plane configuration, the same pattern as that projected will appear in a face region of the identification target at a predetermined angle calculated from a projecting angle as illustrated in FIG. 10. On the other hand, when a photograph or an image display device in which a masquerading image is displayed is used as an identification target, a striped pattern having such curves as if obtained by deforming straight lines by solid irregularities as shown in FIG. 11 appear in the face region of the identification target, with its angle being the same as that of a pattern which is projected at the time of generating the masquerading image. Furthermore, in a case where a striped pattern with lines arranged in parallel to each other is projected onto a solid object, a striped pattern having curves obtained by deforming, by solid irregularities, straight lines of a predetermined angle which is calculated from a projecting angle will appear in the face region of the identification target as illustrated in FIG. 12. At Step S82, when the identification target has a plane configuration, such a striped pattern as illustrated in FIG. 10 or FIG. 11 will be extracted and when the identification target has a solid configuration, such a striped pattern as illustrated in FIG. 12 will be extracted.

When extracting a striped pattern appearing in a face region, the masquerading determination unit 31a determines whether the stripes in the face region in the image are straight lines or not (Step S83). When the stripes are straight lines (N at Step S84), because the identification target is a plane object such as a photograph or an image display device to allow determination that it is at least not a person himself, determine that the target masquerades (Step S85). In other words, when such a striped pattern as shown in FIG. 10 is extracted, determination is made that the target masquerades.

Unless the stripes are straight lines (Y at Step S84), the masquerading determination unit 31a derives a rotation angle of the striped pattern appearing in the face region to determine whether a rotation angle of the filter set by the control of the lighting control unit 21a and a rotation angle of the projected striped pattern have consistency or not (Step S86). Unless they have consistency (N at Step S87), considering that masquerading is conducted by using a masquerading image such as displaying of a person with a pattern projected in a photograph or on an image display device as an identification target, determine that the target masquerades (Step S85). In other words, when such a striped pattern as shown in FIG. 11 is extracted, the determination is made that it is masquerading. When the angles have consistency (Y at Step S87), the person himself as the identification target has a solid configuration having three-dimensional irregularities to have a possibility of being a person himself, so that the determination is made that the target might not masquerade (Step S88). In other words, when such a striped pattern as shown in FIG. 12 is extracted, the determination will be made that the target might not masquerade.

Figure 13:
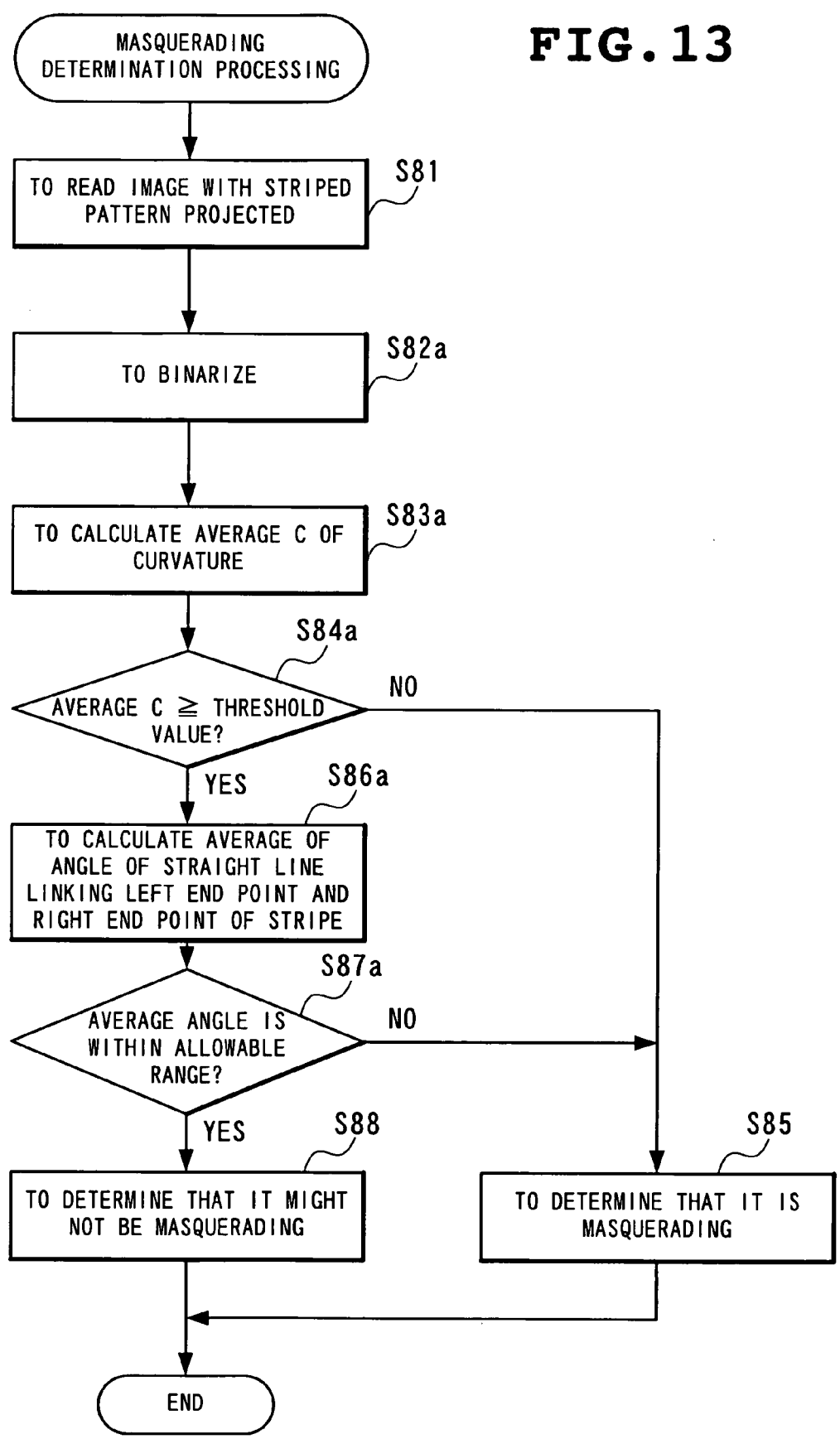
FIG. 13 is a flow chart showing a specific example of the masquerading determination processing in the second embodiment of the present invention.

FIG. 13 is a flow chart showing a specific example of processing (Step S82 to Step S84) of determining whether a stripe is a straight line or not and processing of determining whether rotation angles of the stripes have consistency or not (Step S86, Step S87) as a part of the masquerading determination processing in the second embodiment (Step S73, the processing in FIG. 9). Since Steps S82a to S84a in FIG. 13 have the same processing as the above-described processing at Steps S32a to S34a in FIG. 6, no detailed description will be made thereof.

When determining at Step S84a that the average C is not less than a threshold value set in advance (the stripe is a curve), the masquerading determination unit 31a traces all the projected stripes from the right end to the left end of the face region to calculate an average of an angle of a straight line linking the left end point and the right end point (Step S86a). Subsequently, the masquerading determination unit 31a obtains an angle T of a projected line which is calculated from the filter rotation angle set by the control of the lighting control unit 21a to compare the average angle calculated at Step S86a and the angle T. Then, unless the average angle is within a predetermined angle (e.g. 30 degrees) centered around the angle T (N at Step S87a), considering that there exists a stripe artificially formed with the intention of masquerading, determine that it is masquerading (Step S85) and when the average angle is within the predetermined angle centered around the angle T (Y at Step S87a), determine that it might not be masquerading (Step S88).

The angle T is calculated, for example, based on an angle of a projected line from a reference position, a position of the lighting (the light with a filter 22a) (including a filter position), a position of the image input unit 23 and a position of an identification target.

Thus, since the above-described second embodiment is structured to check whether an identification target has a plane configuration or a solid configuration based on the degree of change of a pattern projected onto the identification target to execute masquerading determination according to the check result, a plane object such as a photograph or an image display device used as an identification target can be determined as masquerading.

In addition, since the above-described second embodiment is structured to check whether an identification target is a masquerading image or not based on whether an angle of a pattern projected onto the identification target and an angle of a pattern appearing in a photographed image have consistency or not and execute masquerading determination according to the check result, even face identification by using a masquerading image formed by an image display device or the like can be determined as masquerading.

Moreover, being structured to decide an angle of a pattern to be projected onto an identification target at random disables prediction of the angle of the pattern to be projected onto the identification target. Accordingly, even when operation of detecting masquerading by the identification device 1a is known to a person who intends to masquerade, it is difficult to generate a masquerading image that enables masquerading detection to be prevented, which makes it impossible to generate a masquerading image that enables masquerading detection to be avoided without fail. In other words, masquerading can be detected with high precision even when a person who intends to masquerade covers the light with a filter 22a to cut off light from the light with a filter 22a, thereby avoiding detection of masquerading which uses a masquerading image formed using an image display device or the like.

Furthermore, being structured to have the face identification device 1a actively project a pattern onto an identification object by using the light with a filter 22a, the above-described second embodiment is less liable to be affected by a change of photographing environments of the image input unit 23. In other words, since a pattern is actively irradiated by the light with a filter 22a, the pattern can be reliably projected onto the identification target without being affected by light of other lighting (e.g. a light such as a room light other than the light with a filter 22a) disposed on the periphery of the image input unit 23.

While in the above-described second embodiment, in order to obtain a face region in an image, a face is detected by the face detection unit 32, when a person to be photographed can be taught to put his/her face at a specific position in the image, such a specific position can be processed as a face region. In this case, masquerading detection processing can be executed by the masquerading determination unit 31a without requiring the face detection unit 32.

In addition, although not mentioned in the above-described second embodiment, in particular, an identification target may be determined as masquerading in a case where when the target is photographed by the image input unit 23 before projecting a striped pattern onto the identification target (prior to Step S72), if a striped pattern appears in a face region in an image obtained by the photographing. In other words, when a striped pattern already exists before the identification device 1a projects a striped pattern, the striped pattern may be considered a masquerading image to determine that the target masquerades.

Embodiment 3

Figure 14:
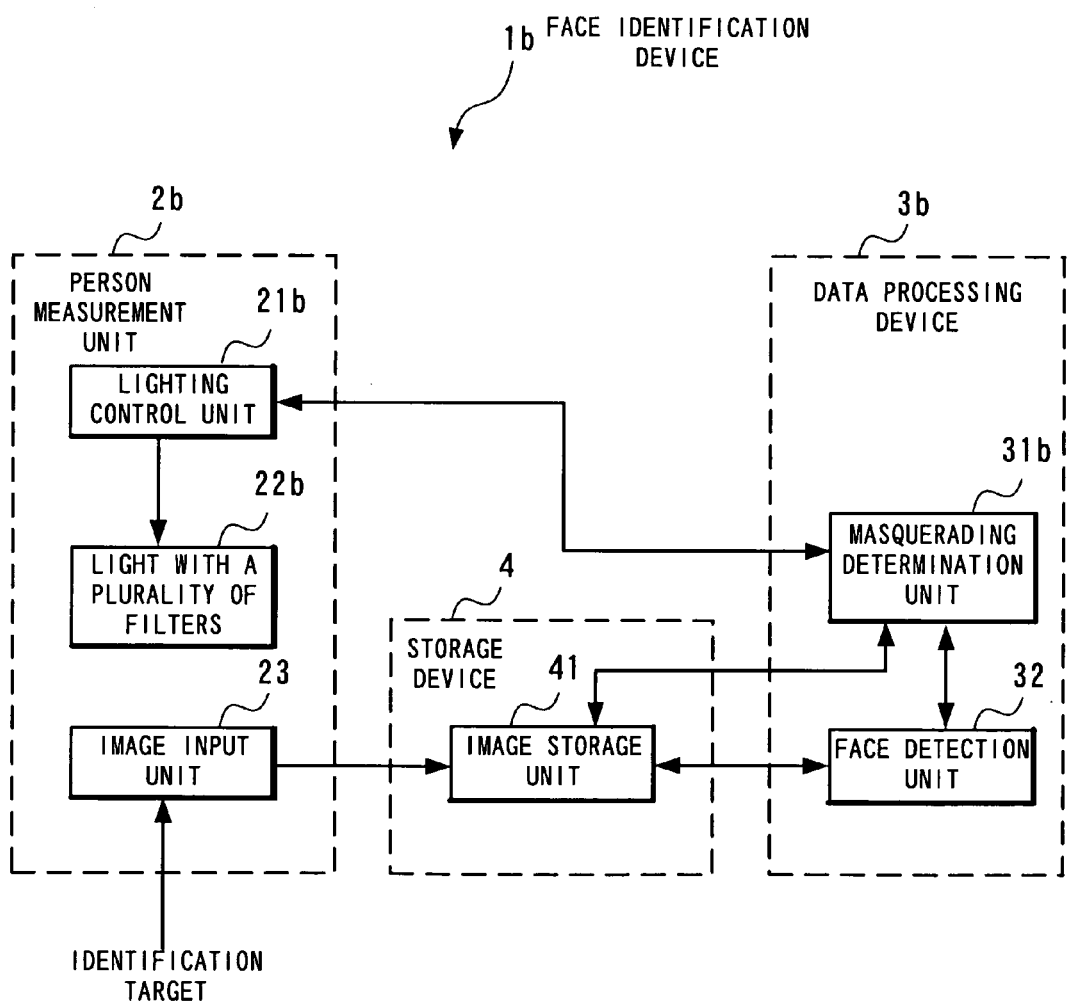
FIG. 14 is a block diagram showing an example of structure of a face identification device according to a third embodiment of the present invention.

FIG. 14 is a block diagram showing an example of structure of a face identification device 1b including a third embodiment of the masquerading detection device according to the present invention. In the following description, the same structure and parts executing the same processing as those of the face identification devices in the above-described respective embodiments are given the same reference numerals to omit their detailed description.

As illustrated in FIG. 14, the face identification device 1b includes a person measurement unit 2b, a data processing device 3b and the storage device 4. The person measurement unit 2b includes a lighting control unit 21b, a light with a plurality of filters 22b and the image input unit 23. The data processing device 3b includes a masquerading determination unit 31b and the face detection unit 32.

The lighting control unit 21b has a function of controlling the light with a plurality of filters 22b to turn on/off a lamp, a function of controlling switching of the filters of the light with a plurality of filters 22b and a function of transmitting angle information indicative of an angle of a striped pattern drawn on a set filter to the masquerading determination unit 31b. The light with a plurality of filters 22b has a light source as lighting and a plurality of filters on which striped patterns having straight lines arranged are drawn at different angles. Among the respective filters attached to the light with a plurality of filters 22b, a filter for use in projecting a pattern is disposed at a position in which a pattern is projected onto a photographing target by turning on the light by the control of the lighting control unit 21b. On each of the filters, a striped pattern having straight lines arranged in parallel to each other is drawn with ink which prevents transmission of light of a halogen lamp as a light source at a different angle for each filter. Therefore, every time photographing by the image input unit 23 is executed, the light with a plurality of filters 22b is allowed to project a striped pattern of a different angle onto an identification target (a person to be photographed) by a filter disposed at a position in which a pattern is projected onto the photographing target by the control of the lighting control unit 21b.

In other words, while in the above-described second embodiment, a pattern to be projected is decided at random by rotating the filter of the light with a filer 22a, a pattern to be projected is decided at random by switching the plurality of filters which the light with a plurality of filters 22b has in the present embodiment.

The masquerading determination unit 31b has a function of reading image data stored in the image storing unit 41, as well as obtaining angle information from the lighting control unit 21b. The masquerading determination unit 31b has a function of determining whether an identification target is used for masquerading or there exists a possibility of being not used for masquerading based on an image of a face region specified by the face detection unit 32 and an angle represented by obtained angle information.

Figure 15:
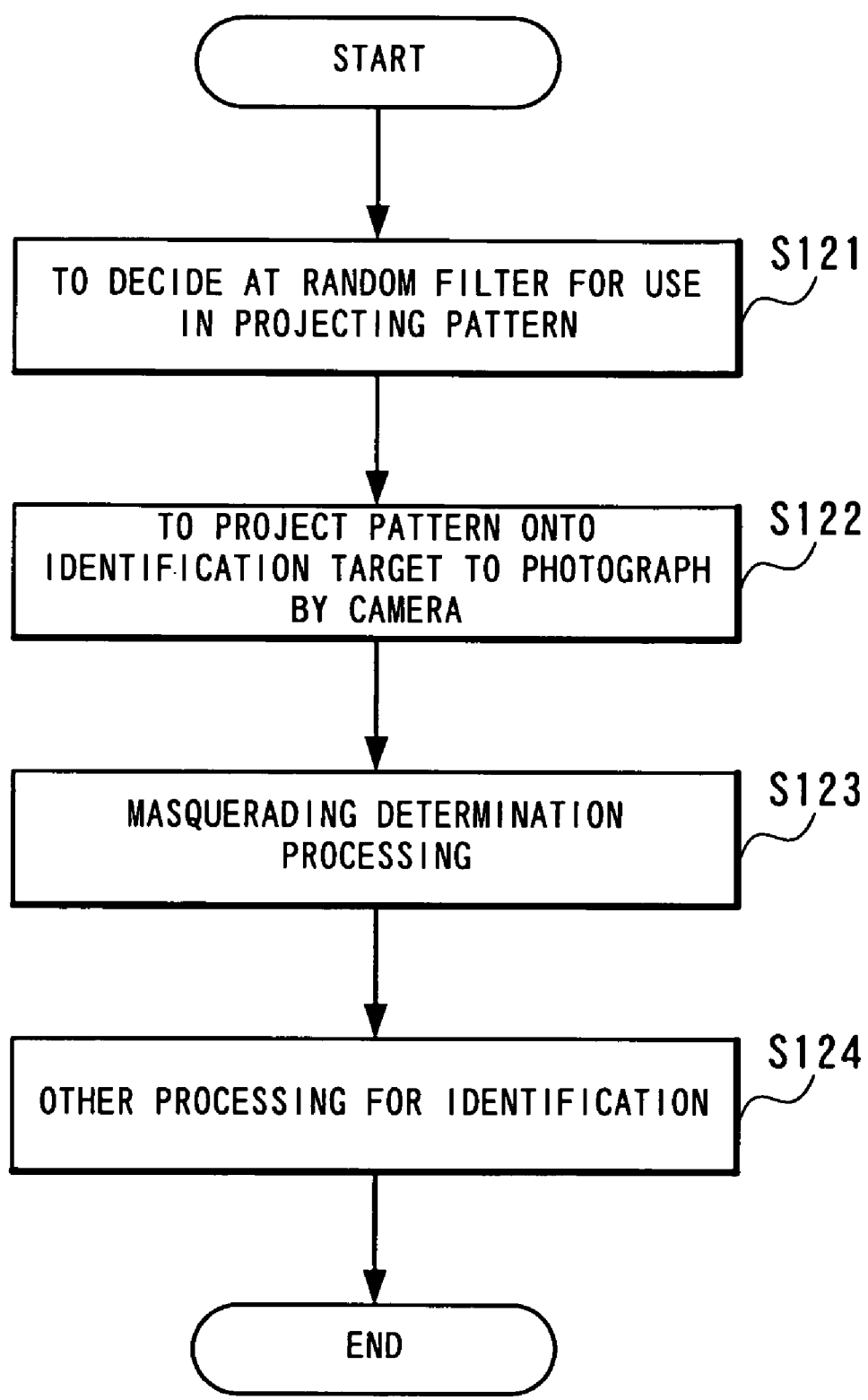
FIG. 15 is a flow chart showing an example of face identification processing according to the third embodiment of the present invention.

FIG. 15 is a flow chart showing an example of face identification processing executed by the face identification device 1b in the third embodiment. In the face identification processing, the lighting control unit 21b at random decides which filter among the plurality of filters provided in the light with a plurality of filters 22b is to be used such that a person to be authenticated can not predict and switches a filter located at a position in which a pattern is projected onto the photographing target to the decided filter (Step S121).

In the present embodiment, the lighting control unit 21b is assumed to have a function of selecting one filter among the plurality of filters on which striped patterns of angles different by 30 degrees each are drawn to switch a filter located at a position in which a pattern is projected to the selected filter. The present example is premised on that four patterns of filters with striped patterns rotated by 30 degrees, 60 degrees, 90 degrees and 120 degrees from a reference position (a state where straight lines forming a striped pattern are drawn horizontally) are provided. Since the larger the number of filters is, the more minute difference in angle can be discriminated to enable masquerading determination with higher precision, five or more patterns of filters may be used. For simplifying the structure of the light with a plurality of filters 22b, three or less patterns of filters may be used.

When the filter is switched, the person measurement unit 2b turns on the light with a plurality of filters 22b to project a striped pattern onto an identification target (photographing target), photographs the photographing target with the striped pattern projected by means of the image input unit 23 and outputs image data obtained by the photographing to the storage device 4 to store the same in the image storage device 41 (Step S122). Since at the time of photographing, the filter is set at random, an angle of a projected striped pattern which is drawn on the set filter is set at random as well.

More specifically, executed at Step S122 is processing of turning on a halogen lamp with a filter (the light with a filter 22a) to project a pattern of an angle set at random onto the photographing target and photographing the identification target with the pattern projected by means of a CCD camera (the image input unit 23) to store image data obtained by the photographing in the image storage device 41.

Subsequently, the face detection unit 32 reads the image data from the image storage unit 41 to detect a face region of an image represented by the image data and output the same to the masquerading determination unit 31b. The masquerading determination unit 31b reads the image data from the image storage unit 41 to determine whether the identification target masquerades or not based on the detection result of the face detection unit 32 (Step S123). At Step S123, the masquerading determination processing is executed in the same manner as in the above-described Step S73.

Then, the face identification device 1b executes other processing for face identification (Step S124: the same processing as that of the above-described Step S23 is executed at Step S124).

Switching a filter of the light with a plurality of filters 22b to switch an angle of a striped pattern to be projected as in the above-described third embodiment also enables the same effect in the above-described second embodiment to be obtained. More specifically, being structured to check whether an identification target is a masquerading image or not based on whether an angle of a pattern projected onto the identification target and an angle of a pattern appearing in a photographed image are consistent or not, thereby executing masquerading determination according to the check result, the above-described third embodiment also enables even face identification by using a masquerading image formed by an image display device to be determined as masquerading.

In addition, being structured to decide an angle of a pattern to be projected onto an identification target at random, the above-described third embodiment also enables an angle of a pattern to be projected onto an identification target to be unpredictable. Accordingly, even in a case where operation of detecting masquerading by the identification device 1b is known to a person who intends to masquerade, it is difficult to generate a masquerading image that enables masquerading detection to be prevented, which makes it impossible to generate a masquerading image that enables masquerading detection to be avoided without fail. In other words, masquerading can be detected with high precision even when a person who intends to masquerade covers the light with a plurality of filters 22b to cut off light from the light with a plurality of filters 22b, thereby avoiding detection of masquerading which uses a masquerading image formed using an image display device or the like.

Furthermore, being structured to have the face identification device 1b actively project a pattern onto an identification object by using the light with a plurality of filters 22b, the above-described third embodiment is less liable to be affected by a change of photographing environments of the image input unit 23. In other words, since a pattern is actively irradiated by the light with a plurality of filters 22b, the pattern can be reliably projected onto the identification target without being affected by light of other lighting (e.g. a light such as a room light other than the light with a plurality of filters 22b) disposed on the periphery of the image input unit 23.

While in the above-described third embodiment, in order to obtain a face region in an image, a face is detected by the face detection unit 32, when a person to be photographed can be taught to put his/her face at a specific position in the image, such a specific position can be processed as a face region. In this case, masquerading detection processing can be executed by the masquerading determination unit 31b without requiring the face detection unit 32.

In the above-described third embodiment structured to have the lighting control unit 21b transmit angle information indicative of an angle of a striped pattern drawn on a selected filter to the masquerading determination unit 31b, the angle information may be any information that can specify an angle of a striped pattern drawn on a selected filter, and used as angle information may be, for example, information indicative of a kind of a selected filter. In this case, the masquerading determination unit 31b may be structured to have a data table indicative of an angle of a striped pattern corresponding to each filter such that an angle of a striped pattern correlated with a kind of a selected filter is extracted from the data table.

Embodiment 4

Figure 16:
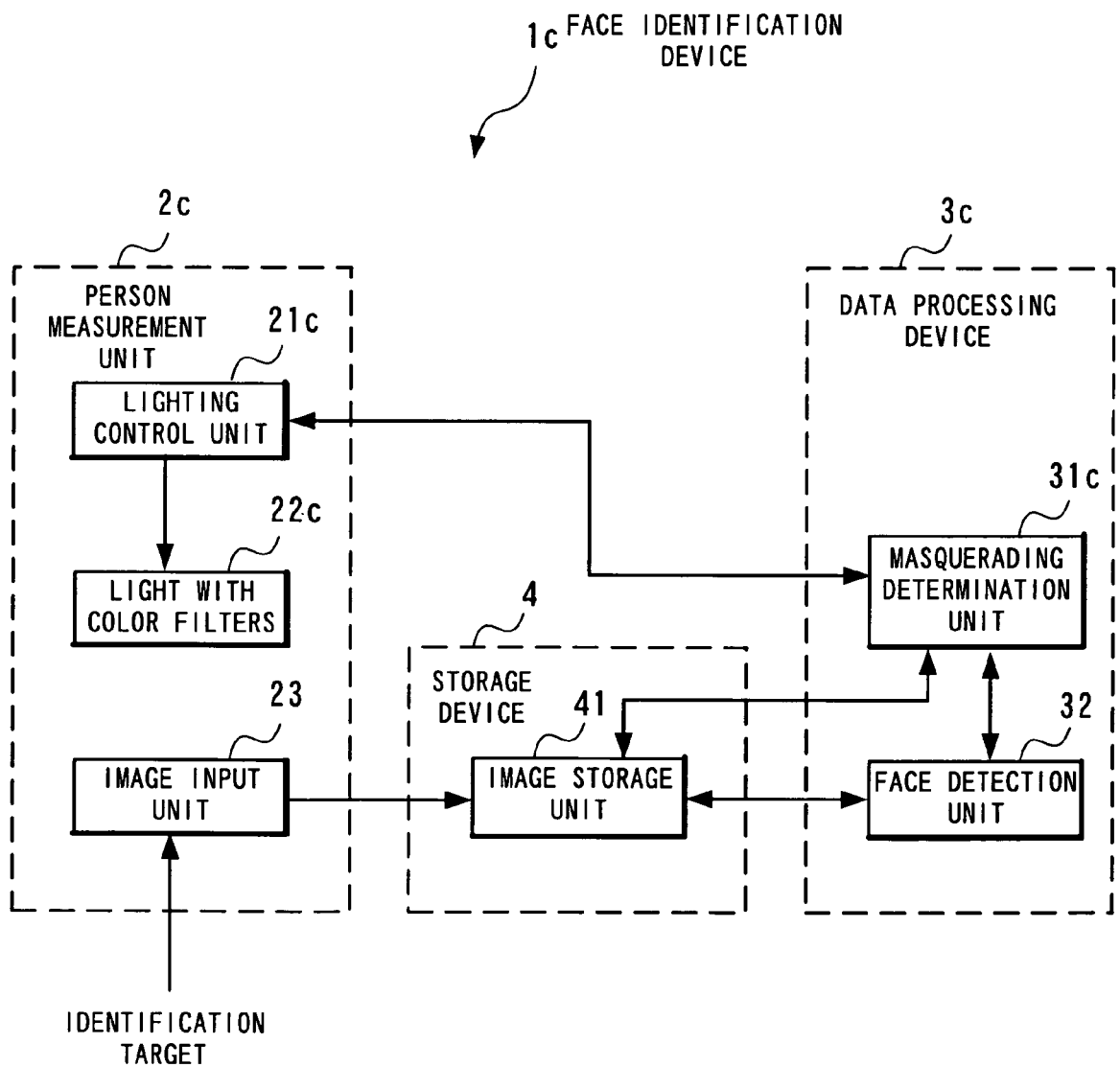
FIG. 16 is a block diagram showing an example of structure of a face identification device according to a fourth embodiment of the present invention.

FIG. 16 is a block diagram showing an example of structure of a face identification device 1c including a fourth embodiment of the masquerading detection device according to the present invention. In the following description, the same structure and parts executing the same processing as those of the face identification devices in the above-described respective embodiments are given the same reference numerals to omit their detailed description.

As illustrated in FIG. 16, the face identification device 1c includes a person measurement unit 2c, a data processing device 3c and the storage device 4. The person measurement unit 2c includes a lighting control unit 21c, a light with color filters 22c and the image input unit 23. The data processing device 3c includes a masquerading determination unit 31c and the face detection unit 32.

The lighting control unit 21c has a function of controlling the light with color filters 22c to turn on/off a lamp, a function of controlling switching of the filters of the light with color filters 22c and a function of transmitting color information representing a color of a pattern drawn on a filter set as a filter to be used to the masquerading determination unit 31c. The light with color filters 22c has a light source as lighting and a plurality of filters on which striped patterns having straight lines arranged are drawn in different colors for the respective filters. Among the respective filters attached to the light with color filters 22c, a filter for use in projecting a pattern is disposed at a position in which a pattern is projected onto a photographing target by turning on the light by the control of the lighting control unit 21c. On each of the filters, a striped pattern having straight lines arranged in parallel to each other is drawn with ink which allows transmission of light of a predetermined color different for each filter. Therefore, every time photographing by the image input unit 23 is executed, the light with color filters 22c is allowed to project a striped pattern of a different color onto an identification target (a person to be photographed) by a filter disposed at a position in which a pattern is projected onto the photographing target by the control of the lighting control unit 21c.

In other words, while in the above-described third embodiment, an angle of a pattern to be projected is decided at random by switching the plurality of filters which the light with a plurality of filters 22b has in the above-described third embodiment, the present embodiment decides a color of a pattern to be projected at random by switching the plurality of filters which the light with color filters 22c has.

The masquerading determination unit 31c has a function of reading image data stored in the image storage unit 41, as well as obtaining color information from the lighting control unit 21c. The masquerading determination unit 31c has a function of determining whether an identification target is used for masquerading or there exists a possibility of being not used for masquerading based on an image of a face region specified by the face detection unit 32 and a color represented by obtained color information.

Figure 17:
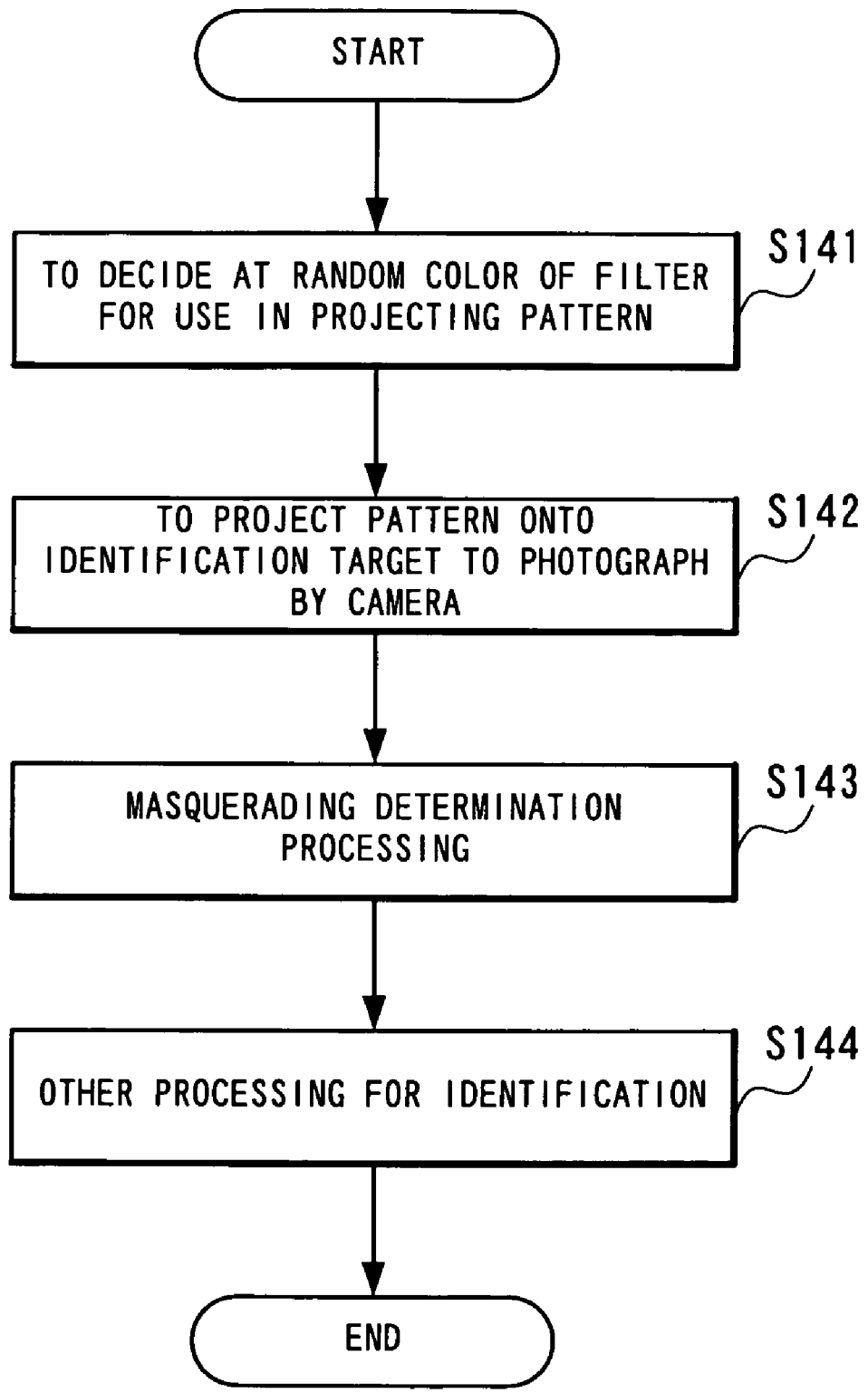
FIG. 17 is a flow chart showing an example of face identification processing according to the fourth embodiment of the present invention.

FIG. 17 is a flow chart showing an example of face identification processing executed by the face identification device 1c in the fourth embodiment. In the face identification processing, the lighting control unit 21c at random decides which filter among the plurality of filters provided in the light with color filters 22c is to be used such that a person to be authenticated can not predict and switches a filter located at a position in which a pattern is projected onto the photographing target to the decided filter (Step S141). In other words, the filter of the light with color filters 22c is switched by the control of the lighting control unit 21c to replace a color of a pattern on the filter.

In the present embodiment, the lighting control unit 21c is assumed to have a function of selecting one filter among the plurality of filters whose pattern colors are different from each other to switch a filter located at a position in which a pattern is projected to the selected filter. Color for use in a pattern on each filter may be, for example, a color whose chroma is high such that the pattern can be distinguished with ease. More specifically, three colors, red, blue and green, for example, may be used. An angle of a straight line in a striped pattern drawn on each filter is arbitrary.

When the filter is switched, the person measurement unit 2c turns on the light with color filters 22c to project a colored striped pattern drawn on the filter onto an identification target (photographing target), photographs the photographing target with the colored pattern projected by means of the image input unit 23 formed, for example, of a CCD camera and outputs image data obtained by the photographing to the storage device 4 to store the same in the image storage device 41 (Step S142). Since at the time of photographing, the filter is set at random, a color of a pattern drawn on the set filter is set at random as well.

More specifically, executed at Step S142 is processing of turning on a halogen lamp with filters (the light with color filters 22c) to project a pattern drawn in a color set at random onto the photographing target and photographing the identification target with the colored pattern projected by means of a CCD camera (the image input unit 23) to store image data obtained by the photographing in the image storage device 41.

Subsequently, the face detection unit 32 reads the image data from the image storage unit 41 to detect a face region of an image represented by the image data and output the detection result to the masquerading determination unit 31c. The masquerading determination unit 31c reads the image data from the image storage unit 41 to determine whether the identification target is used for masquerading or not based on the detection result of the face detection unit 32 (Step S143). In other words, at Step S143, the masquerading determination processing is executed by using the image photographed by the image input unit 23.

Then, the face identification device 1c executes other processing for face identification (Step S144). At Step S144, the same processing as that of the above-described Step S23 is executed.

Figure 18:
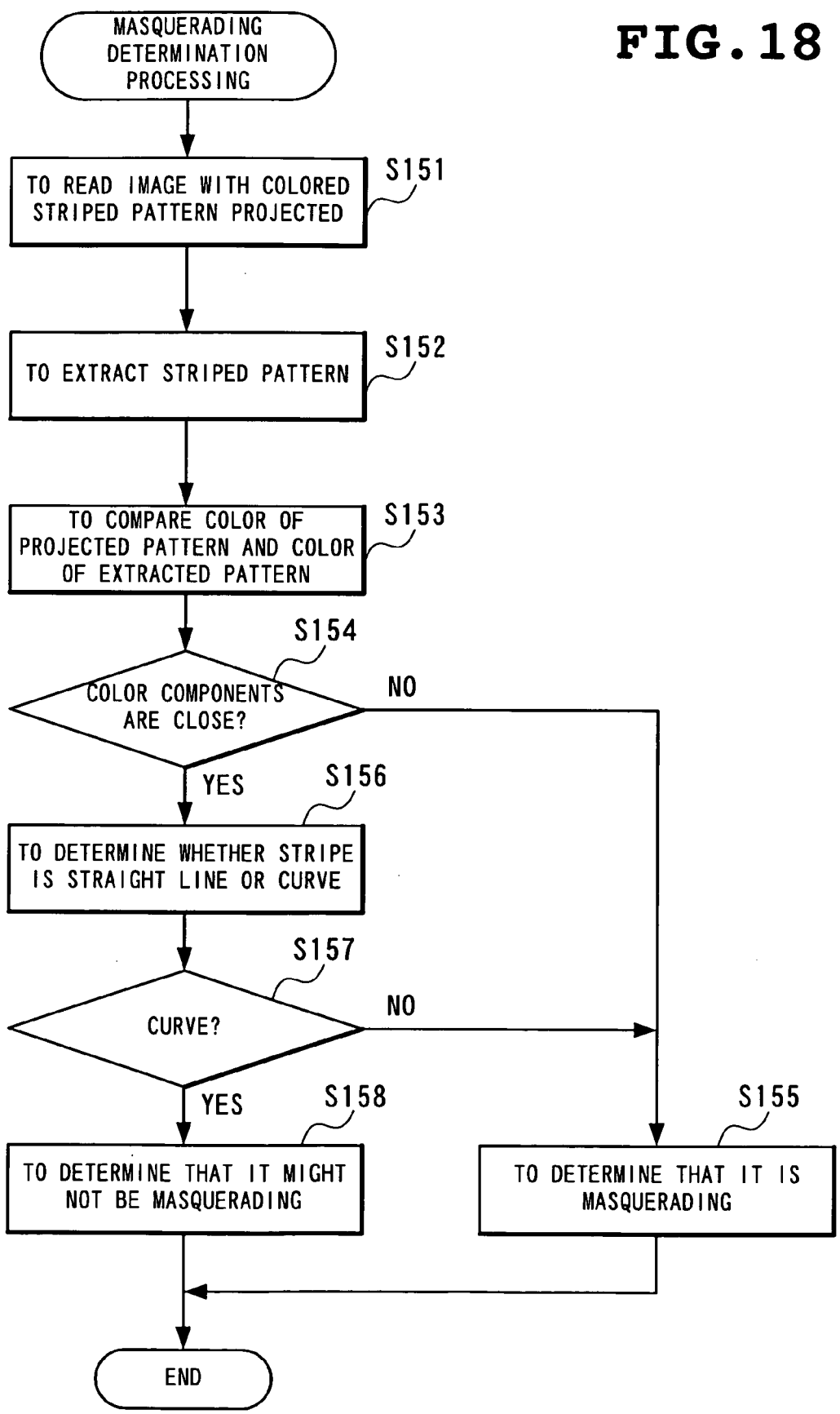
FIG. 18 is a flow chart showing an example of masquerading determination processing according to the fourth embodiment of the present invention.

FIG. 18 is a flow chart showing an example of the masquerading determination processing (Step S143) in the fourth embodiment. In the masquerading determination processing, the masquerading determination unit 31c reads image data representing an image of an identification target with a colored pattern projected from the image storage unit 41 (Step S151) to extract a striped pattern appearing in a face region of an image represented by the read image data (Step S152).

When extracting the striped pattern appearing in the face region, the masquerading determination unit 31c compares a color of the pattern in the face region in the image and a color of a pattern drawn on the filter used for projecting the pattern to determine whether the color of the pattern in the face region in the image is approximate to a color component of the pattern drawn on the filter used in projecting the pattern (Step S153). The color of the pattern in the face region in the image is specified, for example, by a color component which is found in a large amount in the pattern region in the image.

Unless the color is approximate to the color component (N at Step S154), which means that there exists a striped pattern of another color, because the image can be considered as a masquerading image artificially generated with the intention to masquerade to determine that it is at least not a person himself, the determination is made that the target masquerades (Step S155).

When the color is approximate to the color component (Y at Step S154), the masquerading determination unit 31c determines whether a stripe in the face region in the image is a straight line (Step S156). When the stripe is a straight line (N at Step S157), because the determination can be made that the identification target is a plane object such as a photograph or an image display device to determine that the target is at least not a person himself, determine that it is masquerading (Step S155).

Unless the stripe is a straight line (Y at Step S157), the masquerading determination unit 31c determines that it might not be masquerading because the identification target has a solid configuration having three-dimensional irregularities to have a possibility of being a person himself (Step S158).

Figure 19:
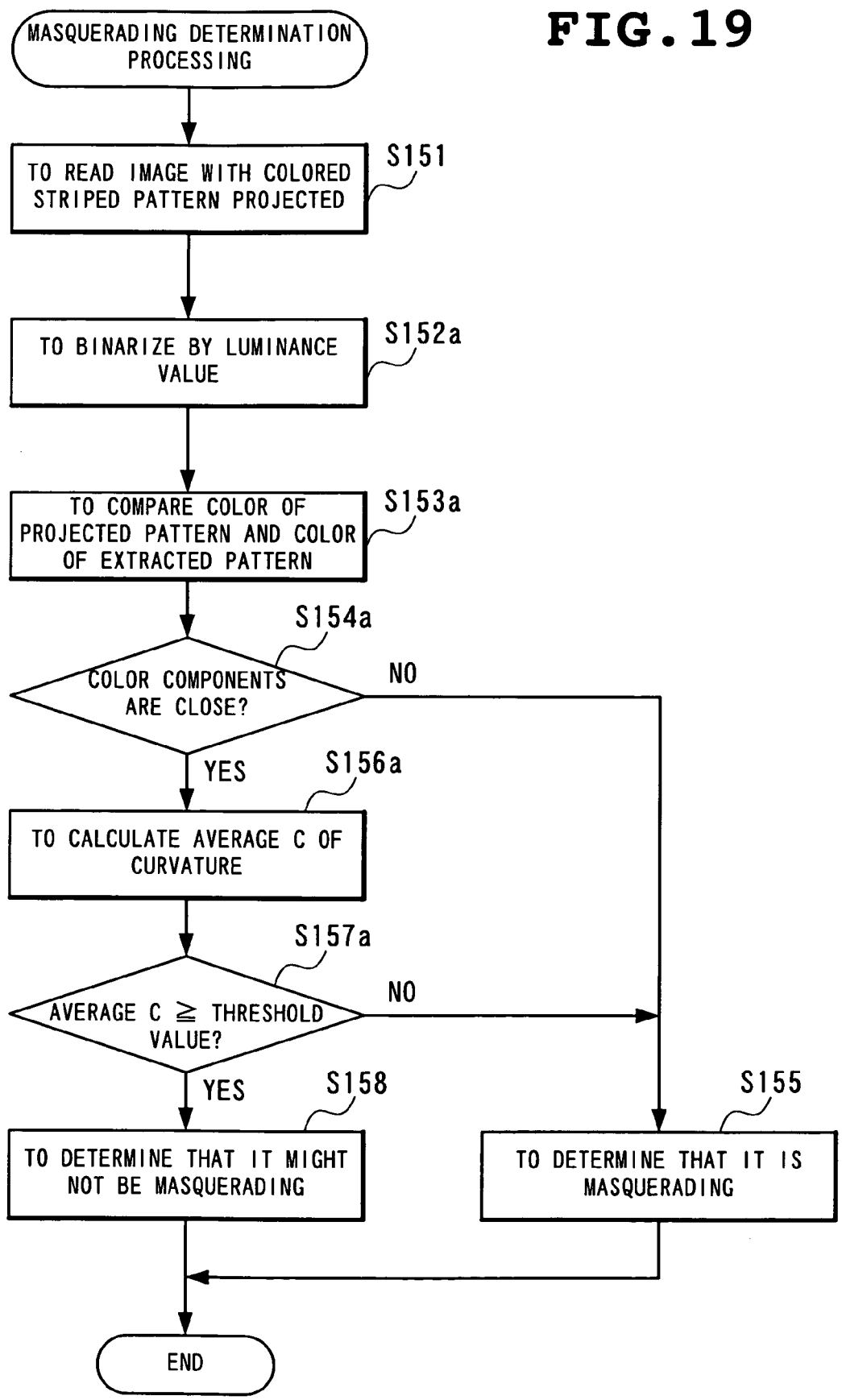
FIG. 19 is a flow chart showing a specific example of the masquerading determination processing in the fourth embodiment of the present invention.

FIG. 19 is a flow chart showing a specific example of processing (Step S152 to Step S154) of determining whether a color component of a color of a projected pattern and that of a color of a filter are close to each other as a part of the masquerading determination processing (Step S143, the processing in FIG. 18) in the fourth embodiment. Since Step S156a to Step S157a in FIG. 19 is the same processing as that of the above-described Step S33a to Step S34a in FIG. 6, no detailed description will be made thereof.

The masquerading determination unit 31c reads image data representing an identification target with a colored pattern projected from the image storage unit 41 (Step S151) to extract a region of the projected striped pattern by binarizing an image represented by the image data according to its luminance value (Step S152a). Next, the masquerading determination unit 31c compares a color of the region of the striped pattern and a color of other region in an RGB color space (color description method using red, green and blue components) to obtain a color component which can be found in a large amount in the striped pattern in the image and compares the color of the pattern in the face region in the image and a color of a pattern drawn on a filter used in projecting the pattern to determine whether the color is close to the color component of the pattern drawn on the used filter (Step s153a). Unless the color is close to the color component of the pattern drawn on the filter (N at Step S154a), which means that there exists a striped pattern of another color, because the image can be considered a masquerading image artificially generated with the intention to masquerade to determine that the target is at least not a person himself, the determination is made that it is masquerading (Step S155).

Switching a filter of the light with color filters 22c to switch a color of a striped pattern to be projected as in the above-described fourth embodiment also enables the same effect as in the above-described third embodiment to be obtained. More specifically, being structured to check whether an identification target is a masquerading image or not based on whether a color component of a color of a pattern projected onto the identification target and that of a color of a pattern appearing in a photographed image are close to each other or not, thereby executing masquerading determination according to the check result, the above-described fourth embodiment also enables even face identification by using a masquerading image formed by an image display device or the like to be determined as masquerading.

In addition, being structured to decide a color of a pattern to be projected onto an identification target at random, the above-described fourth embodiment also enables a color of a pattern to be projected onto an identification target to be unpredictable. Accordingly, even in a case where operation of detecting masquerading executed by the identification device 1c is known to a person who intends to masquerade, it is difficult to generate a masquerading image that enables masquerading detection to be prevented, which makes it impossible to generate a masquerading image that enables masquerading detection to be avoided without fail. In other words, masquerading can be detected with high precision even when a person who intends to masquerade covers the light with color filters 22c to cut off light from the light with color filters 22c, thereby avoiding detection of masquerading which uses a masquerading image formed using an image display device or the like.

Furthermore, being structured to have the face identification device 1c actively project a pattern onto an identification object by using the light with color filters 22c, the above-described fourth embodiment is less liable to be affected by a change of photographing environments of the image input unit 23. In other words, since a pattern is actively irradiated by the light with color filters 22c, the pattern can be reliably projected onto the identification target without being affected by light of other lighting (e.g. a light such as a room light other than the light with color filters 22c) disposed on the periphery of the image input unit 23.

While in the above-described fourth embodiment, in order to obtain a face region in an image, a face is detecting by the face detection unit 32, when a person to be photographed can be taught to put his/her face at a specific position in the image, such a specific position can be processed as a face region. In this case, masquerading detection processing can be executed by the masquerading determination unit 31c without requiring the face detection unit 32.

Moreover, in the above-described fourth embodiment, the light with color filters 22c is structured to have a plurality of filters with patterns of different colors drawn, it may have a plurality of different color based filters. More specifically, while in the above-described fourth embodiment, it is assumed that a semi-transparent colored pattern is drawn on a transparent filter, a pattern may be drawn on a semi-transparent colored filter with, for example, black ink which prevents light transmission. In this case, a colored pattern will not be projected onto an identification target but a color will be projected onto other part than the part on which the pattern is projected. Then, at Step S153a, a color of other part than a part on which a pattern is projected in an image representing an identification target and a color of a filter should be compared with each other.

In the above-described fourth embodiment structured to have the lighting control unit 21c transmit color information indicative of a color of a striped pattern drawn on a selected filter to the masquerading determination unit 31c, the color information may be any information that can specify a color of a striped pattern drawn on a selected filter, and used as color information may be, for example, information indicative of a kind of a selected filter. In this case, the masquerading determination unit 31c may be structured to have a data table indicative of a color of a striped pattern corresponding to each filter such that a color of a striped pattern correlated with a kind of a selected filter is extracted from the data table.

Embodiment 5

Figure 20:
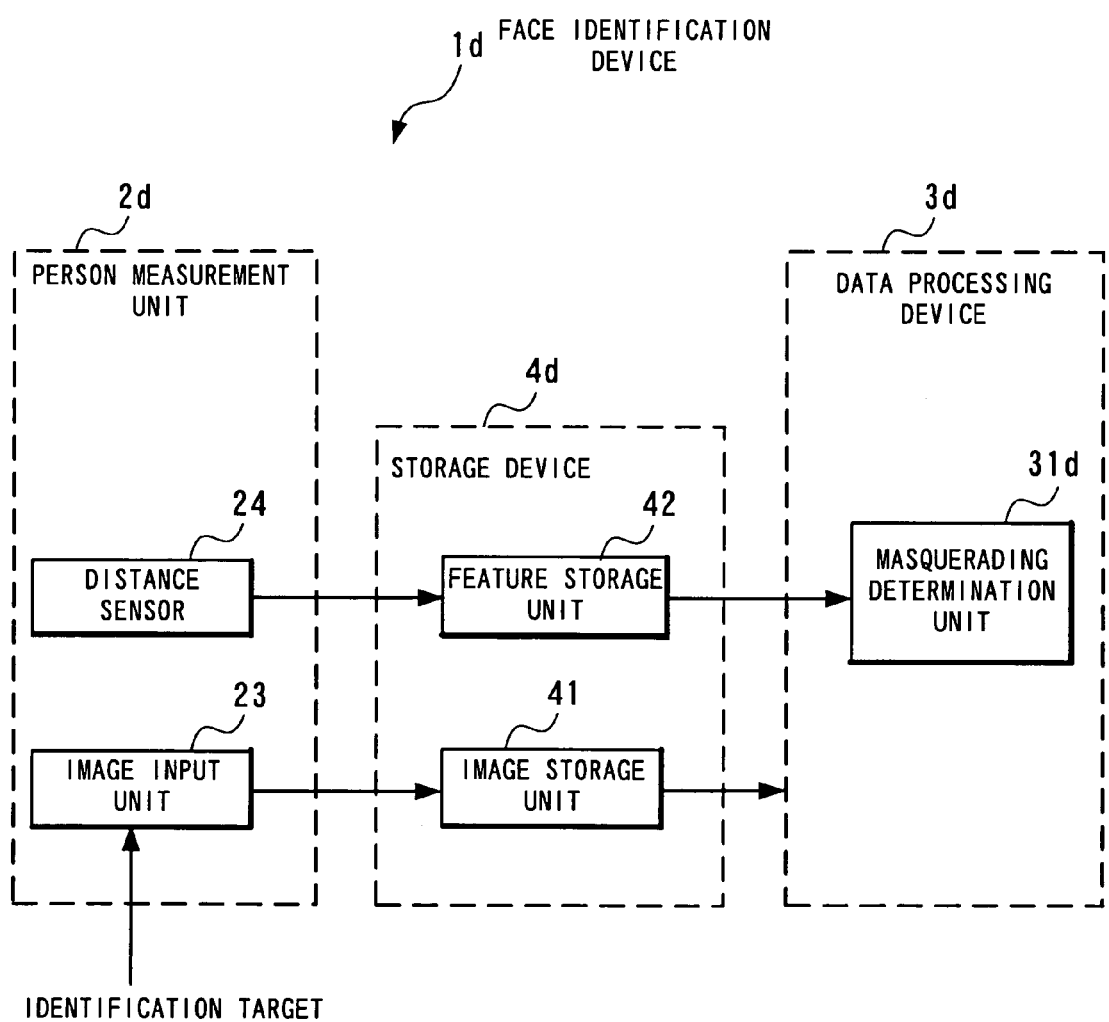
FIG. 20 is a block diagram showing an example of structure of a face identification device according to a fifth embodiment of the present invention.

FIG. 20 is a block diagram showing an example of structure of a face identification device 1d including a fifth embodiment of the masquerading detection device according to the present invention. In the following description, the same structure and parts executing the same processing as those of the face identification devices in the above-described respective embodiments are given the same reference numerals to omit their detailed description.

As illustrated in FIG. 20, the face identification device 1d includes a person measurement unit 2d, a data processing device 3d and a storage device 4d. The person measurement unit 2d includes the image input unit 23 and a distance sensor 24. The data processing device 3d includes a masquerading determination unit 31d. The storage device 4d includes the image storage unit 41 and a feature storage unit 42.

The storage device 4d includes the image storage unit 41 and the feature storage unit 42 formed of a storage medium such as a RAM. The image storage unit 41 and the feature storage unit 42 are formed, for example, of a magnetic disk storage device. Used for the data processing device 3d is a personal computer, for example. The personal computer has a CPU (central processing unit) which functions as the masquerading determination unit 31d.

The distance sensor 24 is a device which measures a distance between a sensor and a target object, for which an ultrasonic distance measuring sensor is used, for example. The distance sensor 24 transmits actual distance data indicative of a measured distance to the storage device 4d. The distance sensor 24 is disposed at a position which enables measurement of a distance between the image input unit 23 and a photographing target object, for example, at a position adjacent to a camera as the image input unit 23.

The feature storage unit 42 stores actual distance data indicative of a distance measured by the distance sensor 24 and appropriate distance data indicative of an appropriate distance assumed in advance between the image input unit 23 and a person to be identified.

The masquerading determination unit 31d has a function of reading actual distance data and appropriate distance data stored in the feature storage unit 42 to determine whether an identification target is used for masquerading or it might not be used for masquerading based on each distance data.

Figure 21:
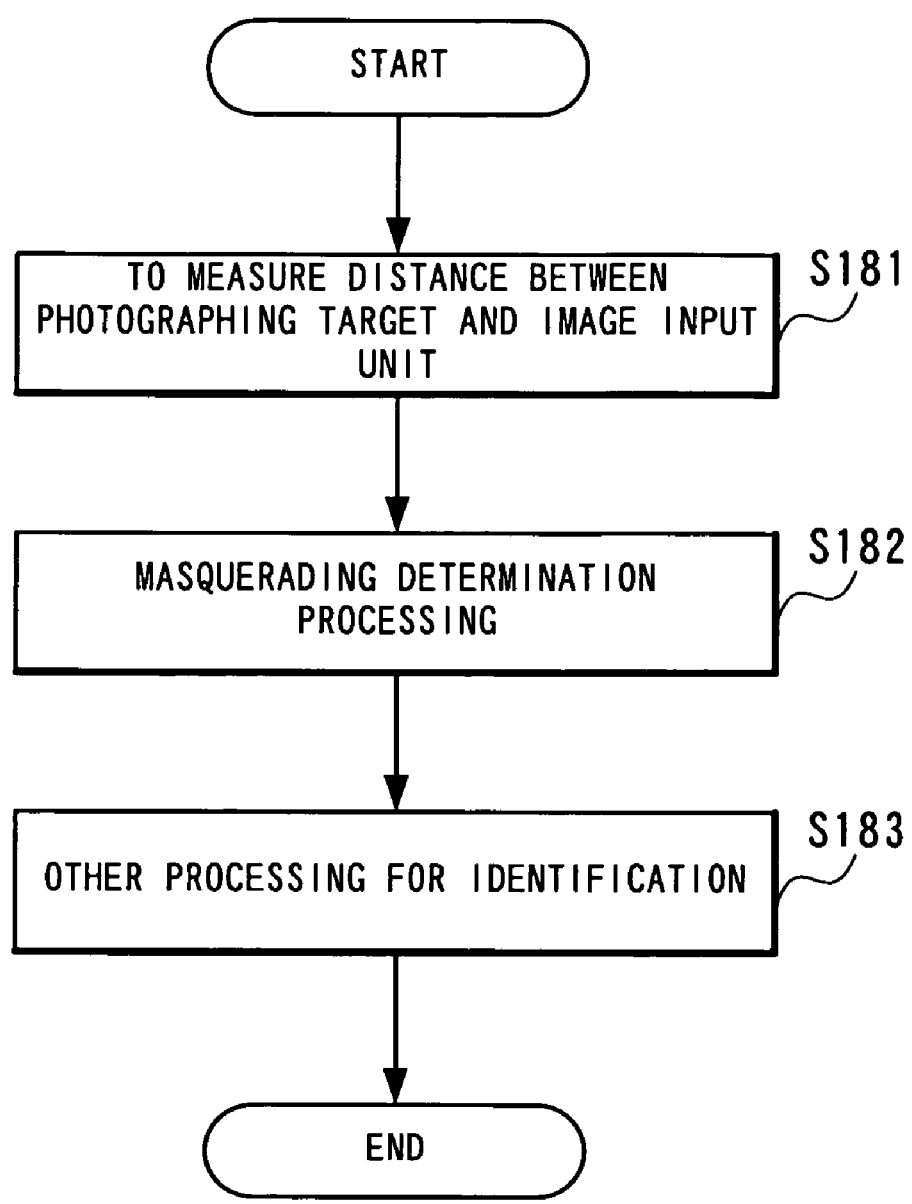
FIG. 21 is a flow chart showing an example of face identification processing according to the fifth embodiment of the present invention.

FIG. 21 is a flow chart showing an example of face identification processing executed by the face identification device 1d in the fifth embodiment. Assume here that an appropriate distance between the image input unit 23 and a person to be authenticated is set to be L mm in advance and appropriate distance data indicative of the distance is stored in the feature storage unit 42 in advance.

In the face identification processing, the person measurement unit 2d photographs a photographing target by the image input unit 23, as well as measuring a distance between the photographing target and the image input unit 23 by the distance sensor 24 to output actual distance data obtained by the measurement to the storage device 4d and store the same in the feature storage unit 42 (Step S181).

The masquerading determination unit 31d reads the actual distance data and the appropriate distance data from the feature storage unit 42 to determine whether it is masquerading or not (Step S182). In other words, at Step S182, the masquerading determination processing is executed by using actual distance data and appropriate distance data.

Then, the face identification device 1d executes other processing for face identification (Step S183). At Step S183, the same processing as that of the above-described Step S23 is executed.

Figure 22:
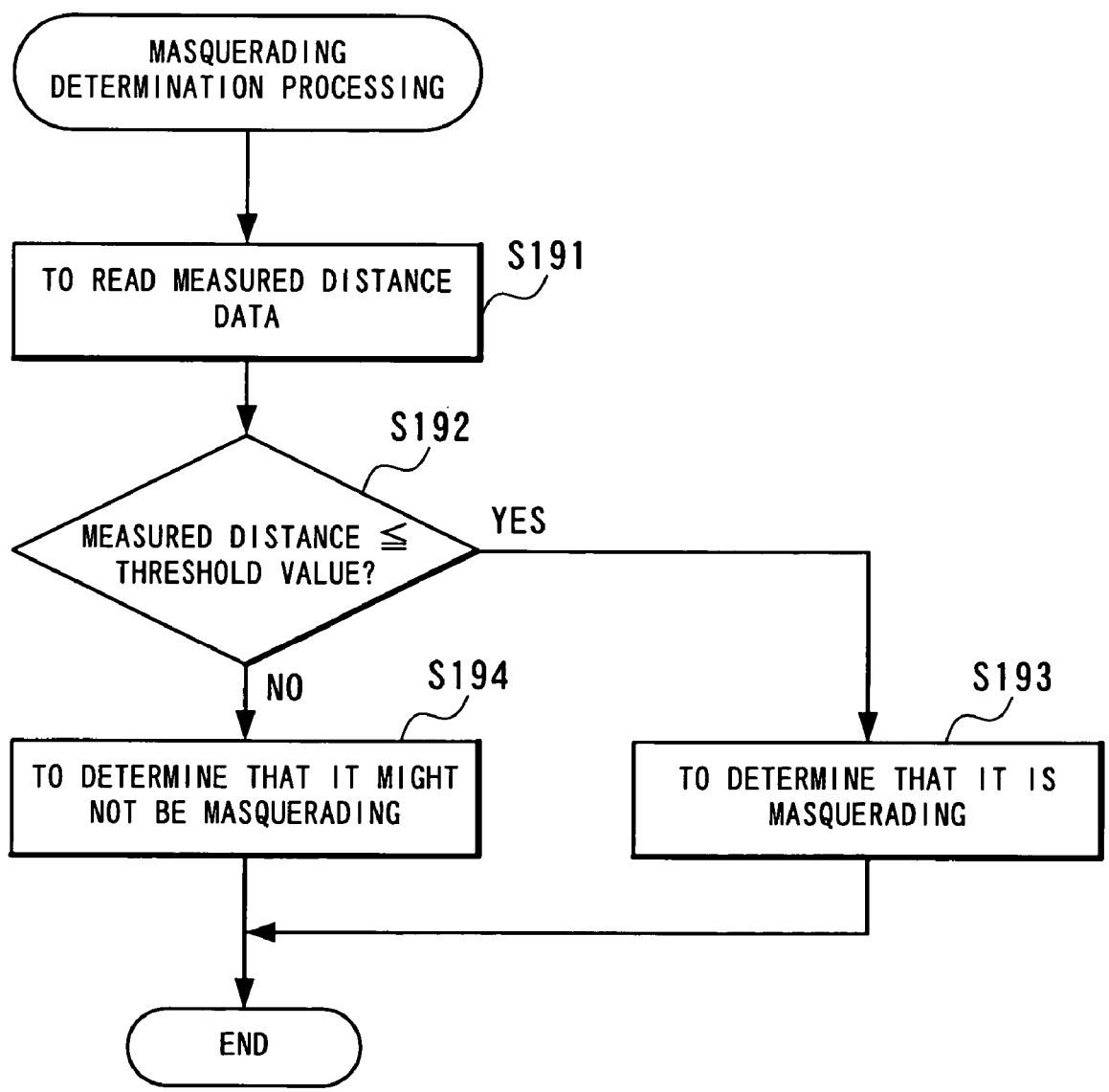
FIG. 22 is a flow chart showing an example of masquerading determination processing according to the fifth embodiment of the present invention.

FIG. 22 is a flow chart showing an example of the masquerading determination processing (Step S182) in the fifth embodiment. In the masquerading determination processing, the masquerading determination unit 31d reads actual distance data indicative of a distance measured by the distance sensor 24 and appropriate distance data set in advance from the feature storage unit 42 (Step S191).

Subsequently, the masquerading determination unit 31d compares a distance represented by the read actual distance data and a threshold value (e.g. (L/2) mm) set in advance based on a distance (L mm) represented by the appropriate distance data to determine whether the distance represented by the actual distance data is not more than the threshold value or not (Step S192). The threshold value is set to be a value indicative of a distance from the image input unit 23 to a predetermined position at which the photographing target can be considered too closer to the image input unit 23 than an original photographing position. Therefore, the threshold value is set to be a value indicative of a distance shorter enough than a distance represented by the appropriate distance data.

When the distance is not more than the threshold value at Step S192, the masquerading determination unit 31d determines that an identification target is located at a distance extremely shorter than the appropriate distance to determine that it is masquerading using a false face smaller than that of a specific person himself (e.g. masquerading by making the image input unit 23 photograph a display device which displays an image obtained by photographing the person in question with the display device put close to the image input unit 23) (Step S193). On the other hand, unless the distance is not more than the threshold value, determine that it might not be masquerading (Step S194).

Thus, being structured to determine that it is masquerading when confirming that an identification target locates closer than an original photographing position, the above-described fifth embodiment enables detection of masquerading realized by closing a false face smaller than a face of an authentic person up to the image input unit 23. False faces smaller than that of an authentic person include a face photographed in a picture which is smaller than an actual face, a face displayed on an image display device which is smaller than an actual face and a face formed of a face-shaped relief which is smaller than a face of an authentic person. The above-described fifth embodiment enables detection of masquerading realized by closing such a false face as described above up to a camera as the image input unit 23 to masquerade as a face of an appropriate size at the time of authentication.

In addition, since being structured to determine masquerading according to an actual distance between an identification target and the image input unit 23 enables detection of masquerading without executing image processing, as compared with masquerading detection by using image data in the above-described first embodiment or the like, the above-described fifth embodiment enables detection of such masquerading using a false face smaller than that of an authentic person as described above with a smaller volume of computation. As a result, control loads on the masquerading detection device can be reduced and masquerading can be detected quickly.

While the above-described fifth embodiment is structured to determine that it is masquerading when confirming that an identification target locates at a position closer than an original photographing position, it may be structured to conversely determine that it is masquerading when confirming that an identification target locates at a position farther than an original photographing position. In this case, a threshold value set in advance based on a distance (L mm) represented by appropriate distance data should be a long distance (e.g. (3L/2) mm) to determine whether a distance represented by actual distance data is not less than the threshold value at Step S192. The threshold value here is set to be a value indicative of a distance from the image input unit 23 to a predetermined position at which a photographing target can be considered too farther from the image input unit 23 than an original photographing position. Therefore, the threshold value in this example is set to be a value indicative of a distance longer enough than a distance represented by the appropriate distance data. Such arrangement as described above enables detection of masquerading realized by closing a false face larger than that of an authentic person up to the image input unit 23. False faces larger than that of an authentic person include a face formed out of a face-shaped relief which is larger than an authentic person, for example. The above-described example enables detection of masquerading realized by putting away such a false face as described above from a camera as the image input unit 23 to masquerade as a face of an appropriate size at the time of authentication.

When the distance is not more than the threshold value at Step S192, the masquerading determination unit 31d determines that the identification target locates at a distance extremely shorter than an appropriate distance to determine that a false face smaller than that of an authentic person who is a specific person masquerades as the authentic person (e.g. masquerading by making the image input unit 23 photograph a display device which displays an image obtained by photographing the face of the authentic person with the device close to the image input unit 23) (Step S193). On the other hand, unless the distance is not more than the threshold value, determine that it might not be masquerading (Step S194).

Embodiment 6

Figure 23:
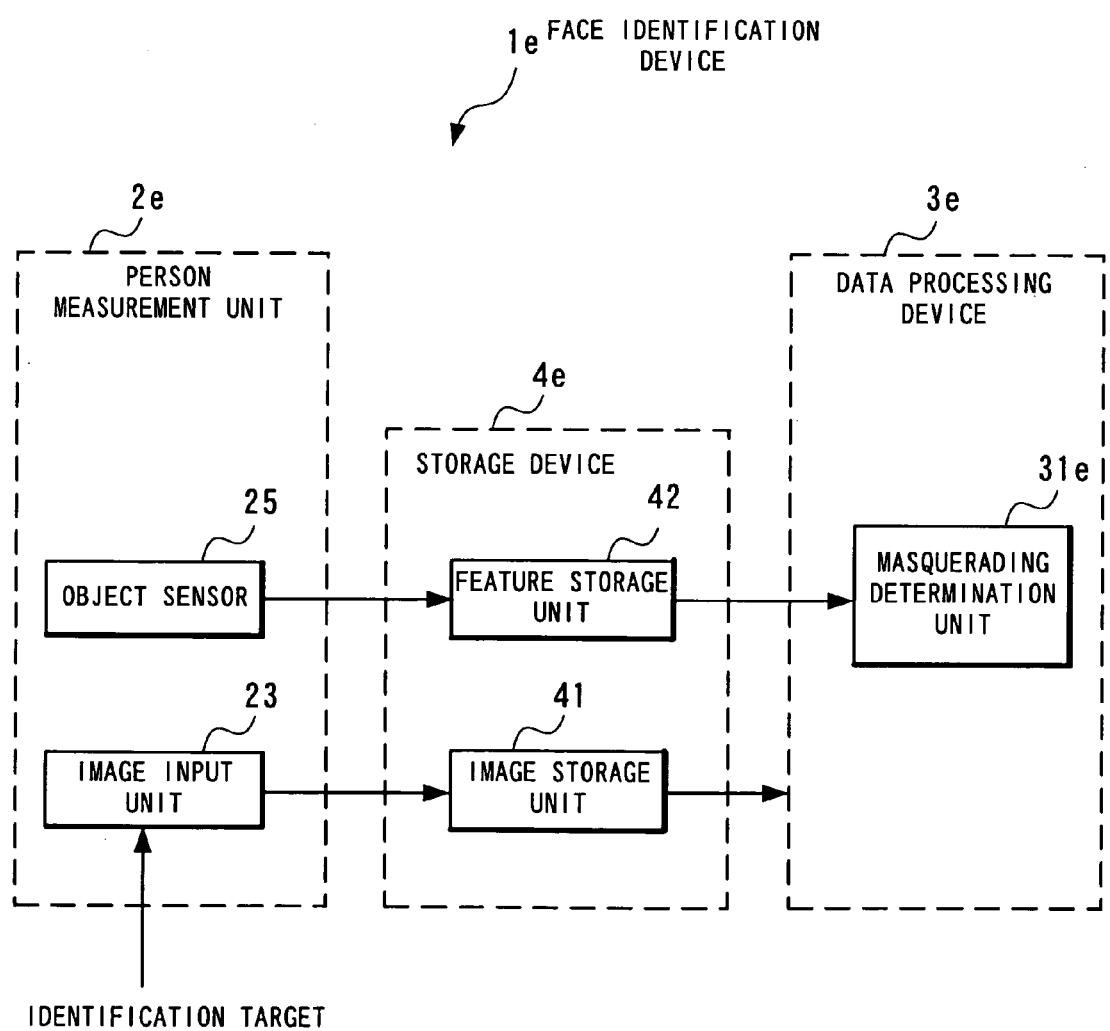
FIG. 23 is a block diagram showing an example of structure of a face identification device according to a sixth embodiment of the present invention.

FIG. 23 is a block diagram showing an example of structure of a face identification device 1e including a sixth embodiment of the masquerading detection device according to the present invention. In the following description, the same structure and parts executing the same processing as those of the face identification devices in the above-described respective embodiments are given the same reference numerals to omit their detailed description.

As illustrated in FIG. 23, the face identification device 1e includes a person measurement unit 2e, a data processing device 3e and a storage device 4e. The person measurement unit 2e includes the image input unit 23 and an object sensor 25. The data processing device 3e includes a masquerading determination unit 31e. The storage device 4e includes the image storage unit 41 and the feature storage unit 42.

The storage device 4e includes the image storage unit 41 and the feature storage unit 42 formed of a storage medium such as a RAM. The image storage unit 41 and the feature storage unit 42 are formed, for example, of a magnetic disk storage device. Used for the data processing device 3e is a personal computer, for example. The personal computer has a CPU (central processing unit) which functions as the masquerading determination unit 31e.

The object sensor 25 is a device which senses existence of an object within a fixed distance from where it is disposed, for which an infrared object sensor is used, for example. The infrared object sensor is a sensor which emits an infrared ray and receives its reflected light to sense an object locating within a fixed distance. When executing processing of sensing an object, the object sensor 25 transmits sensing result data indicative of a sensing result to the storage device 4e. The feature storage unit 42 stores sensing result data transmitted by the object sensor 25. The object sensor 25 is disposed directed to a photographing target at a position adjacent to, for example, a camera as the image input unit 23. In other words, the object sensor 25 is used for sensing whether there exists any object within a fixed distance from the image input unit 23. Sensitivity of the object sensor 25 is set to sense only an object within a fixed distance shorter than an appropriate distance assumed in advance between the image input unit 23 and an identification target.

The masquerading determination unit 31e has a function of reading sensing result data stored in the feature storage unit 42 to determine whether an identification target is used for masquerading or it might not be used for masquerading.

Next, operation of the identification device 1e in the sixth embodiment of the present invention will be described. Assume here that an appropriate distance (proper distance) between a person to be photographed and a camera is set to be L mm in advance. Then, assume that the distance from the image input unit 23 is set in advance to be L/2 mm on the premise that the distance is extremely shorter than the appropriate distance (a distance shorter enough to allow an identification target to be considered masquerading than an original position where the target locates at the time of authentication). Accordingly, the object sensor 25 is set to have sensitivity so as to sense an object within L/2 mm.

In this example, in the face identification processing, the person measurement unit 2e photographs a photographing target by the image input unit 23, as well as sensing existence of an object within a sensing range by the object sensor 25 to determine, when there exists an object, that the object locates at a distance extremely shorter than the appropriate distance and considers it as intention to make a false face smaller than that of an authentic person be photographed by the image display unit 23 to determine that it is masquerading.

Thus, being structured to determine that it is masquerading when confirming that an identification target locates closer than an original photographing position based on a sensing result of the object sensor 25, the above-described sixth embodiment enables detection of masquerading realized by closing a false face smaller than a face of an authentic person up to the image input unit 23 similarly to the above-described fifth embodiment. False faces smaller than that of an authentic person include a photographed face in a picture which is smaller than an actual face, a face displayed on an image display device which is smaller than an actual face and a face formed out of a face-shaped relief which is smaller than a face of an authentic person. The above-described sixth embodiment enables detection of masquerading realized by closing such a false face as described above up to a camera as the image input unit 23 to masquerade as a face of an appropriate size at the time of authentication.

In addition, since being structured to check whether there exists an identification target within a predetermined range of distance from the image input unit 23 and determine masquerading according to the check result, thereby enabling masquerading detection without executing image processing, as compared with masquerading detection by using image data in the above-described first embodiment or the like, the above-described sixth embodiment enables such masquerading using a false face smaller than that of an authentic person as described above to be detected with a smaller volume of computation. As a result, control loads on the masquerading detection device can be reduced and masquerading can be detected quickly.

Embodiment 7

Figure 24:
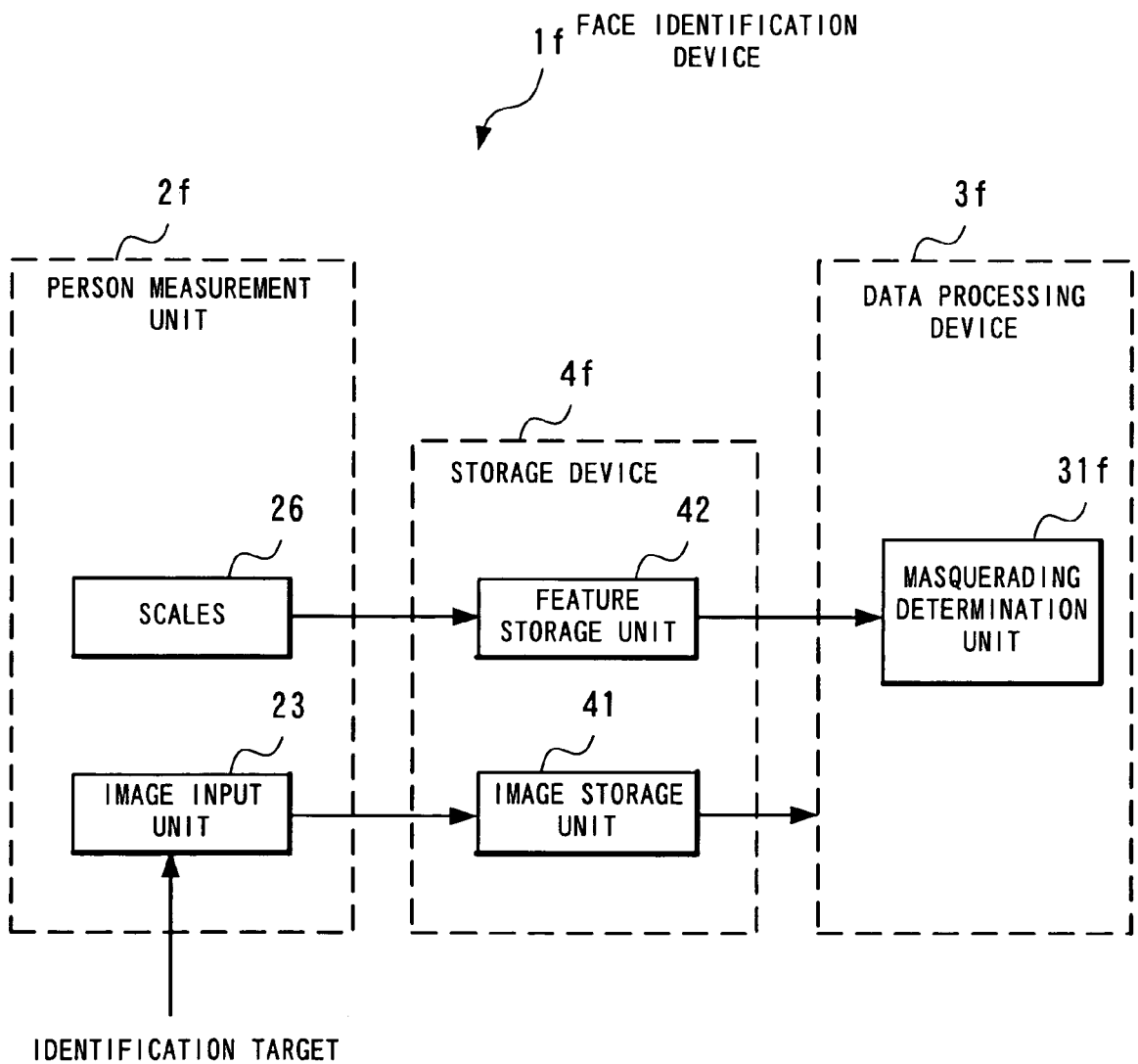
FIG. 24 is a block diagram showing an example of structure of a face identification device according to a seventh embodiment of the present invention.

FIG. 24 is a block diagram showing an example of structure of a face identification device 1f including a seventh embodiment of the masquerading detection device according to the present invention. In the following description, the same structure and parts executing the same processing as those of the face identification devices in the above-described respective embodiments are given the same reference numerals to omit their detailed description.

As illustrated in FIG. 24, the face identification device 1f includes a person measurement unit 2f, a data processing device 3f and a storage device 4f. The person measurement unit 2f includes the image input unit 23 and a scales 26. The data processing device 3f includes a masquerading determination unit 31f. The storage device 4f includes the image storage unit 41 and the feature storage unit 42.

The storage device 4f includes the image storage unit 41 and the feature storage unit 42 formed of a storage medium such as a RAM. The image storage unit 41 and the feature storage unit 42 are formed, for example, of a magnetic disk storage device. Used for the data processing device 3f is a personal computer, for example. The personal computer has a CPU (central processing unit) which functions as the masquerading determination unit 31f.

The scales 26, for which, for example, a scale sensor installed on the floor is used, is disposed on the floor at a position appropriate for photographing a person to be authenticated which is determined in advance. More specifically, when a position at which a target person should locate at the time of authentication is in proximity to M meters ahead of a camera as the image input unit 23 of the face identification device 1f, place the scales 26 on the floor at such position. Accordingly, at the time of photographing by the image input unit 23 for identification, the identification target puts himself on the scales 26. The scales 26 weighs the photographing target at the time of photographing by the image input unit 23 and transmits actual weight data indicative of its weighing value toward the storage device 4f.

The feature storage unit 42 stores actual weight data from the scales 26. Stored in the feature storage unit 42 is already obtained weight data indicative of weight of each person registered in the identification device 1f.

The masquerading determination unit 31f has a function of reading actual weight data and already obtained weight data stored in the feature storage unit 42 to determine whether an identification target is used for masquerading or it might not be used for masquerading.

Figure 25:
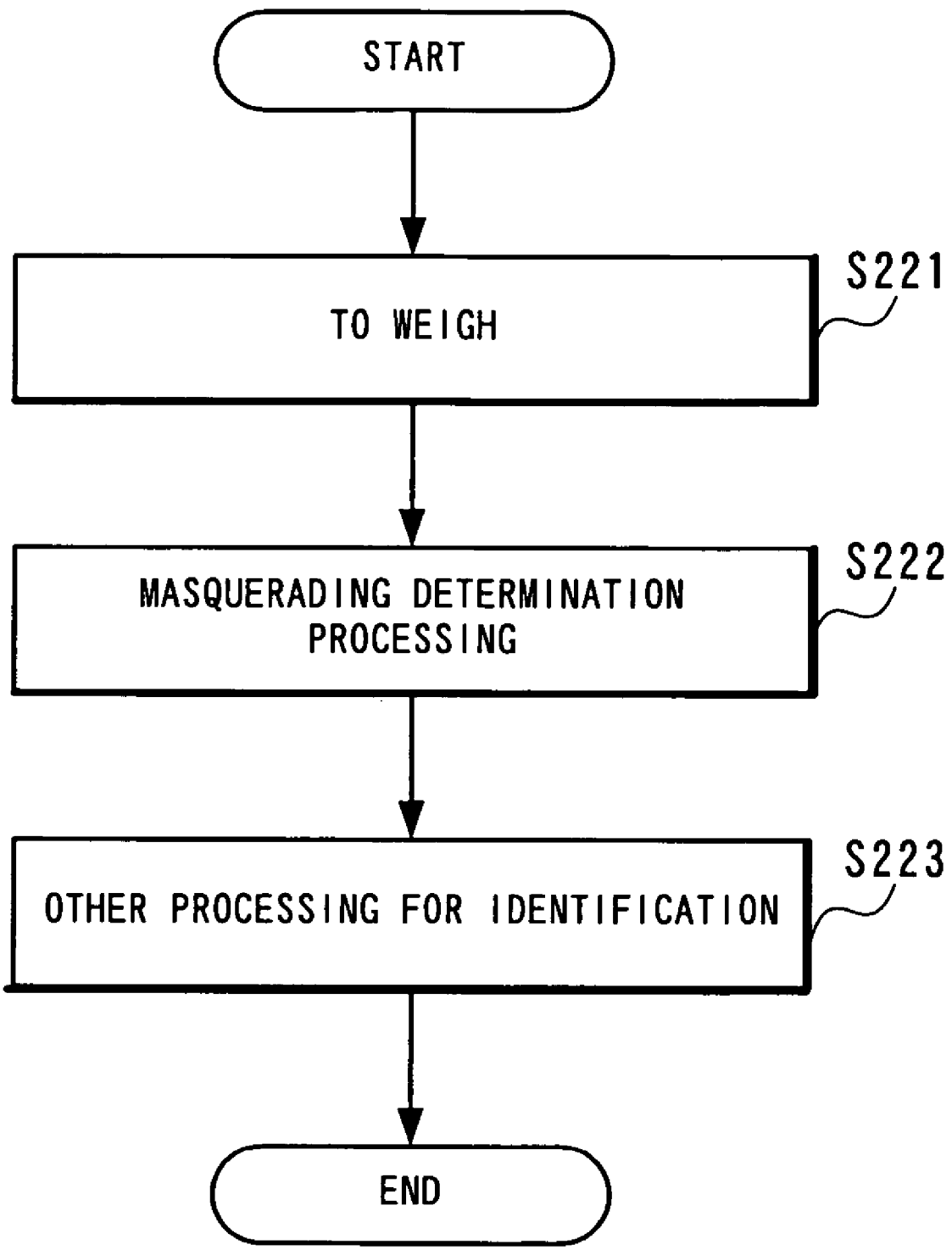
FIG. 25 is a flow chart showing an example of face identification processing according to the seventh embodiment of the present invention.

FIG. 25 is a flow chart showing an example of face identification processing executed by the face identification device 1f in the seventh embodiment. Assume here that already obtained weight data indicative of weight of each person registered in the face identification device 1f is stored in the feature storage unit 42 in advance.

In the face identification processing, the person measurement unit 2f photographs an identification target by the image input unit 23, as well as weighing the identification target by means of the scales 26 to output actual weight data obtained by the weighing to the storage device 4f and store the same in the feature storage unit 42 (Step S221).

The masquerading determination unit 31f reads the actual weight data and the already obtained weight data from the feature storage unit 42 to determine whether it is masquerading or not (Step S222). In other words, at Step S222, the masquerading determination processing is executed using the actual weight data and the already obtained weight data.

Then, the face identification device 1f executes other processing for face identification (Step S223). At Step S223, the same processing as that of the above-described Step S23 is executed.

Thus structuring the device to weigh simultaneously with photographing copes with switching of an identification target at the time of weighing and photographing. Weighing by the scales 26 needs not be executed simultaneously with photographing by the image input unit 23 and can be executed a little later by so a short time period that the identification target can not switch. Arranging the device to weigh immediately before photographing will have the same effect as that described above.

Figure 26:
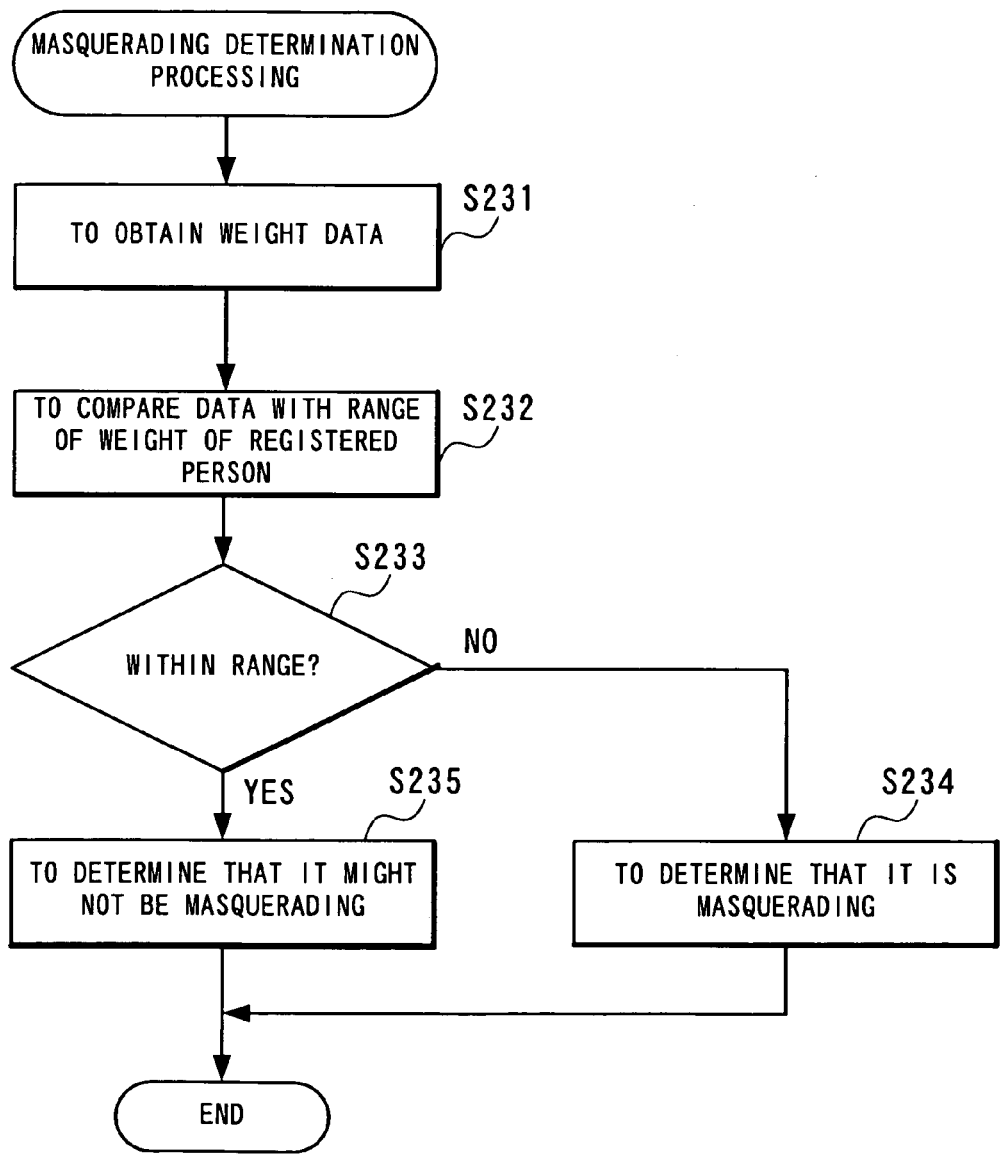
FIG. 26 is a flow chart showing an example of masquerading determination processing according to the seventh embodiment of the present invention.

FIG. 26 is a flow chart showing an example of the masquerading determination processing (Step S222) in the seventh embodiment. In the masquerading determination processing, the masquerading determination unit 31f reads actual weight data indicative of weight obtained by the scales 26 and the already obtained weight data which is registered in advance from the feature storage unit 42 (Step S231).

Subsequently, with a range between a maximum value and a minimum value of weight of a person registered as an identification target in the face identification device 1f as a reference, the masquerading determination unit 31f determines whether a value of weight represented by the actual weight data (weight of a photographing target) exists within a range (allowable range) obtained by adding a fixed margin to the range (reference range) (Step S232).

Assume, for example, that a maximum value of weight of a person registered in the face identification device 1f is 87.5 kg and a minimum value is 62.5 kg. In this case, a reference range will be from 62.5 kg to 87.5 kg. Then, assuming a value of a margin to be 5 kg, the allowable range will be from 60 kg to 90 kg. In this example, the allowable range is derived at Step S232. In other words, every time masquerading determination is executed, an allowable range at that time is derived.

Accordingly, unless a value of weight represented by actual weight data is within the allowable range (N at Step S233), determine that it is masquerading (Step S234). On the other hand, when the data is within the allowable range (Y at Step S233), determine that it might not be masquerading (Step S235). Even when the number of persons registered in the face identification device 1f as an identification target is increased or decreased, an appropriate allowable range coping with the increase or decrease can be derived.

Thus, being structured to determine it is masquerading when confirming that weight of an identification target is not within an allowable range determined based on a range of weight of each person registered in the face identification device 1f, the above-described seventh embodiment enables detection of masquerading executed by others standing with a heavy image display device on which a masquerading image is displayed at a photographing position at the time of authentication to make the image input unit 23 photograph the masquerading image. The embodiment further enables detection of other masquerading using a heavy object such as masquerading using a heavy face-shaped relief.

In addition, since being structured to check whether weight of an identification target is within an allowable range to determine masquerading according to the check result, thereby enabling masquerading detection without executing image processing, as compared with the masquerading detection by using image data in the above-described first embodiment or the like, the above-described seventh embodiment enables detection of such masquerading using a heavy image display device as described above with a smaller volume of computation. As a result, control loads on the masquerading detection device can be reduced and masquerading can be detected quickly.

Embodiment 8

Figure 27:
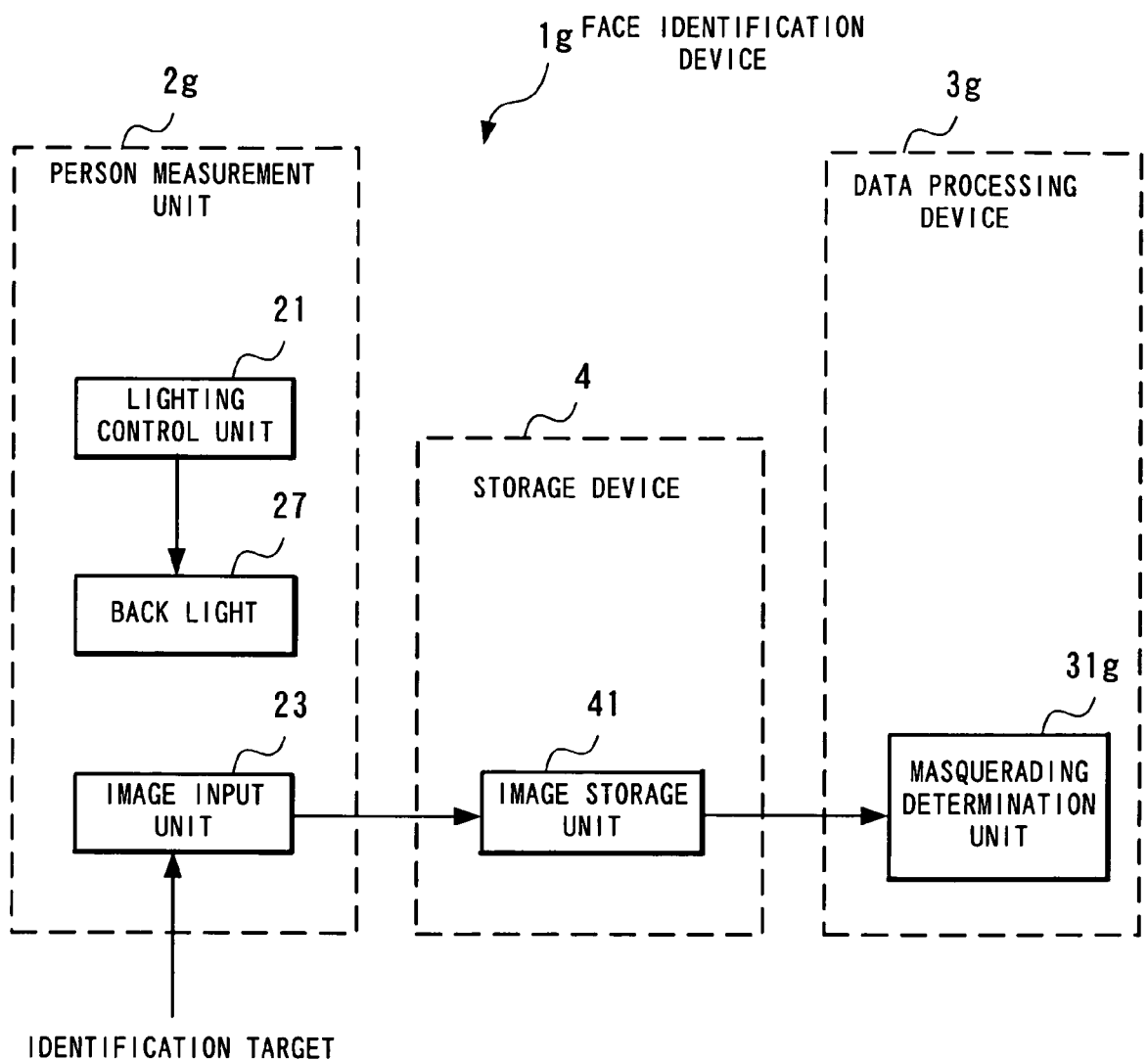
FIG. 27 is a block diagram showing an example of structure of a face identification device according to an eighth embodiment of the present invention.

FIG. 27 is a block diagram showing an example of structure of a face identification device 1g including an eighth embodiment of the masquerading detection device according to the present invention. In the following description, the same structure and parts executing the same processing as those of the face identification devices in the above-described respective embodiments are given the same reference numerals to omit their detailed description.

As illustrated in FIG. 27, the face identification device 1g includes a person measurement unit 2g, a data processing device 3g and the storage device 4. The person measurement unit 2g includes the lighting control unit 21, a back light 27 and the image input unit 23. The data processing device 3g includes the masquerading determination device 31g.

Figure 28:
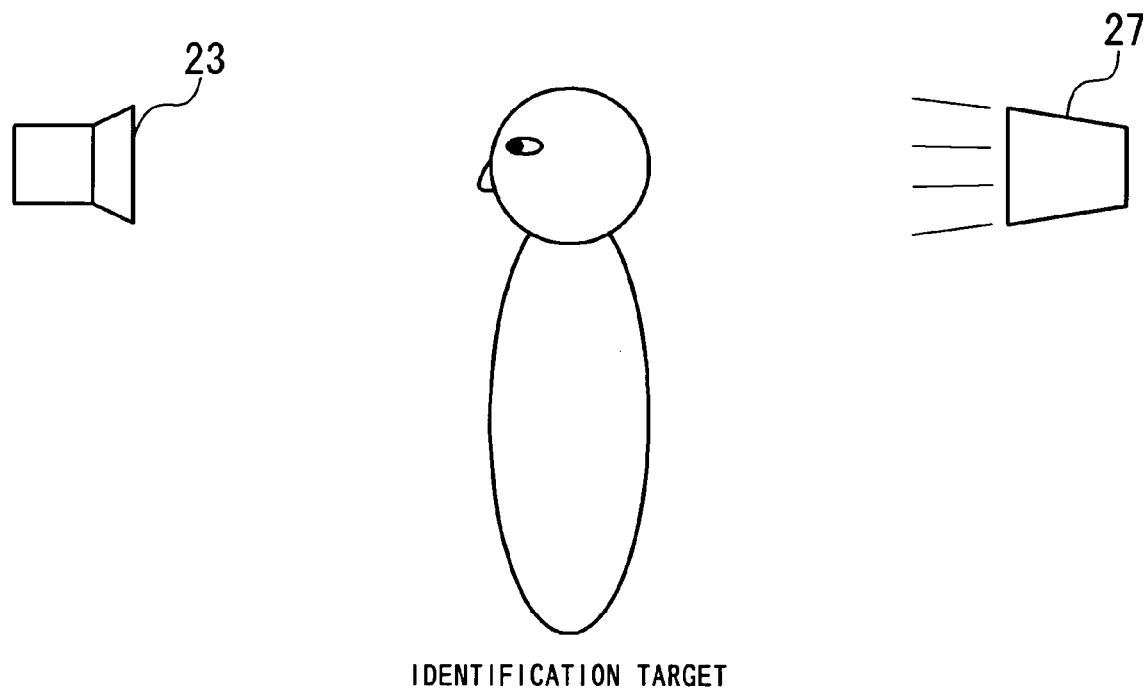
FIG. 28 is a diagram for use in exampling an example of a position where a back light is disposed in the eighth embodiment of the present invention.

The back light 27, as illustrated in FIG. 28, is disposed, for example, at a position at the back of a photographing target seen from the image input unit 23. Turning on lighting that the back light 27 has puts an image to be photographed by the image input unit 23 into a backlight state. The lighting control unit 21 controls on/off of lighting of the back light 27. The image input unit 23 photographs a photographing target when the back light 27 is turned on and transmits image data obtained by the photographing toward the storage device 4 to store the same in the image storage unit 41.

The masquerading determination unit 31g has a function of reading image data stored in the image storage unit 41 and executing processing with respect, for example, to a region of a face detected by a face detection unit not shown in FIG. 27 to determine whether an identification target is used for masquerading or it might not be used for masquerading.

Figure 29:
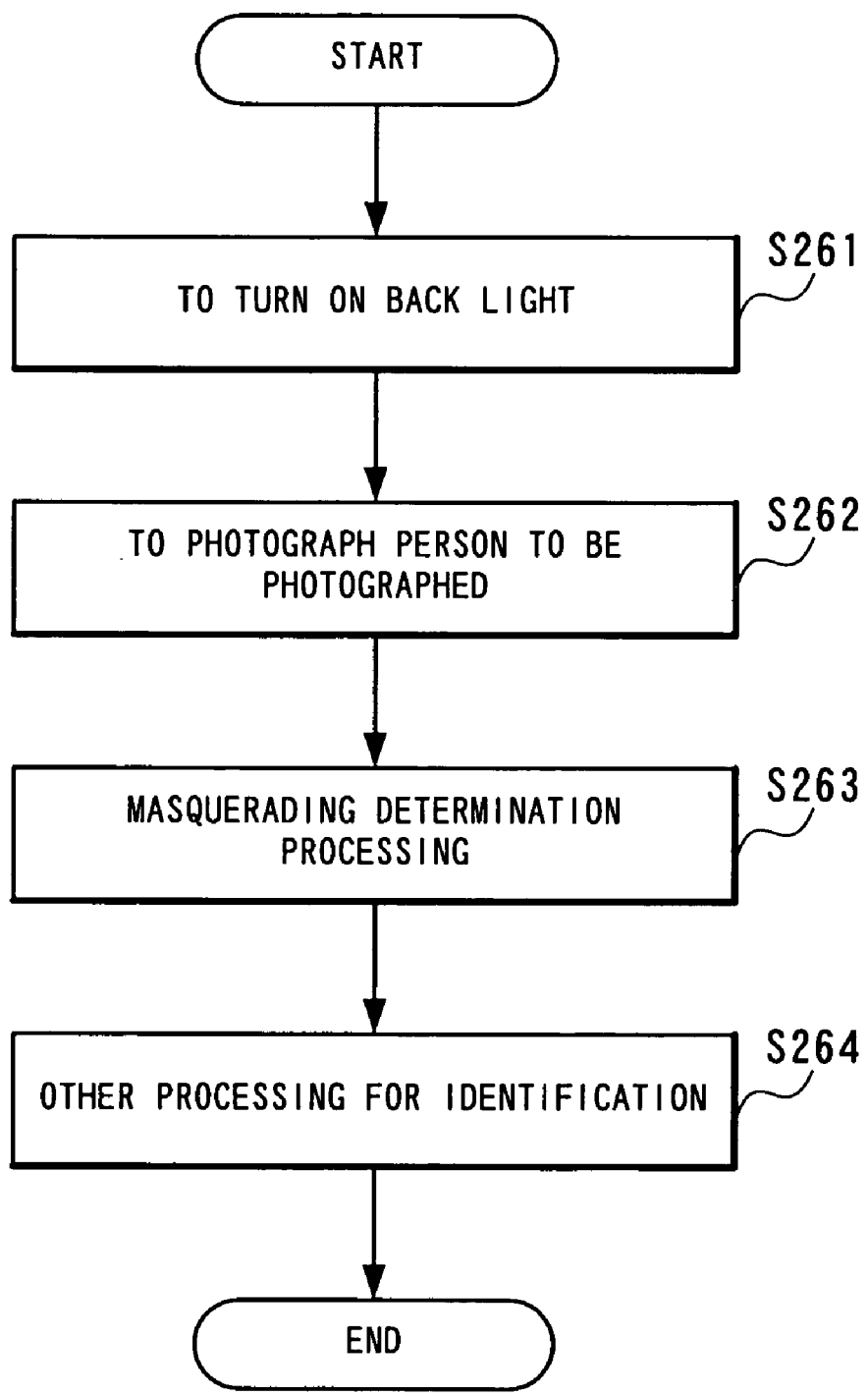
FIG. 29 is a flow chart showing an example of face identification processing according to the eighth embodiment of the present invention.

FIG. 29 is a flow chart showing an example of face identification processing executed by the face identification device 1g in the eighth embodiment. In the face identification processing, the person measurement unit 2g turns on the back light 27 (Step S261) to photograph an identification target (person to be photographed) by the image input unit 23 during turning-on of the back light 27 (Step S262). As a result, a backlighted image in which an identification target region has low luminance is obtained. Subsequently, the person measurement unit 2g outputs the image data obtained by the photographing to the storage device 4 to store the same in the image storage unit 41.

The masquerading determination unit 31g reads the image data from the image storage unit 41 to determine whether it is masquerading or not (Step S263). In other words, at Step S263, the masquerading determination processing is executed using the image data representing the identification target photographed while the back light 27 is turned on.

Then, the face identification device 1g executes other processing for face identification (Step S264). At Step S264, the same processing as that of the above-described Step S23 is executed.

Figure 30:
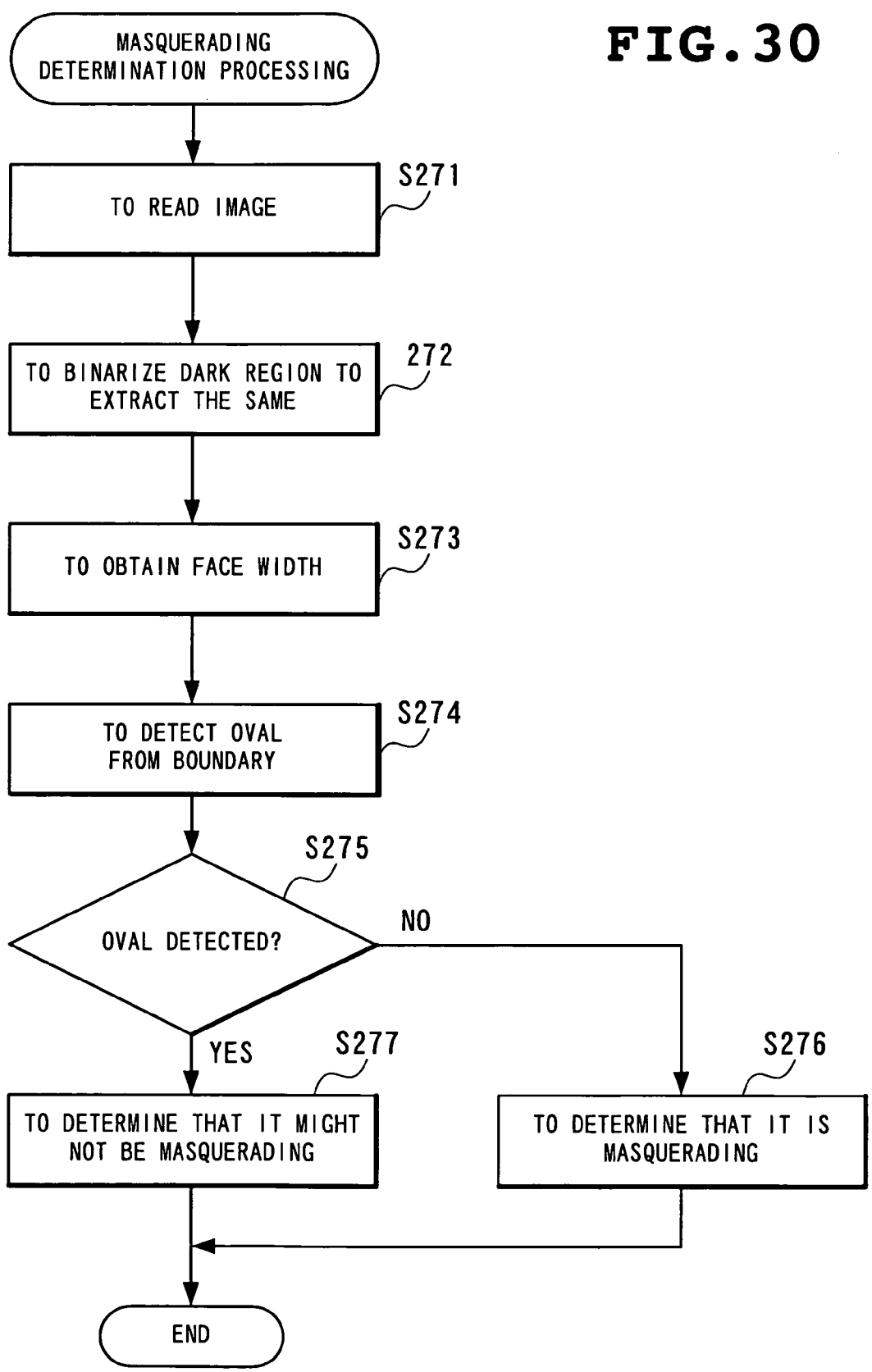
FIG. 30 is a flow chart showing an example of masquerading determination processing according to the eighth embodiment of the present invention.

FIG. 30 is a flow chart showing an example of the masquerading determination processing (Step S263) in the eighth embodiment. In the masquerading determination processing, the masquerading determination unit 31g reads, from the image storage unit 41, image data representing an image photographed while the back light 27 is turned on (Step S271). The image represented by the image data has a photographing target region darker than its background due to backlight.

Next, the masquerading determination unit 31g extracts a dark region in the image by binarizing a luminance value (Step S272). In addition, obtain a width of a face in the image from the extracted region of the identification target (Step S273). Then, detect an oval-shaped pattern with the width of the face as a minor axis (including not only a perfect oval-shaped pattern but also a pattern approximate to an oval in the present example) with respect to a boundary between the identification target region and the background (Step S274). When no oval-shaped pattern is detected (N at Step S275), consider a profile of the photographed person being not like that of a face but that of other than a face to determine that it is masquerading (Y at Step S276). On the other hand, when an oval is detected, determine that it might not be masquerading (Step S277).

More specifically, used in the above-described face identification device 1g is a CCD camera as the image input unit 23 and a halogen lamp is disposed as the back light 27 to irradiate an identification target from the back. The halogen lamp which irradiates an identification target from the back is in particular disposed such that an identification target is photographed at a backlight state by the CCD camera.

Then, the face identification device 1g first turns on the halogen lamp (back light 27) which irradiates an identification target from the back and photographs the identification target at the backlight state by means of the CCD camera (the image input unit 23) to determine whether it is masquerading or not based on the photographed image. Unless determining that it is masquerading, turn off the halogen lamp which irradiates from the back to conduct image photographing by the CCD camera and execute face detection processing and face collation processing.

Figure 31:
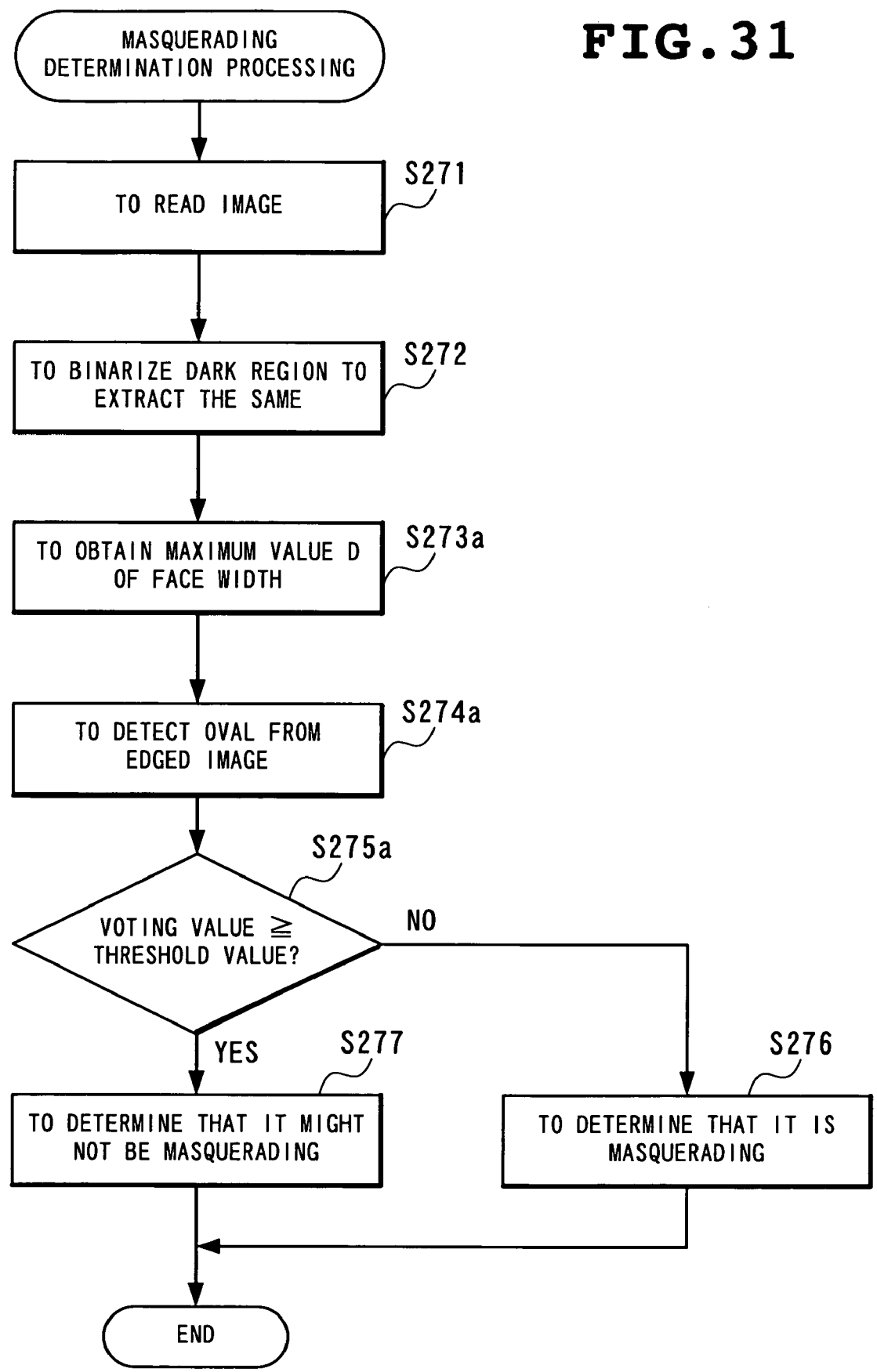
FIG. 31 is a flow chart showing a specific example of the masquerading determination processing in the eighth embodiment of the present invention.

FIG. 31 is a flow chart showing a specific example of processing of determining whether an oval pattern is detected or not (Step S273 to Step S275) as a part of the masquerading determination processing in the eighth embodiment (Step S263, the processing in FIG. 30). As illustrated in FIG. 31, the masquerading determination unit 31g reads image data from the image storage unit 41 (Step S271). A region of the identification target in an image represented by the read image data is darker than its background because of backlight.

Figure 32:
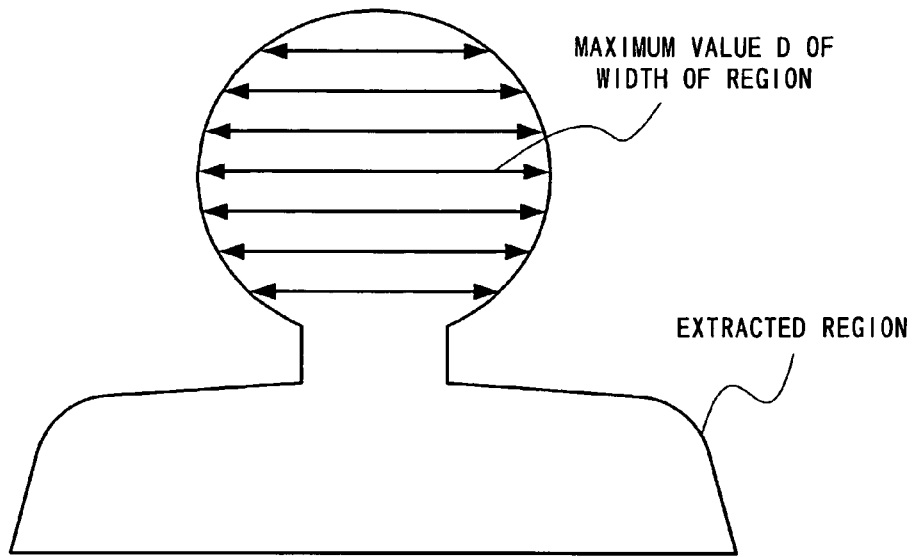
FIG. 32 is a diagram for use in explaining processing of obtaining a width of a region in the masquerading determination processing in the eighth embodiment of the present invention.

Subsequently, the masquerading determination unit 31g extracts a dark region in the image by binarizing a luminance value to extract the photographing target (Step S272). Sequentially scan the image horizontally from the top to obtain a width of the extracted region and consider a value becoming the maximum for the first time (a maximum value D of the width of the region shown in FIG. 32) as a face width (Step S273a). After subjecting the image to edge extraction processing to highlight a boundary between the photographing target and the background, detect an oval with the face width as a minor axis by the Hough transform (Step S274a). When a voting value of the Hough transform is not more than a threshold value, because a profile of the person to be photographed is not close to oval and can be considered not to be a face, determine that it is masquerading (Step S275a).

Thus being structured to check whether a profile of an identification target is an oval pattern or not to determine whether it is masquerading or not according to its check result, the above-described eighth embodiment enables detection of masquerading using other object whose configuration is different from that of a human head. In other words, detection is possible of masquerading by a false face using an object whose profile is not close to that of a human head, for example, masquerading by a false face using a rectangular photograph or image display device.

Since the above-described eighth embodiment is structured to actively illuminate an identification target from the back when photographing the identification target, it is possible to obtain precise configuration of a profile of the identification target to accurately recognize the profile of the identification target. Moreover, being structured to emit lighting onto an identification target from the back prevents lighting from entering sight of a person to be photographed. As a result, it is possible to prevent the person to be photographed from dazzling, resulting in preventing loads from being imposed on the person.

Embodiment 9

Figure 33:
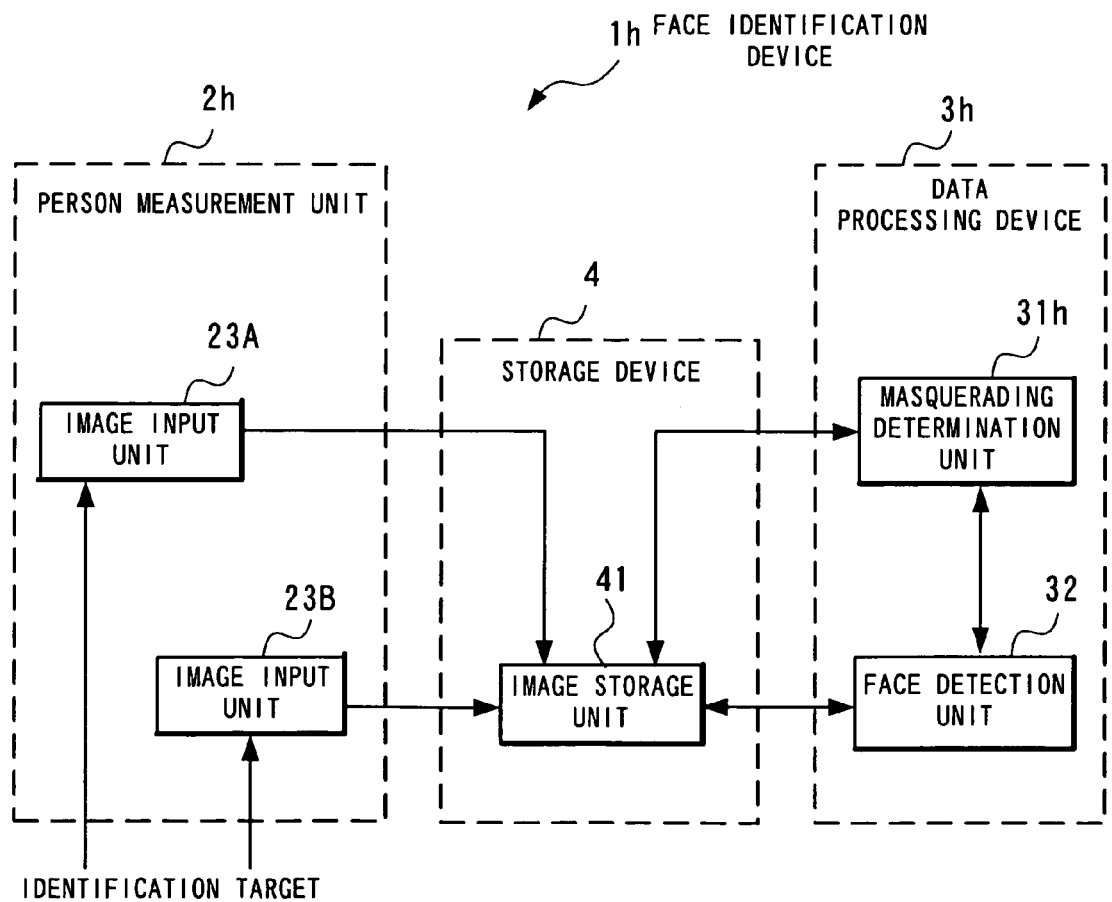
FIG. 33 is a block diagram showing an example of structure of a face identification device according to a ninth embodiment of the present invention.

FIG. 33 is a block diagram showing an example of structure of a face identification device 1h including a ninth embodiment of the masquerading detection device according to the present invention. In the following description, the same structure and parts executing the same processing as those of the face identification devices in the above-described respective embodiments are given the same reference numerals to omit their detailed description.

As illustrated in FIG. 33, the face identification device 1h includes a person measurement unit 2h, a data processing device 3h and the storage device 4. The person measurement unit 2h includes two image input units 23A and 23B. The data processing device 3h includes a masquerading determination unit 31h and the face detection unit 32.

The image input unit 23A and the image input unit 23B are horizontally arranged to be flush with each other, for example. The image input unit 23A and the image input unit 23B simultaneously photograph an identification target and transmit image data representing each image obtained by the photographing toward the storage device 4 to cause the image storage unit 41 to store the same. In other words, two data of images simultaneously photographed by the image input unit 23A and the image input unit 23B are stored in the image storage unit 41.

The masquerading determination unit 31h has a function of reading two image data stored in the image storage unit 41 and executing processing with respect to a region of a face detected by the face detection unit 32 to determine whether an identification target is used for masquerading or it might not be used for masquerading.

Figure 34:
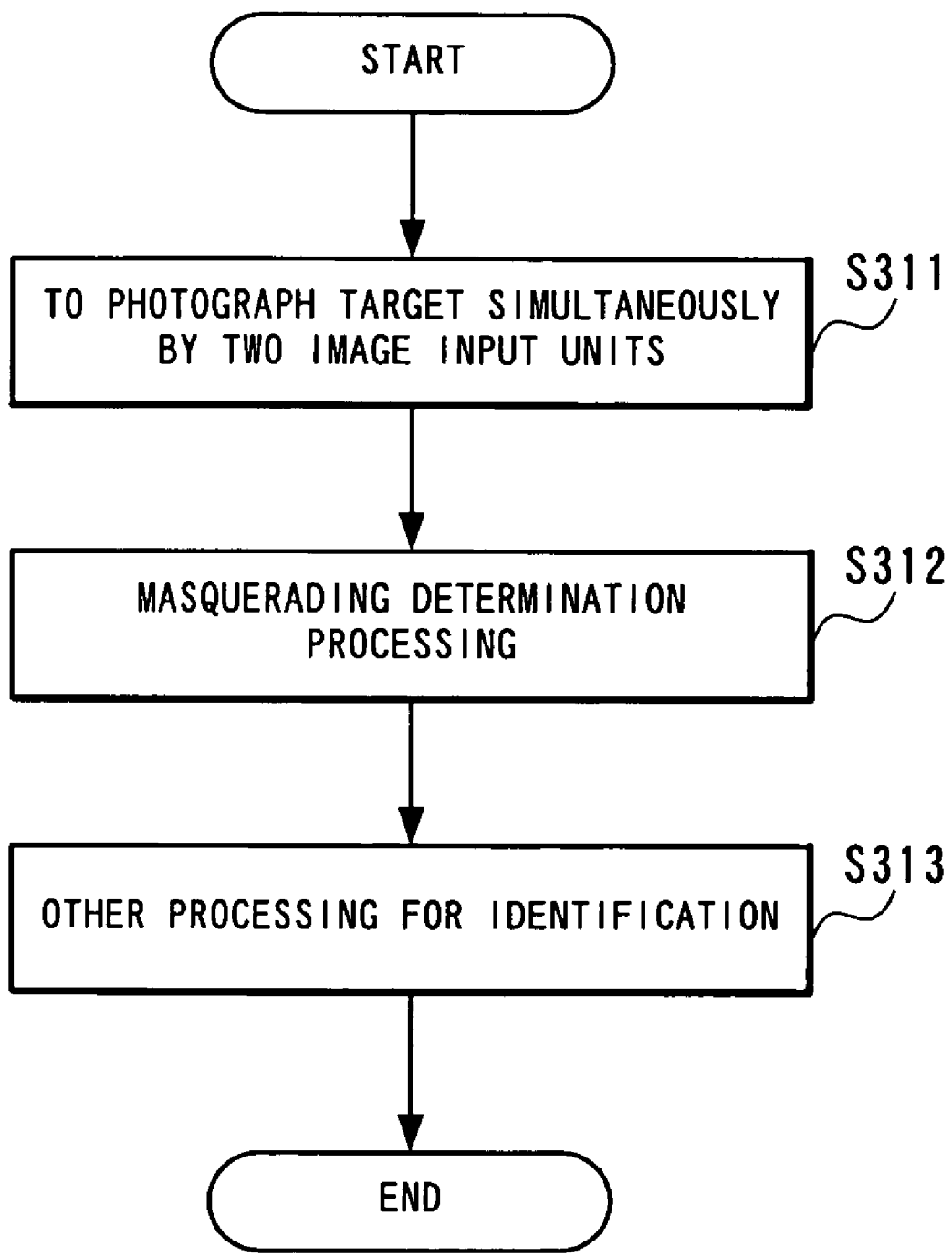
FIG. 34 is a flow chart showing an example of face identification processing according to the ninth embodiment of the present invention.

FIG. 34 is a flow chart showing an example of face identification processing executed by the face identification device 1h in the ninth embodiment. In the face identification processing, the person measurement unit 2h photographs a photographing target simultaneously by means of the image input unit 23A and the image input device 23B (Step S311). Subsequently, the person measurement unit 2h outputs two image data obtained by the photographing to the storage device 4 to cause the image storage unit 41 to store the two image data.

The masquerading determination unit 31h reads the two image data obtained by the two image input units 23A and 23B from the image storage unit 41 to determine whether it is masquerading or not by using the two images (Step S312).

Then, the face identification device 1h executes other processing for face identification (Step S313). At Step S313, the same processing as that of the above-described Step S23 is executed.

Figure 35:
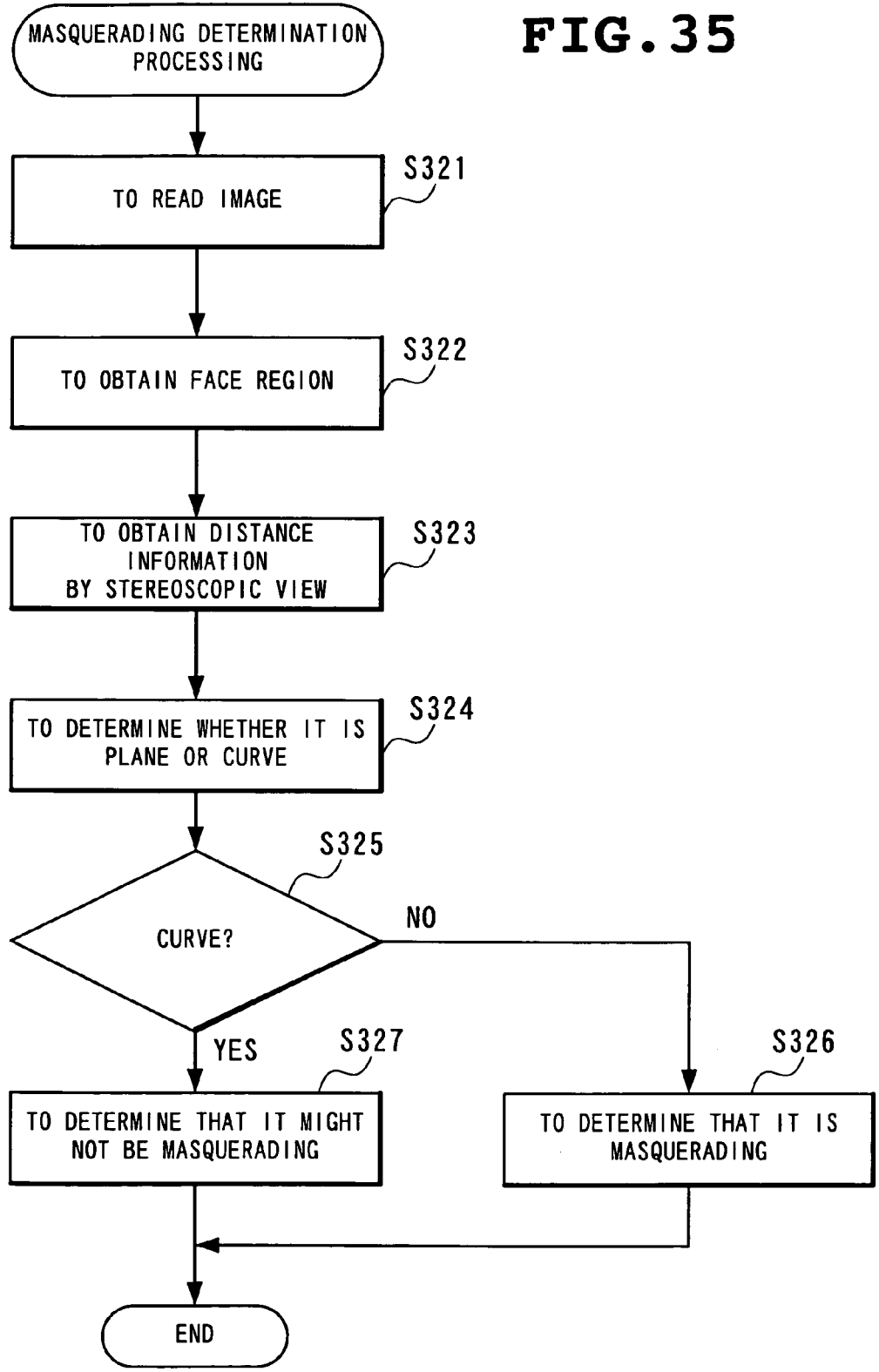
FIG. 35 is a flow chart showing an example of masquerading determination processing according to the ninth embodiment of the present invention.

FIG. 35 is a flow chart showing an example of the masquerading determination processing (Step S312) in the ninth embodiment. In the masquerading determination processing, the masquerading determination unit 31h reads the two image data representing the two images photographed by the two image input units 23A and 23B from the image storage unit 41 (Step S321), as well as obtaining a face region detected by the face detection unit 32 (Step S322).

Next, the masquerading determination unit 31h obtains distance information by the calculation of stereoscopic view making use of parallax between the two image input units 23A and 23B (Step S323). Distance information here is information indicative of each distance from each of the image input units 23A and 23B to each of a plurality of predetermined positions in the face region of the identification target. Based on the distance information, determine whether the face region of the photographing target obtained at Step S322 has a plane configuration or a curved configuration (Step S324). When determining that it is plane (N at Step S325), determine that it is masquerading (Step S326). On the other hand, when determining that it is curved (Y at Step S325), determine that it might not be masquerading (Step S327).

More specifically, used in the above-described face identification device 1h are, for example, two CCD cameras as the image input units 23A and 23B. The two CCD cameras are in particular disposed horizontally to be flush with each other. Then, in this example, one of the CCD cameras (e.g. the image input unit 23A) is disposed in front of the identification target such that it can be used also for photographing a face for face identification by the face identification device 1h.

Then, the face identification device 1h photographs the identification target simultaneously by the two CCD cameras (the image input units 23A and 23B) and determines whether the identification target has a plane configuration or a solid configuration by using the two photographed images to conduct masquerading determination based on the determination result.

Figure 36:
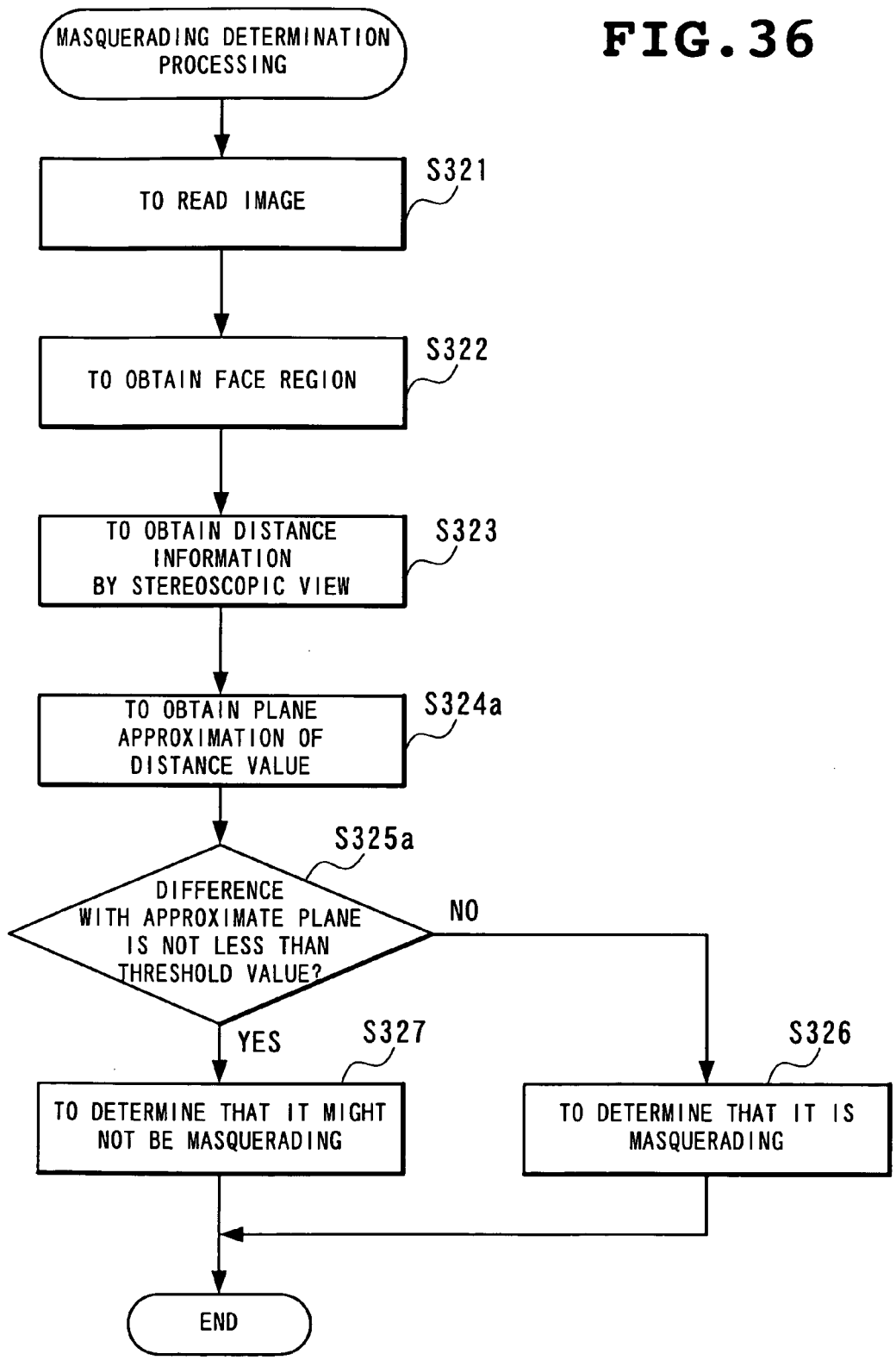
FIG. 36 is a flow chart showing a specific example of the masquerading determination processing in the ninth embodiment of the present invention.

FIG. 36 is a flow chart showing a specific example of the masquerading determination processing (Step S312, the processing in FIG. 35) in the ninth embodiment. As illustrated in FIG. 36, the masquerading determination unit 31h reads two image data respectively representing the simultaneously photographed two images from the image storage unit 41 (Step S321). In addition, with respect to each of the two images, obtain information indicative of a face region detected by the face detection unit 32 (Step S322).

Subsequently, the masquerading determination unit 31h obtains distance information by the calculation of stereoscopic view making use of parallax between the right and left CCD cameras (Step S323). Based on the distance information, execute plane approximation of the photographing target by the method of least squares with respect to the face region of the photographing target represented by the information obtained at Step S322 (Step S324a). Then, when a difference of two squares of an approximate plane obtained by plane approximation and actual distance information is not more than a threshold set in advance, which means that a configuration of the photographing target is approximate to plane, determine that it is masquerading (Step S325a).

In this example, by obtaining distance information at Step S323, a distance image (image formed by the respective points on the identification target represented by the distance information) will be generated. In other words, a distance image will be represented by the obtained distance information.

Thus, being structured to check whether an identification target has a plane configuration or a solid configuration by using two images photographed simultaneously by the two image input units 23A and 23B to determine whether it is masquerading or not according to the check result, the above-described ninth embodiment enables detection of masquerading using a plane object such as a picture or an image display device on which other's face is displayed.

While the above-described ninth embodiment is structured to use two image input units 23A and 23B, it may be structured to include three or more image input units which are horizontally arranged to be flush with each other such that image data photographed by arbitrary two image input units of them is used to obtain the same effects. In this case, image data appropriate for image processing may be used from among images photographed by three or more image input units. More specifically, among the respective image data obtained by photographing by the respective image input units, two image data in which the direction of the face of the photographed person approximates to the front, for example, may be used. In addition, the same effect can be obtained by switching the order of execution of the processing at Steps S322 and S323.

Embodiment 10

Figure 37:
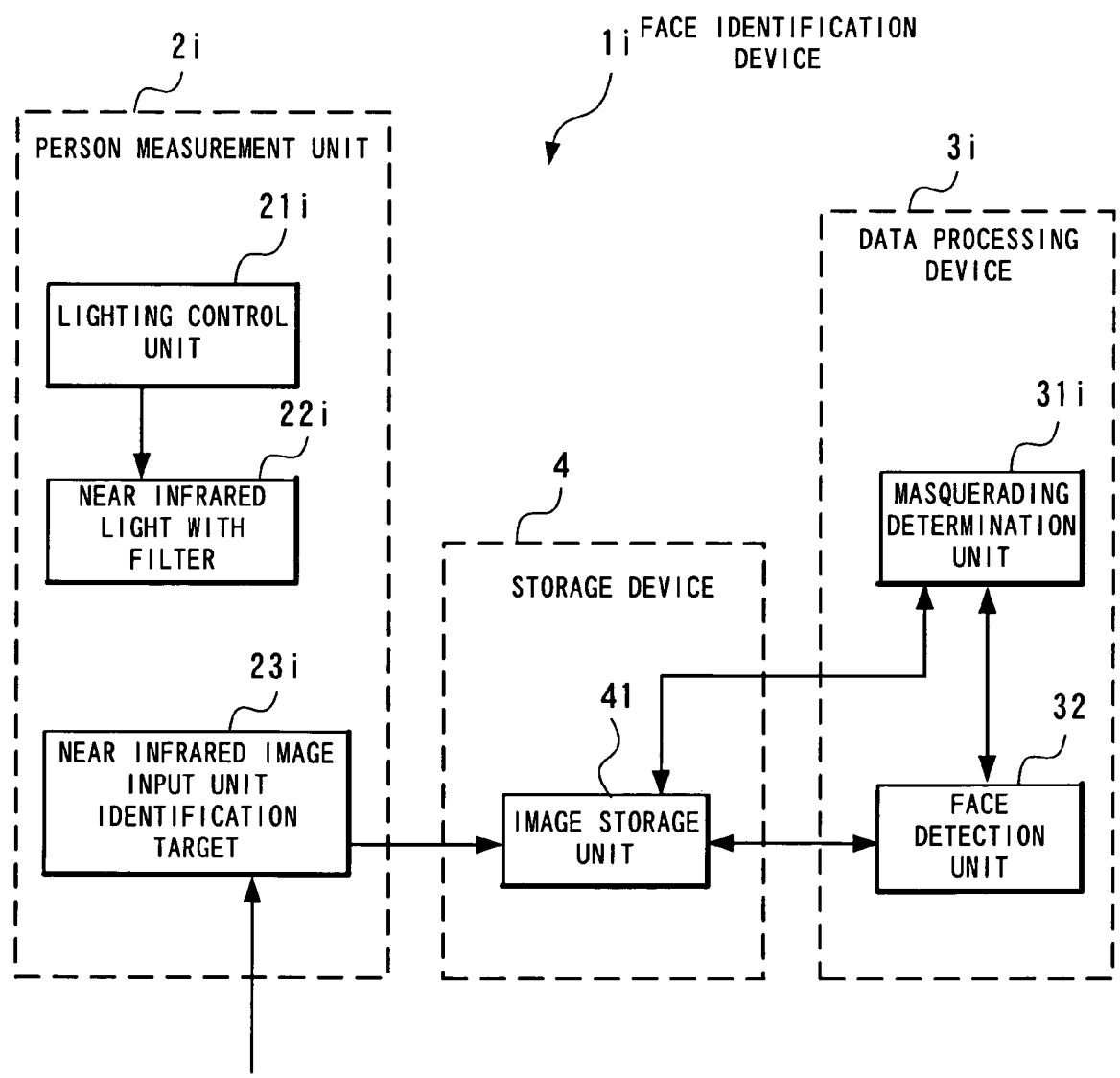
FIG. 37 is a block diagram showing an example of structure of a face identification device according to a tenth embodiment of the present invention.

FIG. 37 is a block diagram showing an example of structure of a face identification device 1i including a tenth embodiment of the masquerading detection device according to the present invention. In the following description, the same structure and parts executing the same processing as those of the face identification devices in the above-described respective embodiments are given the same reference numerals to omit their detailed description.

As illustrated in FIG. 37, the face identification device 1i includes a person measurement unit 2i, a data processing device 3i and the storage device 4. The person measurement unit 2i includes a lighting control unit 21i, a near infrared light with a filer 22i and a near infrared image input unit 23i. The data processing device 3i includes a masquerading determination unit 31i and the face detection unit 32.

The near infrared light with a filter 22i includes a near infrared ray light source and a filter with a striped pattern having straight lines arranged drawn, such that turning on the light enables a pattern with a near infrared ray wavelength which is invisible to a human eye to be projected onto a photographing target. Light of a near infrared wavelength can be allowed to transmit only through a part of a striped pattern or only through other part than the striped pattern. The lighting control unit 21i controls turning-on/off of lighting of the near infrared light with a filter 22i. The near infrared image input unit 23i photographs a photographing target when the near infrared light with a filter 22i is turned on and stores image data obtained by the photographing in the image storage unit 41 that the storage device 4 has.

Operation of the face identification device 1i is the same as that of the face identification device 1 in the first embodiment, which is equivalent to the first embodiment with the light with a filter 22 replaced by the near infrared light with a filter 22i and the image input unit 23 replaced by the near infrared image input unit 23i.

More specifically, in the face identification device 1i shown in FIG. 37, used as the near infrared image input unit 23i is a near infrared CCD camera and used as the near infrared light with a filter 22i is a near infrared ray light with a filter attached, for example. The near infrared ray light is formed of light emitting diode lighting whose wavelength is 880 nanometers and the near infrared CCD camera is formed of a camera which is capable of photographing light whose wavelength is 880 nanometers (more specifically, light having a wavelength which is irradiated by a near infrared light), for example.

Thus, the above-described tenth embodiment produces, in addition to the effect of the first embodiment, an effect of preventing a person to be photographed from dazzling by projecting a pattern by near infrared ray light which is invisible to a human eye even when a light with a filter (e.g. the near infrared light with a filter 22i) is disposed at a position which enters the sight of the person to be photographed, thereby realizing masquerading detection without imposing burdens on the person to be photographed. Moreover, since a projected pattern can not be visually recognized by a person, it is difficult to find a masquerading detection method of the face identification device 1i.

As described in the foregoing, the masquerading detection devices according to the above-described respective embodiments enable stable detection of masquerading with high precision. More specifically, the masquerading detection devices according to the above-described respective embodiments enable determination of masquerading when as a false face for use in masquerading, any of various kinds of false faces is used in authentication such as a false face having a plane configuration, a false face having a different size, a false face whose profile of a head is not like a person and a false face formed by a heavy-weight object, thereby realizing stable detection of masquerading with high precision. Moreover, because with the masquerading detection devices according to the above-described respective embodiments, an identification target is irradiated by the person measurement unit, environments in which the identification target is precisely photographed can be actively arranged to enable image data for stable image processing to be obtained, so that masquerading can be detected stably.

Furthermore, the masquerading detection devices according to the above-described respective embodiments enable detection of masquerading without imposing heavy burdens on a person to be identified. More specifically, because masquerading can be detected without emitting strong and dazzling light toward a person to be identified, heavy burdens on eyes of the person to be identified can be avoided. In addition, since with the masquerading detection devices according to the above-described respective embodiments, no instruction on special operation is given to a person to be identified, masquerading can be detected without imposing burdens on the person to be identified.

Furthermore, the masquerading detection devices according to the above-described respective embodiments enable detection of masquerading with high precision without requiring heavy control burdens. More specifically, because the devices are structured to detect masquerading by determining whether an identification target has a plane configuration or a solid configuration without measuring solid configuration of a face of a person to be identified, control loads for masquerading detection can be mitigated.

Moreover, the masquerading detection devices according to the above-described respective embodiments obtain the above-described respective effects without making the face identification device be a high cost device. More specifically, because the masquerading detection device is structured by using an inexpensive sensor without requiring costly devices or sensors which execute complicated control and because a device for use as a person measurement unit (e.g. an image input unit or a light) can be used also as a device which executes authentication processing in the face identification device, the face identification device can be formed at low costs.

A part or all of the above-described first to tenth embodiments may be arbitrary combined. In this case, operation of the combined respective embodiments may be sequentially executed. Thus structuring a masquerading detection device by combining the plurality of embodiments obtains the respective effects of the embodiments combined to enable more stable masquerading detection with higher precision.

More specifically, for example, at least two of, the first, the second, the third, the fourth, the ninth or the tenth embodiment, the fifth or the sixth embodiment, the seventh, and the eighth embodiment may be arbitrarily combined. In a case, for example, where the masquerading detection device is structured by combining the first embodiment, the fifth embodiment, the seventh embodiment and the eighth embodiment among them, masquerading will be determined based on all the determination results of whether a striped pattern projected onto an identification target is a straight line or not, whether a distance between the identification target and the image input unit is too close or not, whether weight of the identification target is within an allowable range or not and whether a profile of the identification target has a configuration of a head or not. As a result, the plurality of effects which are attained by the combined respective embodiments can be obtained to enable more stable masquerading determination with higher precision.

In addition, the above-described respective embodiments are premised on that a pattern to be projected onto an identification target is a striped pattern having straight lines arranged in parallel to each other. This is because when a pattern is projected onto a solid configuration, a difference between a pattern to be projected and a projected pattern will appear clearly. Therefore, a pattern to be projected onto an identification target can be any pattern that enables a configuration of a pattern to be projected and a configuration of a projected pattern to have a clear difference.

Although not mentioned in particular in the above-described respective embodiments, the masquerading detection device is mounted with a control program (masquerading detection program) for executing masquerading detection of detecting, for use in determining whether a target is a specific person or not, the target being a non-specified person who masquerades as the specific person. Each unit forming the masquerading detection device (e.g. the data processing device) executes various kinds of control according to a masquerading detection program. In other words, the masquerading detection program is a control program which causes the masquerading detection device to execute a step of irradiating a target with light which has been transmitted through a filter on which a predetermined pattern is drawn to project the pattern onto the target, a step of photographing the target with the predetermined pattern projected to obtain target image data representing the target and a step of comparing a pattern appearing in a face region of a target image represented by the target image data and a predetermined pattern to determine whether the target has a plane configuration or not and when it has the plane configuration, determining that the target is a non-specified person.

Thus, the masquerading detection device according to the present invention includes a target information obtaining means having a light emitter which irradiates a target with light, as well as projecting a predetermined pattern onto the target, a filter which is located in proximity to a light source of the light emitter to transmit light irradiated by the light emitter and a target image obtaining means which photographs a target with a predetermined pattern projected by light emission of the light emitter to obtain target image data representing the target, a storage means having an image storage means which stores target image data, and a data processing means having a masquerading determination means which determines whether a target is a non-specified person or not, in which the masquerading determination means compares a pattern appearing in a face region of a target image represented by target image data and a predetermined pattern to determine whether a target has a plane configuration or not and when it has the plane configuration, determines that the target is a non-specified person, so that use of such a plane object on which a false face is displayed as a photograph or an image display device can be determined as masquerading.

Structuring the target information obtaining means to have a filter rotation control means which rotates a filter for changing a pattern to be projected onto a target such that the filter rotation control means at random selects a rotation angle of the filter to rotate the same and the masquerading determination means determines whether a rotation angle of a pattern appearing in a face region detected by a face detection means is proper or not and unless it is proper, determines that the target is non-specified person makes generation of a masquerading image be difficult to increase masquerading detection precision.

Also structuring the target information obtaining means to have a plurality of filters on which different patterns are drawn and a filter switching control means which executes processing of switching a filter to be used for projecting a pattern onto a target such that the filter switching control means at random selects any of the plurality of filters to execute switching processing and the masquerading determination means determines whether a pattern appearing on a face region of a target is a pattern appearing on a filter selectively switched by the filter switching control means or not and unless the pattern is the pattern drawn on the filter, determines that the target is a non-specified person makes generation of a masquerading image be difficult to increase masquerading detection precision.

Structuring the target information obtaining means to have a plurality of filters on which patterns are drawn in different colors and a filter switching control means which executes processing of switching a filter to be used for projecting a pattern onto a target such that the filter switching control means at random selects any of the plurality of filters to execute switching processing and the masquerading determination means determines whether a pattern appearing on a face region of a target has a color of a pattern appearing on a filter selectively switched by the filter switching control means or not and unless the pattern has the color of the pattern drawn on the filter, determines that the target is a non-specified person makes generation of a masquerading image be difficult to increase masquerading detection precision.

Structuring the target information obtaining means to have a distance sensor located adjacent to the target image obtaining means and the storage means to have a feature storage means in which distance information indicative of an appropriate distance between the target image obtaining means and a specific person is stored in advance such that the distance sensor measures a distance between the target image obtaining means and a target and the masquerading determination means compares a distance measured by the distance sensor and a distance represented by the distance information to determine whether the distance between the target image obtaining means and the target is within an appropriate range or not and when the distance is out of the appropriate range, determines that the target is a non-specified person enables efficient masquerading determination without executing image processing.

When the target information obtaining means is structured to have an object sensor located adjacent to the target image obtaining means such that the object sensor senses a target that is located at a distance shorter than an appropriate distance between the target image obtaining means and a specific person and the storage means is structured to have a feature storage means in which a sensing result of the object sensor is stored such that the masquerading determination means determines whether a target is sensed by the object sensor or not and when sensed, determines that the target is a non-specified person, a target locating too close to the target image obtaining means can be determined masquerading.

Structuring the target information obtaining means to have a weighing unit disposed at a predetermined position set in advance where a target is located when determining whether the target is a specific person or not and the storage means to have a feature storage means in which weight information of each person registered in advance for determining whether it is a specific person or not is stored such that the weighing unit weighs a target located at a predetermined position and the masquerading determination unit compares weight of a target obtained by the weighing unit and weight information stored in the feature storage means to determine whether the weight of the target is within an allowable weight range or not and when the weight is out of the allowable weight range, determines that the target is a non-specified person enables efficient masquerading determination without executing image processing.

When the target information obtaining means is structured to have a back light emitter which irradiates a target with light from the back such that the target image obtaining means photographs the target irradiated with light from the back by light emission of the back light emitter to obtain backlighted image data representing the target at the backlight state and the masquerading determination means extracts a region whose luminance value in a backlighted image represented by the backlighted image data obtained by the target image obtaining means is not more than a predetermined value to separate a target region in the backlighted image from a background region and determine whether a boundary between the target region and the background region has a configuration of a human head or not and unless it has a configuration of a human head, determines that the target is a non-specified person, in a case where the target is a specific person, because masquerading detection can be executed without emitting strong light which enters sight of the specific person, masquerading determination is possible without imposing burdens on the person.

Structuring the target information obtaining means to include two target image obtaining means such that the masquerading determination means generates a distance image of a target by making use of parallax between the two target image obtaining means to determine whether a known face region in the distance image has a plane configuration or not and when it has a plane configuration, determines that the target is a non-specific person enables masquerading using a plane object to be detected without fail.

Using an image input means which photographs a wavelength of a near infrared region as the target image obtaining means and structuring a light source of a light emitter to emit light with a wavelength of a near infrared region makes a masquerading detection method be hard to be found because a pattern will be invisible to a human eye.

The invention claimed is:

1. A masquerading detection device which, for use in determining whether a target is a specified person or not, detects the target being a non-specified person who masquerades as said specified person, comprising:
target information obtaining means having a light emitter which irradiates said target with light, as well as projecting a predetermined pattern onto the target, a filter which transmits light emitted by the light emitter disposed in the vicinity of a light source of said light emitter, and target image obtaining means which photographs a target on which a predetermined pattern is projected by light emission of said light emitter to obtain target image data indicative of the target,
image storage means which stores said target image data, and
data processing means having masquerading determination means which determines whether said target is said non-specified person or not, wherein
said masquerading determination means compares a pattern appearing in a face region of a target image represented by said target image data and said predetermined pattern to determine whether said target has a plane configuration or not and when the target has a plane configuration, determines that the target is a non-specified person:
wherein said data processing means includes face detection means which detects a face region of a target image represented by target image data, and said masquerading determination means determines whether a target has a plane configuration or not by using a pattern appearing in a face region detected by said face detection means.

2. The masquerading detection device as set forth in claim 1, wherein
the filter has a striped pattern drawn with a plurality of straight lines arranged in parallel to each other which cut off light transmission, and
said masquerading determination means compares a pattern appearing in a face region of a target image represented by target image data and said striped pattern having the straight lines arranged in parallel to each other to determine whether said target has a plane configuration.

3. The masquerading detection device as set forth in claim 1, wherein
the target information obtaining means includes filter rotation control means which rotates a filter for changing a pattern to be projected onto a target,
said filter rotation control means rotating said filter while selecting a rotation angle at random, and the masquerading determination means determines whether a rotation angle of a pattern appearing in a face region detected by said face detection means is proper or not and unless the angle is proper, determines that the target is a non-specified person.

4. The masquerading detection device as set forth in claim 1, wherein
the target information obtaining means includes a plurality of filters on which different patterns are drawn and filter switching control means which executes switching processing of a filter for use in projecting a pattern onto a target,
said filter switching control means selecting any of the plurality of filters at random to execute switching processing, and
the masquerading determination means determines whether a pattern appearing in a face region of said target is a pattern drawn on a filter which is selectively switched by said filter switching control means to determine that the target is a non-specified person unless the pattern is a pattern drawn on the filter.

5. The masquerading detection device as set forth in claim 1, wherein
the target information obtaining means includes a plurality of filters on which patterns are drawn in different colors and filter switching control means which executes switching processing of a filter for use in projecting a pattern onto a target, said filter switching control means selecting any of the plurality of filters at random to execute switching processing, and the masquerading determination means determines whether a pattern appearing in a face region of said target has color of a pattern drawn on a filter selectively switched by the filter switching control means to determine that the target is a non-specified person unless the pattern has the same color as the color of the pattern drawn on the filter.

6. The masquerading detection device as set forth in claim 1, wherein the target information obtaining means includes a distance sensor located adjacent to the target image obtaining means, and which further comprises feature storage means in which distance information indicative of an appropriate distance between said target image obtaining means and a specified person is stored in advance, wherein said distance sensor measures a distance between said target image obtaining means and a target, and the masquerading determination means compares a distance measured by said distance sensor and a distance indicated by said distance information to determine whether the distance between said target image obtaining means and said target is within an appropriate range and when the distance is out of the appropriate range, determines that the target is a non-specified person.

7. The masquerading detection device as set forth in claim 6, wherein the appropriate range has a lower limit distance set in advance, and the masquerading determination means determines that a target is a non-specified person unless a distance between the target image obtaining means and the target is not less than said lower limit distance.

8. The masquerading detection device as set forth in claim 6, wherein the appropriate range has a higher limit distance set in advance, and the masquerading determination means determines that a target is a non-specified person unless a distance between the target image obtaining means and the target is not more than said higher limit distance.

9. The masquerading detection device as set forth in claim 1, wherein the target information obtaining means includes an object sensor located adjacent to the target image obtaining means, said object sensor sensing a target located at a distance shorter than an appropriate distance between said target image obtaining means and a specified person, and which further comprises feature storage means in which a sensing result of said object sensor is stored, wherein the masquerading determination means determines whether a target is sensed by said object sensor and when sensed, determines that the target is a non-specified person.

10. The masquerading detection device as set forth in claim 1, wherein the target information obtaining means includes a weighing unit disposed at a predetermined position set in advance where a target is to be located when determining whether the target is a specified person or not, and the storage means includes feature storage means in which weight information of each person registered in advance for determining whether the person is a specified person or not is stored, said weighing unit weighing a target located at said predetermined position, and the masquerading determination means compares weight of a target obtained by said weighing unit and said weight information stored in said feature storage means to determine whether the weight of said target is within an allowable weight range or not and when the weight is out of the allowable weight range, determines that the target is a non-specified person.

11. The masquerading detection device as set forth in claim 10, wherein the masquerading determination means determines whether weight of a target is within an allowable weight range or not after deciding the allowable weight range which includes a range from maximum weight to minimum weight in weight information stored in the feature storage means.

12. The masquerading detection device as set forth in claim 1, wherein the target information obtaining means includes a back light emitter which irradiates a target with light from the back, the target image obtaining means photographs a target irradiated with light from the back by lighting of said back light emitter to obtain backlighted image data indicative of the backlighted target, and the masquerading determination means extracts a region whose luminance value in a backlighted image represented by backlighted image data obtained by said target image obtaining means is not more than a predetermined value to separate a target region in the backlighted image from a background region, determines whether a configuration of a boundary between the target region and the background region is a configuration of a human head and unless the configuration is a configuration of a human head, determines that the target is a non- specified person.

13. The masquerading detection device as set forth in claim 12, wherein the masquerading determination means determines whether a target has a configuration of a human head according to whether a boundary between a target region and a background region takes a configuration approximate to an oval.

14. The masquerading detection device as set forth in claim 12, wherein the masquerading determination means obtains a width of a target region to determine whether the target has a configuration of a human head according to whether a boundary between the target region and a background region takes a configuration approximate to an oval with the width of said target region as a minor axis.

15. The masquerading detection device as set forth in claim 1, wherein the target information obtaining means includes two target image obtaining means, and the masquerading determination means generates a distance image of a target by using a visual difference between said two target image obtaining means to determine whether a configuration of a known face region in said distance image is plane or not and when the configuration is plane, determines that the target is a non-specified person.

16. The masquerading detection device as set forth in claim 1,
wherein the target information obtaining means includes two target image obtaining means, and
the data processing means includes face detection means which detects a face region of a distance image generated by the masquerading determination means, and
said masquerading determination means generates a distance image of a target by using a visual difference between said two target image obtaining means to determine whether a configuration of a face region in said distance image detected by said face detection means is plane or not and when the configuration is plane, determines that the target is a non-specified person.

17. The masquerading detection device as set forth in claim 15, wherein the two target image obtaining means are horizontally disposed, with one of which two target image obtaining means being arranged in front of a target.

18. The masquerading detection device as set forth in claim 1, wherein
the target information obtaining means includes three or more target image obtaining means, and
the masquerading determination means selects two target image obtaining means from among said three or more target image obtaining means, generates a distance image of a target by using a visual difference between the selected two target image obtaining means and determines whether a configuration of a known face region in said distance image is plane or not to determine that the target is a non-specified person when the configuration is plane.

19. The masquerading detection device as set forth in claim 1, wherein
the target information obtaining means includes three or more target image obtaining means, the data processing means includes face detection means which detects a face region of a distance image generated by the masquerading determination means, and
said masquerading determination means selects two target image obtaining means from among said three or more target image obtaining means, generates a distance image of a target by using a visual difference between the selected two target image obtaining means and determines whether a configuration of a face region in said distance image detected by said face detection means is plane or not to determine that the target is a non-specified person when the configuration is plane.

20. The masquerading detection device as set forth in claim 1, wherein
as the target image obtaining means, image input means which photographs a wavelength of a near infrared region is used, and
the light source of the light emitter emits light of a wavelength of a near infrared region.

21. A masquerading detection device which, for use in determining whether a target is a specified person or not, detects the target being a non-specified person who masquerades as said specified person, comprising:
target information obtaining means having target image obtaining means which photographs a target to obtain target image data indicative of the target and a distance sensor disposed adjacent to said target image obtaining means,
image storage means which stores said target image data and feature storage means in which distance information indicative of an appropriate distance between said target image obtaining means and a specified person is stored in advance, and
data processing means having masquerading determination means which determines whether said target is said non-specified person or not, wherein
said distance sensor measures a distance between said target image obtaining means and a target, and
said masquerading determination means compares a distance measured by said distance sensor and a distance indicated by said distance information to determine whether the distance between said target image obtaining means and said target is within an appropriate range or not and when the distance is out of the appropriate range, determines that the target is a non-specified person.

22. A masquerading detection device which, for use in determining whether a target is a specified person or not, detects the target being a non-specified person who masquerades as said specified person, comprising:
target information obtaining means having target image obtaining means which photographs a target to obtain target image data indicative of the target and an object sensor disposed adjacent to said target image obtaining means,
image storage means which stores said target image data and feature storage means in which a sensing result of said object sensor is stored, and data processing means having masquerading determination means which determines whether said target is said non-specified person or not, wherein
said object sensor senses a target located at a distance shorter than an appropriate distance between said target image obtaining means and a specified person, and
said masquerading determination means determines whether a target is sensed by said object sensor or not and when sensed, determines that the target is a non-specified person.

23. A masquerading detection device which, for use in determining whether a target is a specified person or not, detects the target being a non-specified person who masquerades as said specified person, comprising:
target information obtaining means having two target image obtaining means which photograph a target to obtain target image data representing the target, image storage means which stores said target image data, and
data processing means having masquerading determination means which determines whether said target is said non-specified person or not, wherein
said masquerading determination means generates a distance image of a target by using a visual difference between said two target image obtaining means to determine whether a known face region in said distance image has a plane configuration or not and determines that the target is a non-specified person when the region has a plane configuration.

24. A masquerading detection method, for use in determining whether a target is a specified person or not, of detecting the target being a non-specified person who masquerades as said specified person, comprising the steps of:
irradiating said target with light transmitted by a filter on which a predetermined pattern is drawn to project said pattern onto the target,
photographing the target on which the predetermined pattern is projected to obtain target image data indicative of the target, and
comparing a pattern appearing in a face region of a target image represented by said target image data and said predetermined pattern to determine whether said target has a plane configuration or not and when the target has a plane configuration, determining that the target is a non-specified person.

25. A masquerading detection method, for use in determining whether a target is a specified person or not, of detecting the target being a non-specified person who masquerades as said specified person, comprising the steps of:

executing measurement processing of measuring a distance between target image obtaining means for use in photographing a target and said target, and executing masquerading determination processing of determining whether said target is said non-specified person or not, wherein said masquerading determination processing includes processing of comparing a distance measured by said measurement processing and a predetermined appropriate distance between said target image obtaining means and a specified person to determine whether the distance between said target image obtaining means and said target is within the appropriate range and determining that the target is a non-specified person when the distance is out of the appropriate range.

26. A masquerading detection method, for use in determining whether a target is a specified person or not, of detecting the target being a non-specified person who masquerades as said specified person, comprising the steps of:

executing sensing processing of sensing a target locating at a distance shorter than an appropriate distance between target image obtaining means which is used for photographing a target and a specified person, and executing masquerading determination processing of determining whether said target is said non-specified person or not, wherein said masquerading determination processing includes processing of determining whether a target is sensed by said sensing processing or not and when sensed, determining that the target is a non-specified person.

27. A masquerading detection method, for use in determining whether a target is a specified person or not, of detecting the target being a non-specified person who masquerades as said specified person, comprising the steps of:

executing target image obtaining processing of photographing a target from two different directions to obtain two target image data indicative of the target, and executing masquerading determination processing of determining whether said target is said non-specified person or not, wherein said masquerading determination processing includes processing of generating a distance image of a target by using a visual difference between two target image obtaining means which execute said target image obtaining processing, determining whether a face region in said distance image has a plane configuration or not and determining that the target is a non-specified person when the region has a plane configuration.

* * * * *